US012732547B2

(12) United States Patent
Kusano et al.

(10) Patent No.: US 12,732,547 B2
(45) Date of Patent: Sep. 8, 2026

(54) NETWORKED MICROPHONE DEVICE CONTROL

(71) Applicant: Sonos, Inc., Santa Barbara, CA (US)

(72) Inventors: Mieko Kusano, Santa Barbara, CA (US); Dayn Wilberding, Santa Barbara, CA (US); Jonathan Wenocur, Cambridge, MA (US); Jonathan Lang, Santa Barbara, CA (US)

(73) Assignee: Sonos, Inc., Goleta, CA (US)

(*) Notice: Subject to any disclaimer, the term of this patent is extended or adjusted under 35 U.S.C. 154(b) by 0 days.

(21) Appl. No.: 18/508,105

(22) Filed: Nov. 13, 2023

(65) Prior Publication Data

US 2024/0080347 A1 Mar. 7, 2024

Related U.S. Application Data

(63) Continuation of application No. 17/878,649, filed on Aug. 1, 2022, now Pat. No. 11,863,593, which is a (Continued)

(51) Int. Cl.
*H04L 65/1059* (2022.01)
*G10L 15/22* (2006.01)
(Continued)

(52) U.S. Cl.
CPC ...... *H04L 65/1059* (2013.01); *H04L 65/1096* (2013.01); *H04R 3/00* (2013.01);
(Continued)

(58) Field of Classification Search
CPC ... H04L 65/1059; H04L 65/1096; H04R 3/00; H04R 2227/005; H04R 2420/07; G10L 2015/223
See application file for complete search history.

(56) References Cited

U.S. PATENT DOCUMENTS 999,715 A 8/1911 Gundersen
4,741,038 A 4/1988 Elko et al.
(Continued)

FOREIGN PATENT DOCUMENTS

AU 2017100486 A4 6/2017
AU 2017100581 A4 6/2017
(Continued)

OTHER PUBLICATIONS

US 9,299,346 B1, 03/2016, Hart et al. (withdrawn)
(Continued)

*Primary Examiner* — Sonia L Gay
(74) *Attorney, Agent, or Firm* — Akerman LLP

(57) ABSTRACT

Systems and methods disclosed herein include, while a microphone of a first networked microphone device is enabled, determining whether a first reference device is in a specific state, and in response to determining that the first reference device is in the specific state, disabling the microphone of the first networked microphone device. Some embodiments further include, while the microphone of the first networked microphone device is enabled, receiving a command to disable the microphone of the first networked microphone device via one of the microphone of the networked microphone device or a network interface of the networked microphone device, and in response to receiving the command to disable the microphone of the networked microphone device via one of the microphone of the networked microphone device or the network interface of the networked microphone device, disabling the microphone of the networked microphone device.

20 Claims, 7 Drawing Sheets

Related U.S. Application Data continuation of application No. 16/378,516, filed on Apr. 8, 2019, now Pat. No. 11,405,430, which is a continuation of application No. 15/438,725, filed on Feb. 21, 2017, now Pat. No. 10,264,030.

(51) Int. Cl.
*H04L 65/1096* (2022.01)
*H04R 3/00* (2006.01)

(52) U.S. Cl.
CPC .. *G10L 2015/223* (2013.01); *H04R 2227/005* (2013.01); *H04R 2420/07* (2013.01)

(56) References Cited

U.S. PATENT DOCUMENTS 4,941,187 A 7/1990 Slater
4,974,213 A 11/1990 Siwecki
5,036,538 A 7/1991 Oken et al.
5,440,644 A 8/1995 Farinelli et al.
5,452,274 A * 9/1995 Thompson ............ G11B 19/02
5,588,065 A 12/1996 Tanaka et al.
5,717,768 A 2/1998 Laroche
5,740,260 A 4/1998 Odom
5,761,320 A 6/1998 Farinelli et al.
5,857,172 A 1/1999 Rozak
5,923,902 A 7/1999 Inagaki
5,949,414 A 9/1999 Namikata et al.
6,032,202 A 2/2000 Lea et al.
6,070,140 A 5/2000 Tran
6,088,459 A 7/2000 Hobelsberger
6,122,531 A * 9/2000 Nicholls ................. H04B 1/46 704/226
6,219,645 B1 4/2001 Byers
6,256,554 B1 7/2001 DiLorenzo
6,301,603 B1 10/2001 Maher et al.
6,311,157 B1 10/2001 Strong
6,366,886 B1 4/2002 Dragosh et al.
6,404,811 B1 6/2002 Cvetko et al.
6,408,078 B1 6/2002 Hobelsberger
6,469,633 B1 10/2002 Wachter
6,522,886 B1 2/2003 Youngs et al.
6,594,347 B1 7/2003 Calder et al.
6,594,630 B1 7/2003 Zlokarnik et al.
6,611,537 B1 8/2003 Edens et al.
6,611,604 B1 8/2003 Irby et al.
6,631,410 B1 10/2003 Kowalski et al.
6,704,671 B1 3/2004 Umminger, III
6,757,517 B2 6/2004 Chang
6,778,869 B2 8/2004 Champion
6,937,977 B2 8/2005 Gerson
7,099,821 B2 8/2006 Visser et al.
7,103,542 B2 9/2006 Doyle
7,130,608 B2 10/2006 Hollstrom et al.
7,130,616 B2 10/2006 Janik
7,143,939 B2 12/2006 Henzerling
7,174,299 B2 2/2007 Fujii et al.
7,228,275 B1 6/2007 Endo et al.
7,236,773 B2 6/2007 Thomas
7,295,548 B2 11/2007 Blank et al.
7,356,471 B2 4/2008 Ito et al.
7,383,297 B1 6/2008 Atsmon et al.
7,391,791 B2 6/2008 Balassanian et al.
7,483,538 B2 1/2009 McCarty et al.
7,516,068 B1 4/2009 Clark
7,571,014 B1 8/2009 Lambourne et al.
7,577,757 B2 8/2009 Carter et al.
7,630,501 B2 12/2009 Blank et al.
7,643,894 B2 1/2010 Braithwaite et al.
7,657,910 B1 2/2010 McAulay et al.
7,661,107 B1 2/2010 Van et al.
7,702,508 B2 4/2010 Bennett
7,705,565 B2 4/2010 Patino et al.
7,792,311 B1 9/2010 Holmgren et al.
7,853,341 B2 12/2010 McCarty et al.
7,961,892 B2 6/2011 Fedigan
7,987,294 B2 7/2011 Bryce et al.
8,014,423 B2 9/2011 Thaler et al.
8,019,076 B1 9/2011 Lambert
8,032,383 B1 10/2011 Bhardwaj et al.
8,041,565 B1 10/2011 Bhardwaj et al.
8,045,952 B2 10/2011 Qureshey et al.
8,073,125 B2 12/2011 Zhang et al.
8,073,681 B2 12/2011 Baldwin et al.
8,085,947 B2 12/2011 Haulick et al.
8,103,009 B2 1/2012 McCarty et al.
8,136,040 B2 3/2012 Fleming
8,165,867 B1 4/2012 Fish
8,233,632 B1 7/2012 Macdonald et al.
8,234,395 B2 7/2012 Millington
8,239,206 B1 8/2012 LeBeau et al.
8,255,224 B2 8/2012 Singleton et al.
8,284,982 B2 10/2012 Bailey
8,290,603 B1 10/2012 Lambourne
8,325,909 B2 12/2012 Tashev et al.
8,340,975 B1 12/2012 Rosenberger
8,364,481 B2 1/2013 Strope et al.
8,385,557 B2 2/2013 Tashev et al.
8,386,261 B2 2/2013 Mellott et al.
8,386,523 B2 2/2013 Mody et al.
8,423,893 B2 4/2013 Ramsay et al.
8,428,758 B2 4/2013 Naik et al.
8,453,058 B1 5/2013 Coccaro et al.
8,473,618 B2 6/2013 Spear et al.
8,483,853 B1 7/2013 Lambourne
8,484,025 B1 7/2013 Moreno et al.
8,489,398 B1 7/2013 Gruenstein
8,566,722 B2 10/2013 Gordon et al.
8,588,849 B2 11/2013 Patterson et al.
8,594,320 B2 11/2013 Faller
8,600,443 B2 12/2013 Kawaguchi et al.
8,620,232 B2 12/2013 Helsloot
8,639,214 B1 1/2014 Fujisaki
8,676,273 B1 3/2014 Fujisaki
8,710,970 B2 4/2014 Oelrich et al.
8,719,039 B1 5/2014 Sharifi
8,738,925 B1 5/2014 Park et al.
8,762,156 B2 6/2014 Chen
8,768,712 B1 7/2014 Sharifi
8,775,191 B1 7/2014 Sharifi et al.
8,798,995 B1 8/2014 Edara
8,831,761 B2 9/2014 Kemp et al.
8,831,957 B2 9/2014 Taubman et al.
8,848,879 B1 9/2014 Coughlan et al.
8,861,756 B2 10/2014 Zhu et al.
8,874,448 B1 10/2014 Kauffmann et al.
8,898,063 B1 11/2014 Sykes et al.
8,938,394 B1 1/2015 Faaborg et al.
8,942,252 B2 1/2015 Balassanian et al.
8,983,383 B1 3/2015 Haskin
8,983,844 B1 3/2015 Thomas et al.
9,002,024 B2 4/2015 Nakadai et al.
9,015,049 B2 4/2015 Baldwin et al.
9,042,556 B2 5/2015 Kallai et al.
9,047,857 B1 6/2015 Barton
9,060,224 B1 6/2015 List
9,070,367 B1 6/2015 Hoffmeister et al.
9,088,336 B2 7/2015 Mani et al.
9,094,539 B1 7/2015 Noble
9,098,467 B1 8/2015 Blanksteen et al.
9,124,650 B2 9/2015 Maharajh et al.
9,124,711 B2 9/2015 Park et al.
9,148,742 B1 9/2015 Koulomzin et al.
9,183,845 B1 11/2015 Gopalakrishnan et al.
9,190,043 B2 11/2015 Krisch et al.
9,208,785 B2 12/2015 Ben-David et al.
9,215,545 B2 12/2015 Dublin et al.
9,226,088 B2 12/2015 Pandey et al.
9,245,527 B2 1/2016 Lindahl
9,251,793 B2 2/2016 Lebeau et al.
9,253,572 B2 2/2016 Beddingfield, Sr. et al.
9,262,612 B2 2/2016 Cheyer
9,263,042 B1 2/2016 Sharifi
9,275,637 B1 3/2016 Salvador et al.

(56) References Cited

U.S. PATENT DOCUMENTS 9,288,597 B2 3/2016 Carlsson et al.
9,300,266 B2 3/2016 Grokop
9,304,736 B1 4/2016 Whiteley et al.
9,307,321 B1 4/2016 Unruh
9,313,317 B1 4/2016 LeBeau et al.
9,318,107 B1 4/2016 Sharifi
9,319,816 B1 4/2016 Narayanan
9,324,322 B1 4/2016 Torok et al.
9,335,819 B1 5/2016 Jaeger et al.
9,354,687 B2 5/2016 Bansal et al.
9,361,878 B2 6/2016 Boukadakis
9,361,885 B2 6/2016 Ganong, III et al.
9,368,105 B1 6/2016 Freed et al.
9,373,329 B2 6/2016 Strope et al.
9,374,634 B2 6/2016 Macours
9,386,154 B2 7/2016 Baciu et al.
9,390,708 B1 7/2016 Hoffmeister
9,401,058 B2 7/2016 De La Fuente et al.
9,412,392 B2 8/2016 Lindahl et al.
9,426,567 B2 8/2016 Lee et al.
9,431,021 B1 8/2016 Scalise et al.
9,443,516 B2 9/2016 Katuri et al.
9,443,527 B1 9/2016 Watanabe et al.
9,472,201 B1 10/2016 Sleator
9,472,203 B1 10/2016 Ayrapetian et al.
9,484,030 B1 11/2016 Meaney et al.
9,489,948 B1 11/2016 Chu et al.
9,491,033 B1 11/2016 Soyannwo et al.
9,494,683 B1 11/2016 Sadek
9,509,269 B1 11/2016 Rosenberg
9,510,101 B1 11/2016 Polleros
9,514,476 B2 12/2016 Kay et al.
9,514,747 B1 12/2016 Bisani et al.
9,514,752 B2 12/2016 Sharifi
9,516,081 B2 12/2016 Tebbs et al.
9,532,139 B1 12/2016 Lu et al.
9,536,541 B2 1/2017 Chen et al.
9,542,941 B1 1/2017 Weksler et al.
9,548,053 B1 1/2017 Basye et al.
9,548,066 B2 1/2017 Jain et al.
9,552,816 B2 1/2017 Vanlund et al.
9,554,210 B1 1/2017 Ayrapetian et al.
9,558,755 B1 1/2017 Laroche et al.
9,560,441 B1 1/2017 McDonough, Jr. et al.
9,576,591 B2 2/2017 Kim et al.
9,601,116 B2 3/2017 Casado et al.
9,615,170 B2 4/2017 Kirsch et al.
9,615,171 B1 4/2017 O'Neill et al.
9,626,695 B2 4/2017 Balasubramanian et al.
9,632,748 B2 4/2017 Faaborg et al.
9,633,186 B2 4/2017 Ingrassia, Jr. et al.
9,633,368 B2 4/2017 Greenzeiger et al.
9,633,660 B2 4/2017 Haughay et al.
9,633,661 B1 4/2017 Typrin et al.
9,633,671 B2 4/2017 Giacobello et al.
9,633,674 B2 4/2017 Sinha et al.
9,640,179 B1 5/2017 Hart et al.
9,640,183 B2 5/2017 Jung et al.
9,640,194 B1 5/2017 Nemala et al.
9,641,919 B1 5/2017 Poole et al.
9,646,614 B2 5/2017 Bellegarda et al.
9,648,564 B1 5/2017 Cui et al.
9,653,060 B1 5/2017 Hilmes et al.
9,653,075 B1 5/2017 Chen et al.
9,659,555 B1 5/2017 Hilmes et al.
9,672,812 B1 6/2017 Watanabe et al.
9,672,821 B2 6/2017 Krishnaswamy et al.
9,674,587 B2 6/2017 Triplett et al.
9,685,171 B1 6/2017 Yang
9,691,378 B1 6/2017 Meyers et al.
9,691,379 B1 6/2017 Mathias et al.
9,691,384 B1 6/2017 Wang et al.
9,697,826 B2 7/2017 Sainath et al.
9,697,828 B1 7/2017 Prasad et al.
9,698,999 B2 7/2017 Mutagi et al.
9,704,478 B1 7/2017 Vitaladevuni et al.
9,706,320 B2 7/2017 Starobin et al.
9,721,566 B2 8/2017 Newendorp et al.
9,721,568 B1 8/2017 Polansky et al.
9,721,570 B1 8/2017 Beal et al.
9,728,188 B1 8/2017 Rosen et al.
9,734,822 B1 8/2017 Sundaram et al.
9,736,578 B2 8/2017 Iyengar et al.
9,743,204 B1 8/2017 Welch et al.
9,743,207 B1 8/2017 Hartung
9,747,011 B2 8/2017 Lewis et al.
9,747,899 B2 8/2017 Pogue et al.
9,747,920 B2 8/2017 Ayrapetian et al.
9,747,926 B2 8/2017 Sharifi et al.
9,749,738 B1 8/2017 Adsumilli et al.
9,749,760 B2 8/2017 Lambourne
9,754,605 B1 9/2017 Chhetri
9,756,422 B2 9/2017 Paquier et al.
9,762,967 B2 9/2017 Clarke et al.
9,767,786 B2 9/2017 Starobin et al.
9,769,420 B1 9/2017 Moses
9,779,725 B2 10/2017 Sun et al.
9,779,732 B2 10/2017 Lee et al.
9,779,734 B2 10/2017 Lee
9,779,735 B2 10/2017 Civelli et al.
9,781,532 B2 10/2017 Sheen
9,799,330 B2 10/2017 Nemala et al.
9,805,733 B2 10/2017 Park
9,811,314 B2 11/2017 Plagge et al.
9,812,128 B2 11/2017 Mixter et al.
9,813,810 B1 11/2017 Nongpiur
9,813,812 B2 11/2017 Berthelsen et al.
9,818,407 B1 11/2017 Secker-Walker et al.
9,820,036 B1 11/2017 Tritschler et al.
9,820,039 B2 11/2017 Lang
9,826,306 B2 11/2017 Lang
9,865,259 B1 1/2018 Typrin et al.
9,865,264 B2 1/2018 Gelfenbeyn et al.
9,875,740 B1 1/2018 Kumar et al.
9,881,616 B2 1/2018 Beckley et al.
9,898,250 B1 2/2018 Williams et al.
9,899,021 B1 2/2018 Vitaladevuni et al.
9,900,723 B1 2/2018 Choisel et al.
9,916,839 B1 3/2018 Scalise et al.
9,940,930 B1 4/2018 Campbell et al.
9,947,316 B2 4/2018 Millington et al.
9,947,333 B1 4/2018 David
9,972,318 B1 5/2018 Kelly et al.
9,972,343 B1 5/2018 Thorson et al.
9,973,849 B1 5/2018 Zhang et al.
9,979,560 B2 5/2018 Kim et al.
9,992,642 B1 6/2018 Rapp et al.
9,997,151 B1 6/2018 Ayrapetian et al.
10,013,381 B2 7/2018 Mayman et al.
10,013,995 B1 7/2018 Lashkari et al.
10,025,447 B1 7/2018 Dixit et al.
10,026,401 B1 7/2018 Mutagi et al.
10,028,069 B1 7/2018 Lang
10,038,419 B1 7/2018 Elliot et al.
10,048,930 B1 8/2018 Vega et al.
10,049,675 B2 8/2018 Haughay
10,051,366 B1 8/2018 Buoni et al.
10,051,600 B1 8/2018 Zhong et al.
10,057,698 B2 8/2018 Drinkwater et al.
RE47,049 E 9/2018 Zhu et al.
10,068,573 B1 9/2018 Aykac et al.
10,074,369 B2 9/2018 Devaraj et al.
10,074,371 B1 9/2018 Wang et al.
10,079,015 B1 9/2018 Lockhart et al.
10,089,981 B1 10/2018 Elangovan et al.
10,108,393 B2 10/2018 Millington et al.
10,115,400 B2 10/2018 Wilberding
10,116,748 B2 10/2018 Farmer et al.
10,127,908 B1 11/2018 Deller et al.
10,127,911 B2 11/2018 Kim et al.
10,134,388 B1 11/2018 Lilly
10,134,398 B2 11/2018 Sharifi
10,134,399 B2 11/2018 Lang et al.
10,136,204 B1 11/2018 Poole et al.

(56) References Cited

U.S. PATENT DOCUMENTS 10,152,969 B2 12/2018 Reilly et al.
10,157,042 B1 12/2018 Jayakumar et al.
10,181,323 B2 1/2019 Beckhardt et al.
10,186,265 B1 1/2019 Lockhart et al.
10,186,266 B1 1/2019 Devaraj et al.
10,186,276 B2 1/2019 Dewasurendra et al.
10,192,546 B1 1/2019 Piersol et al.
10,204,624 B1 2/2019 Knudson et al.
10,224,056 B1 3/2019 Torok et al.
10,225,651 B2 3/2019 Lang
10,229,680 B1 3/2019 Gillespie et al.
10,241,754 B1 3/2019 Kadarundalagi Raghuram Doss et al.
10,248,376 B2 4/2019 Keyser-Allen et al.
10,249,205 B2 4/2019 Hammersley et al.
10,276,161 B2 4/2019 Hughes et al.
10,297,256 B2 5/2019 Reilly et al.
10,304,440 B1 5/2019 Panchapagesan et al.
10,304,475 B1 5/2019 Wang et al.
10,318,236 B1 6/2019 Pal et al.
10,332,508 B1 6/2019 Hoffmeister
10,339,917 B2 7/2019 Aleksic et al.
10,339,957 B1 7/2019 Chenier et al.
10,346,122 B1 7/2019 Morgan
10,354,650 B2 7/2019 Gruenstein et al.
10,354,658 B2 7/2019 Wilberding
10,365,887 B1 7/2019 Mulherkar
10,365,889 B2 7/2019 Plagge et al.
10,366,688 B2 7/2019 Gunn et al.
10,366,699 B1 7/2019 Dharia et al.
10,374,816 B1 8/2019 Leblang et al.
10,381,001 B2 8/2019 Gunn et al.
10,381,002 B2 8/2019 Gunn et al.
10,381,003 B2 8/2019 Wakisaka et al.
10,388,272 B1 8/2019 Thomson et al.
10,424,296 B2 9/2019 Penilla et al.
10,433,058 B1 10/2019 Torgerson et al.
10,445,057 B2 10/2019 Vega et al.
10,445,365 B2 10/2019 Luke et al.
10,469,966 B2 11/2019 Lambourne
10,482,899 B2 11/2019 Ramprashad et al.
10,499,146 B2 12/2019 Lang et al.
10,510,340 B1 12/2019 Fu et al.
10,510,362 B2 12/2019 Hicks et al.
10,511,904 B2 12/2019 Buoni et al.
10,515,625 B1 12/2019 Metallinou et al.
10,522,146 B1 12/2019 Tushinskiy
10,546,583 B2 1/2020 White et al.
10,565,998 B2 2/2020 Wilberding
10,565,999 B2 2/2020 Wilberding
10,567,515 B1 2/2020 Bao
10,573,312 B1 2/2020 Thomson et al.
10,573,321 B1 2/2020 Smith et al.
10,580,405 B1 3/2020 Wang et al.
10,586,534 B1 3/2020 Argyropoulos et al.
10,586,540 B1 3/2020 Smith et al.
10,593,328 B1 3/2020 Wang et al.
10,593,330 B2 3/2020 Sharifi
10,599,287 B2 3/2020 Kumar et al.
10,600,406 B1 3/2020 Shapiro et al.
10,602,268 B1 3/2020 Soto
10,614,807 B2 4/2020 Beckhardt et al.
10,621,981 B2 4/2020 Sereshki
10,622,009 B1 4/2020 Zhang et al.
10,623,811 B1 4/2020 Cwik
10,624,612 B2 4/2020 Sumi et al.
10,643,609 B1 5/2020 Pogue et al.
10,645,130 B2 5/2020 Corbin et al.
10,672,383 B1 6/2020 Thomson et al.
10,679,625 B1 6/2020 Lockhart et al.
10,681,460 B2 6/2020 Woo et al.
10,685,669 B1 6/2020 Lan et al.
10,694,608 B2 6/2020 Baker et al.
10,699,711 B2 6/2020 Reilly
10,706,843 B1 7/2020 Elangovan et al.
10,712,997 B2 7/2020 Wilberding et al.
10,720,173 B2 7/2020 Freeman et al.
10,728,196 B2 7/2020 Wang
10,735,870 B2 8/2020 Ballande et al.
10,740,065 B2 8/2020 Jarvis et al.
10,746,840 B1 8/2020 Barton et al.
10,748,531 B2 8/2020 Kim
10,762,896 B1 9/2020 Yavagal et al.
10,777,189 B1 9/2020 Fu et al.
10,777,203 B1 9/2020 Pasko
10,789,041 B2 9/2020 Kim et al.
10,797,667 B2 10/2020 Fish et al.
10,824,682 B2 11/2020 Alvares et al.
10,825,471 B2 11/2020 Walley et al.
10,837,667 B2 11/2020 Nelson et al.
10,847,137 B1 11/2020 Mandal et al.
10,847,143 B2 11/2020 Millington et al.
10,847,149 B1 11/2020 Mok et al.
10,847,164 B2 11/2020 Wilberding
10,848,885 B2 11/2020 Lambourne
RE48,371 E 12/2020 Zhu et al.
10,867,596 B2 12/2020 Yoneda et al.
10,867,604 B2 12/2020 Smith et al.
10,871,943 B1 12/2020 D'Amato
10,878,811 B2 12/2020 Smith et al.
10,878,826 B2 12/2020 Li et al.
10,885,091 B1 1/2021 Meng et al.
10,897,679 B2 1/2021 Lambourne
10,911,596 B1 2/2021 Do et al.
10,943,598 B2 3/2021 Singh et al.
10,964,314 B2 3/2021 Jazi et al.
10,971,158 B1 4/2021 Patangay et al.
11,024,311 B2 6/2021 Mixter et al.
11,025,569 B2 6/2021 Lind et al.
11,050,615 B2 6/2021 Mathews et al.
11,062,705 B2 7/2021 Watanabe et al.
11,095,978 B2 8/2021 Gigandet et al.
11,100,923 B2 8/2021 Fainberg et al.
11,127,405 B1 9/2021 Antos et al.
11,137,979 B2 10/2021 Plagge
11,138,969 B2 10/2021 D'Amato
11,140,494 B2 10/2021 Pedersen et al.
11,159,878 B1 10/2021 Chatlani et al.
11,172,328 B2 11/2021 Soto et al.
11,172,329 B2 11/2021 Soto et al.
11,175,880 B2 11/2021 Liu et al.
11,184,704 B2 11/2021 Jarvis et al.
11,184,969 B2 11/2021 Lang
11,189,284 B2 11/2021 Maeng
11,206,052 B1 12/2021 Park et al.
11,212,612 B2 12/2021 Lang et al.
11,264,019 B2 3/2022 Bhattacharya et al.
11,277,512 B1 3/2022 Leeds et al.
11,302,326 B2 4/2022 Sereshki
11,315,556 B2 4/2022 Smith et al.
11,354,092 B2 6/2022 D'Amato
11,361,763 B1 6/2022 Maas et al.
11,373,645 B1 6/2022 Mathew et al.
11,388,532 B2 7/2022 Lambourne
11,411,763 B2 8/2022 Mackay et al.
11,445,301 B2 9/2022 Park et al.
11,475,899 B2 10/2022 Lesso
11,514,898 B2 11/2022 Millington
11,531,520 B2 12/2022 Wilberding
11,532,306 B2 12/2022 Kim et al.
11,580,969 B2 2/2023 Han et al.
11,646,023 B2 5/2023 Smith
11,664,023 B2 5/2023 Reilly
11,688,419 B2 6/2023 Sereshki
11,694,689 B2 7/2023 Smith
11,709,653 B1 7/2023 Shin
11,714,600 B2 8/2023 D'Amato
11,727,936 B2 8/2023 Smith
11,769,505 B2 9/2023 Sereshki
11,790,937 B2 10/2023 Smith et al.
11,817,076 B2 11/2023 Sereshki et al.
2001/0003173 A1 6/2001 Lim
2001/0042107 A1 11/2001 Palm
2002/0022453 A1 2/2002 Balog et al.

(56) References Cited

U.S. PATENT DOCUMENTS

2002/0026442 A1 2/2002 Lipscomb et al.
2002/0034280 A1 3/2002 Infosino
2002/0046023 A1 4/2002 Fujii et al.
2002/0054685 A1 5/2002 Avendano et al.
2002/0055950 A1 5/2002 Witteman
2002/0072816 A1 6/2002 Shdema et al.
2002/0116196 A1 8/2002 Tran
2002/0124097 A1 9/2002 Isely et al.
2002/0143532 A1 10/2002 McLean et al.
2003/0015354 A1 1/2003 Edwards et al.
2003/0038848 A1 2/2003 Lee et al.
2003/0040908 A1 2/2003 Yang et al.
2003/0070182 A1 4/2003 Pierre et al.
2003/0070869 A1 4/2003 Hlibowicki
2003/0072462 A1 4/2003 Hlibowicki
2003/0095672 A1 5/2003 Hobelsberger
2003/0097482 A1 5/2003 DeHart et al.
2003/0130850 A1 7/2003 Badt et al.
2003/0157951 A1 8/2003 Hasty, Jr.
2003/0235244 A1 12/2003 Pessoa et al.
2004/0024478 A1 2/2004 Hans et al.
2004/0093219 A1 5/2004 Shin et al.
2004/0105566 A1 6/2004 Matsunaga et al.
2004/0127241 A1 7/2004 Shostak
2004/0128135 A1 7/2004 Anastasakos et al.
2004/0153321 A1 8/2004 Chung et al.
2004/0161082 A1 8/2004 Brown et al.
2004/0234088 A1 11/2004 McCarty et al.
2005/0031131 A1 2/2005 Browning et al.
2005/0031132 A1 2/2005 Browning et al.
2005/0031133 A1 2/2005 Browning et al.
2005/0031134 A1 2/2005 Leske
2005/0031137 A1 2/2005 Browning et al.
2005/0031138 A1 2/2005 Browning et al.
2005/0031139 A1 2/2005 Browning et al.
2005/0031140 A1 2/2005 Browning
2005/0033582 A1 2/2005 Gadd et al.
2005/0047606 A1 3/2005 Lee et al.
2005/0077843 A1 4/2005 Benditt
2005/0131558 A1 6/2005 Braithwaite et al.
2005/0164664 A1 7/2005 DiFonzo et al.
2005/0195988 A1 9/2005 Tashev et al.
2005/0201254 A1 9/2005 Looney et al.
2005/0207584 A1 9/2005 Bright
2005/0235334 A1 10/2005 Togashi et al.
2005/0254662 A1 11/2005 Blank et al.
2005/0268234 A1 12/2005 Rossi et al.
2005/0283330 A1 12/2005 Laraia et al.
2005/0283475 A1 12/2005 Beranek et al.
2006/0004834 A1 1/2006 Pyhalammi et al.
2006/0023945 A1 2/2006 King et al.
2006/0041431 A1 2/2006 Maes
2006/0093128 A1 5/2006 Oxford
2006/0104451 A1 5/2006 Browning et al.
2006/0104454 A1 5/2006 Guitarte Perez et al.
2006/0147058 A1 7/2006 Wang
2006/0161964 A1 7/2006 Chung
2006/0190269 A1 8/2006 Tessel et al.
2006/0190968 A1 8/2006 Jung et al.
2006/0247913 A1 11/2006 Huerta et al.
2006/0262943 A1 11/2006 Oxford
2007/0018844 A1 1/2007 Sutardja
2007/0019815 A1 1/2007 Asada et al.
2007/0033043 A1 2/2007 Hyakumoto
2007/0038461 A1 2/2007 Abbott et al.
2007/0038999 A1 2/2007 Millington
2007/0060054 A1 3/2007 Romesburg
2007/0071206 A1 3/2007 Gainsboro et al.
2007/0071255 A1 3/2007 Schobben
2007/0076131 A1 4/2007 Li et al.
2007/0076906 A1 4/2007 Takagi et al.
2007/0087686 A1* 4/2007 Holm ........................ H04S 7/30
455/3.06
2007/0140058 A1 6/2007 McIntosh et al.
2007/0140521 A1 6/2007 Mitobe et al.
2007/0142944 A1 6/2007 Goldberg et al.
2007/0147651 A1 6/2007 Mitobe et al.
2007/0201639 A1 8/2007 Park et al.
2007/0254604 A1 11/2007 Kim
2007/0286426 A1 12/2007 Xiang et al.
2008/0008333 A1 1/2008 Nishikawa et al.
2008/0031466 A1 2/2008 Buck et al.
2008/0037814 A1 2/2008 Shau
2008/0090537 A1 4/2008 Sutardja
2008/0090617 A1 4/2008 Sutardja
2008/0144858 A1 6/2008 Khawand et al.
2008/0146289 A1 6/2008 Korneluk et al.
2008/0160977 A1 7/2008 Ahmaniemi et al.
2008/0182518 A1 7/2008 Lo
2008/0192946 A1 8/2008 Faller
2008/0205647 A1* 8/2008 Zhang ..................... G06F 21/10
380/258
2008/0207115 A1 8/2008 Lee et al.
2008/0208594 A1 8/2008 Cross et al.
2008/0221897 A1 9/2008 Cerra et al.
2008/0247530 A1 10/2008 Barton et al.
2008/0248797 A1 10/2008 Freeman et al.
2008/0291896 A1 11/2008 Tuubel et al.
2008/0291916 A1 11/2008 Xiong et al.
2008/0301729 A1 12/2008 Broos et al.
2009/0003620 A1 1/2009 McKillop et al.
2009/0005893 A1 1/2009 Sugii et al.
2009/0010445 A1 1/2009 Matsuo
2009/0013255 A1 1/2009 Yuschik et al.
2009/0018828 A1 1/2009 Nakadai et al.
2009/0043206 A1 2/2009 Towfiq et al.
2009/0046866 A1 2/2009 Feng et al.
2009/0052688 A1 2/2009 Ishibashi et al.
2009/0076821 A1 3/2009 Brenner et al.
2009/0113053 A1 4/2009 Van Wie et al.
2009/0153289 A1 6/2009 Hope et al.
2009/0191854 A1 7/2009 Beason
2009/0197524 A1 8/2009 Haff et al.
2009/0214048 A1 8/2009 Stokes, III et al.
2009/0220107 A1 9/2009 Every et al.
2009/0228919 A1 9/2009 Zott et al.
2009/0238377 A1 9/2009 Ramakrishnan et al.
2009/0238386 A1 9/2009 Usher et al.
2009/0248397 A1 10/2009 Garcia et al.
2009/0249222 A1 10/2009 Schmidt et al.
2009/0264072 A1 10/2009 Dai
2009/0299745 A1 12/2009 Kennewick et al.
2009/0323907 A1 12/2009 Gupta et al.
2009/0323924 A1 12/2009 Tashev et al.
2009/0326949 A1 12/2009 Douthitt et al.
2010/0014690 A1 1/2010 Wolff et al.
2010/0023638 A1 1/2010 Bowman
2010/0035593 A1 2/2010 Franco et al.
2010/0041443 A1 2/2010 Yokota
2010/0070276 A1 3/2010 Wasserblat et al.
2010/0070922 A1 3/2010 DeMaio et al.
2010/0075723 A1* 3/2010 Min .................... H04M 1/6058
455/569.1
2010/0088100 A1 4/2010 Lindahl
2010/0092004 A1 4/2010 Kuze
2010/0161335 A1 6/2010 Whynot
2010/0172516 A1 7/2010 Lastrucci
2010/0178873 A1 7/2010 Lee et al.
2010/0179806 A1 7/2010 Zhang et al.
2010/0179874 A1 7/2010 Higgins et al.
2010/0185448 A1 7/2010 Meisel
2010/0211199 A1 8/2010 Naik et al.
2010/0260348 A1 10/2010 Bhow et al.
2010/0278351 A1 11/2010 Fozunbal et al.
2010/0299639 A1 11/2010 Ramsay et al.
2010/0329472 A1 12/2010 Nakadai et al.
2010/0332236 A1 12/2010 Tan
2011/0019833 A1 1/2011 Kuech et al.
2011/0033059 A1 2/2011 Bhaskar et al.
2011/0035580 A1 2/2011 Wang et al.
2011/0044461 A1 2/2011 Kuech et al.
2011/0044489 A1 2/2011 Saiki et al.
2011/0046952 A1 2/2011 Koshinaka
2011/0066634 A1 3/2011 Phillips et al.

(56) References Cited

U.S. PATENT DOCUMENTS

2011/0091055 A1 4/2011 Leblanc
2011/0103615 A1 5/2011 Sun
2011/0131032 A1 6/2011 Yang, II et al.
2011/0145581 A1 6/2011 Malhotra et al.
2011/0170707 A1 7/2011 Yamada et al.
2011/0176687 A1 7/2011 Birkenes
2011/0182436 A1 7/2011 Murgia et al.
2011/0202924 A1 8/2011 Banguero et al.
2011/0218656 A1 9/2011 Bishop et al.
2011/0267985 A1 11/2011 Wilkinson et al.
2011/0276333 A1 11/2011 Wang et al.
2011/0280422 A1 11/2011 Neumeyer et al.
2011/0285808 A1 11/2011 Feng et al.
2011/0289506 A1 11/2011 Trivi et al.
2011/0299706 A1 12/2011 Sakai
2012/0009906 A1 1/2012 Patterson et al.
2012/0020485 A1 1/2012 Visser et al.
2012/0020486 A1 1/2012 Fried et al.
2012/0022863 A1 1/2012 Cho et al.
2012/0022864 A1 1/2012 Leman et al.
2012/0027218 A1 2/2012 Every et al.
2012/0076308 A1 3/2012 Kuech et al.
2012/0078635 A1 3/2012 Rothkopf et al.
2012/0086568 A1 4/2012 Scott et al.
2012/0123268 A1 5/2012 Tanaka et al.
2012/0128160 A1 5/2012 Kim et al.
2012/0131125 A1 5/2012 Seidel et al.
2012/0148075 A1 6/2012 Goh et al.
2012/0162540 A1 6/2012 Ouchi et al.
2012/0163603 A1 6/2012 Abe et al.
2012/0177215 A1 7/2012 Bose et al.
2012/0183149 A1 7/2012 Hiroe
2012/0224457 A1 9/2012 Kim et al.
2012/0224715 A1 9/2012 Kikkeri
2012/0237047 A1 9/2012 Neal et al.
2012/0245941 A1 9/2012 Cheyer
2012/0265528 A1 10/2012 Gruber et al.
2012/0288100 A1 11/2012 Cho
2012/0297284 A1 11/2012 Matthews, III et al.
2012/0308044 A1 12/2012 Vander et al.
2012/0308046 A1 12/2012 Muza
2013/0006453 A1 1/2013 Wang et al.
2013/0024018 A1 1/2013 Chang et al.
2013/0034241 A1 2/2013 Pandey et al.
2013/0039527 A1 2/2013 Jensen et al.
2013/0051755 A1 2/2013 Brown et al.
2013/0058492 A1 3/2013 Silzle et al.
2013/0066453 A1 3/2013 Seefeldt
2013/0073293 A1 3/2013 Jang et al.
2013/0080146 A1 3/2013 Kato et al.
2013/0080167 A1 3/2013 Mozer
2013/0080171 A1 3/2013 Mozer et al.
2013/0124211 A1 5/2013 McDonough
2013/0129100 A1 5/2013 Sorensen
2013/0148821 A1 6/2013 Sorensen
2013/0170647 A1 7/2013 Reilly et al.
2013/0171930 A1 7/2013 Anand et al.
2013/0179173 A1 7/2013 Lee et al.
2013/0183944 A1 7/2013 Mozer et al.
2013/0185639 A1 7/2013 Lim
2013/0191119 A1 7/2013 Sugiyama
2013/0191122 A1 7/2013 Mason
2013/0198298 A1 8/2013 Li et al.
2013/0211826 A1 8/2013 Mannby
2013/0216056 A1 8/2013 Thyssen
2013/0230184 A1 9/2013 Kuech et al.
2013/0238326 A1 9/2013 Kim et al.
2013/0262101 A1 10/2013 Srinivasan
2013/0283169 A1 10/2013 Van Wie
2013/0289994 A1 10/2013 Newman et al.
2013/0294611 A1 11/2013 Yoo et al.
2013/0301840 A1 11/2013 Yemdji et al.
2013/0315420 A1 11/2013 You
2013/0317635 A1 11/2013 Bates et al.
2013/0322462 A1 12/2013 Poulsen
2013/0322634 A1 12/2013 Bennett et al.
2013/0322665 A1 12/2013 Bennett et al.
2013/0324031 A1 12/2013 Loureiro
2013/0329896 A1 12/2013 Krishnaswamy et al.
2013/0331970 A1 12/2013 Beckhardt et al.
2013/0332165 A1 12/2013 Beckley et al.
2013/0336499 A1 12/2013 Beckhardt et al.
2013/0339028 A1 12/2013 Rosner et al.
2013/0343567 A1 12/2013 Triplett et al.
2014/0003611 A1 1/2014 Mohammad et al.
2014/0003625 A1 1/2014 Sheen et al.
2014/0003635 A1 1/2014 Mohammad et al.
2014/0005813 A1 1/2014 Reimann
2014/0006026 A1 1/2014 Lamb et al.
2014/0006825 A1 1/2014 Shenhav
2014/0019743 A1 1/2014 DeLuca
2014/0034929 A1 2/2014 Hamada et al.
2014/0046464 A1 2/2014 Reimann
2014/0056435 A1 2/2014 Kjems et al.
2014/0064476 A1 3/2014 Mani et al.
2014/0064501 A1 3/2014 Olsen et al.
2014/0073298 A1 3/2014 Rossmann
2014/0075306 A1 3/2014 Rega
2014/0075311 A1 3/2014 Boettcher et al.
2014/0094151 A1 4/2014 Klappert et al.
2014/0100854 A1 4/2014 Chen et al.
2014/0108010 A1 4/2014 Maltseff et al.
2014/0109138 A1 4/2014 Cannistraro et al.
2014/0122075 A1 5/2014 Bak et al.
2014/0122092 A1 5/2014 Goldstein
2014/0126745 A1 5/2014 Dickins et al.
2014/0136195 A1 5/2014 Abdossalami et al.
2014/0145168 A1 5/2014 Ohsawa et al.
2014/0146983 A1 5/2014 Kim et al.
2014/0149118 A1 5/2014 Lee et al.
2014/0159581 A1 6/2014 Pruemmer et al.
2014/0161263 A1 6/2014 Koishida et al.
2014/0163978 A1 6/2014 Basye et al.
2014/0164400 A1 6/2014 Kruglick
2014/0167929 A1 6/2014 Shim et al.
2014/0167931 A1 6/2014 Lee et al.
2014/0168344 A1 6/2014 Shoemake et al.
2014/0172899 A1 6/2014 Hakkani-Tur et al.
2014/0172953 A1 6/2014 Blanksteen
2014/0181199 A1 6/2014 Kumar et al.
2014/0181271 A1 6/2014 Millington
2014/0188476 A1 7/2014 Li et al.
2014/0192986 A1 7/2014 Lee et al.
2014/0195252 A1 7/2014 Gruber et al.
2014/0200881 A1 7/2014 Chatlani
2014/0207457 A1 7/2014 Biatov et al.
2014/0214429 A1 7/2014 Pantel
2014/0215332 A1 7/2014 Lee et al.
2014/0219472 A1 8/2014 Huang et al.
2014/0222436 A1 8/2014 Binder et al.
2014/0229184 A1 8/2014 Shires
2014/0229959 A1 8/2014 Beckhardt et al.
2014/0244013 A1 8/2014 Reilly
2014/0244269 A1 8/2014 Tokutake
2014/0244712 A1 8/2014 Walters et al.
2014/0249817 A1 9/2014 Hart et al.
2014/0252386 A1 9/2014 Ito et al.
2014/0253676 A1 9/2014 Nagase et al.
2014/0254805 A1 9/2014 Su et al.
2014/0258292 A1 9/2014 Thramann et al.
2014/0259075 A1 9/2014 Chang et al.
2014/0269757 A1 9/2014 Park et al.
2014/0270216 A1 9/2014 Tsilfidis et al.
2014/0270282 A1 9/2014 Tammi et al.
2014/0274185 A1 9/2014 Luna et al.
2014/0274203 A1 9/2014 Ganong, III et al.
2014/0274218 A1 9/2014 Kadiwala et al.
2014/0277650 A1 9/2014 Zurek et al.
2014/0278343 A1 9/2014 Tran
2014/0278372 A1 9/2014 Nakadai et al.
2014/0278445 A1 9/2014 Eddington, Jr.
2014/0278933 A1 9/2014 McMillan
2014/0288686 A1 9/2014 Sant et al.
2014/0291642 A1 10/2014 Watabe et al.

(56) References Cited

U.S. PATENT DOCUMENTS

2014/0303969 A1 10/2014 Inose et al.
2014/0310002 A1 10/2014 Nitz et al.
2014/0310614 A1 10/2014 Jones
2014/0324203 A1 10/2014 Coburn, IV et al.
2014/0328490 A1 11/2014 Mohammad et al.
2014/0330896 A1 11/2014 Addala et al.
2014/0334645 A1 11/2014 Yun et al.
2014/0340888 A1 11/2014 Ishisone et al.
2014/0357248 A1 12/2014 Tonshal et al.
2014/0358535 A1 12/2014 Lee et al.
2014/0363022 A1 12/2014 Dizon et al.
2014/0363024 A1 12/2014 Apodaca
2014/0364089 A1 12/2014 Lienhart et al.
2014/0365225 A1 12/2014 Haiut
2014/0365227 A1 12/2014 Cash et al.
2014/0368734 A1 12/2014 Hoffert et al.
2014/0369491 A1 12/2014 Kloberdans et al.
2014/0372109 A1 12/2014 Iyer et al.
2015/0006176 A1 1/2015 Pogue et al.
2015/0006184 A1 1/2015 Marti et al.
2015/0010169 A1 1/2015 Popova et al.
2015/0014680 A1 1/2015 Yamazaki et al.
2015/0016642 A1 1/2015 Walsh et al.
2015/0018992 A1 1/2015 Griffiths et al.
2015/0019201 A1 1/2015 Schoenbach
2015/0019219 A1 1/2015 Tzirkel-Hancock et al.
2015/0030172 A1 1/2015 Gaensler et al.
2015/0032443 A1 1/2015 Karov et al.
2015/0032456 A1 1/2015 Wait
2015/0036831 A1 2/2015 Klippel
2015/0039303 A1 2/2015 Lesso et al.
2015/0039310 A1 2/2015 Clark et al.
2015/0039311 A1 2/2015 Clark et al.
2015/0039317 A1 2/2015 Klein et al.
2015/0058018 A1 2/2015 Georges et al.
2015/0063580 A1 3/2015 Huang et al.
2015/0066479 A1 3/2015 Pasupalak et al.
2015/0073807 A1 3/2015 Kumar
2015/0086034 A1 3/2015 Lombardi et al.
2015/0088500 A1 3/2015 Conliffe
2015/0091709 A1 4/2015 Reichert et al.
2015/0092947 A1 4/2015 Gossain et al.
2015/0104037 A1 4/2015 Lee et al.
2015/0106085 A1 4/2015 Lindahl
2015/0110294 A1 4/2015 Chen et al.
2015/0112672 A1 4/2015 Giacobello et al.
2015/0112689 A1 4/2015 Nandy et al.
2015/0124975 A1 5/2015 Pontoppidan
2015/0126255 A1 5/2015 Yang et al.
2015/0128065 A1 5/2015 Torii et al.
2015/0134456 A1 5/2015 Baldwin
2015/0154953 A1 6/2015 Bapat et al.
2015/0154954 A1 6/2015 Sharifi
2015/0154976 A1 6/2015 Mutagi
2015/0161990 A1 6/2015 Sharifi
2015/0169279 A1 6/2015 Duga
2015/0170645 A1 6/2015 Di et al.
2015/0170665 A1 6/2015 Gundeti et al.
2015/0172843 A1 6/2015 Quan
2015/0179181 A1 6/2015 Morris et al.
2015/0180432 A1 6/2015 Gao et al.
2015/0181318 A1 6/2015 Gautama et al.
2015/0189438 A1 7/2015 Hampiholi et al.
2015/0200454 A1 7/2015 Heusdens et al.
2015/0200923 A1 7/2015 Triplett
2015/0201271 A1 7/2015 Diethorn et al.
2015/0215382 A1 7/2015 Arora et al.
2015/0221307 A1 8/2015 Shah et al.
2015/0221678 A1 8/2015 Yamazaki et al.
2015/0222563 A1 8/2015 Burns et al.
2015/0222987 A1 8/2015 Angel, Jr. et al.
2015/0228274 A1 8/2015 Leppanen et al.
2015/0228803 A1 8/2015 Koezuka et al.
2015/0237406 A1 8/2015 Ochoa et al.
2015/0243287 A1 8/2015 Nakano et al.
2015/0245152 A1 8/2015 Ding et al.
2015/0245154 A1 8/2015 Dadu et al.
2015/0248885 A1 9/2015 Koulomzin
2015/0249889 A1 9/2015 Iyer et al.
2015/0253292 A1 9/2015 Larkin et al.
2015/0253960 A1 9/2015 Lin et al.
2015/0254057 A1 9/2015 Klein et al.
2015/0263174 A1 9/2015 Yamazaki et al.
2015/0271593 A1 9/2015 Sun et al.
2015/0277846 A1 10/2015 Yen et al.
2015/0279351 A1 10/2015 Nguyen et al.
2015/0280676 A1 10/2015 Holman et al.
2015/0296299 A1 10/2015 Klippel et al.
2015/0302856 A1 10/2015 Kim et al.
2015/0319529 A1 11/2015 Klippel
2015/0325267 A1 11/2015 Lee et al.
2015/0331663 A1 11/2015 Beckhardt et al.
2015/0334471 A1 11/2015 Innes et al.
2015/0338917 A1 11/2015 Steiner et al.
2015/0341406 A1 11/2015 Rockefeller et al.
2015/0346845 A1 12/2015 Di et al.
2015/0348548 A1 12/2015 Piernot et al.
2015/0348551 A1 12/2015 Gruber et al.
2015/0355878 A1 12/2015 Corbin
2015/0356968 A1 12/2015 Rice et al.
2015/0363061 A1 12/2015 De, III et al.
2015/0363401 A1 12/2015 Chen et al.
2015/0370531 A1 12/2015 Faaborg
2015/0371657 A1 12/2015 Gao
2015/0371659 A1 12/2015 Gao
2015/0371664 A1 12/2015 Bar-Or et al.
2015/0373100 A1 12/2015 Kravets et al.
2015/0380010 A1 12/2015 Srinivasan
2015/0382047 A1 12/2015 Van Os et al.
2015/0382128 A1 12/2015 Ridihalgh et al.
2016/0007116 A1 1/2016 Holman
2016/0014536 A1 1/2016 Sheen
2016/0018873 A1 1/2016 Fernald et al.
2016/0021458 A1 1/2016 Johnson et al.
2016/0026428 A1 1/2016 Morganstern et al.
2016/0027440 A1 1/2016 Gelfenbeyn et al.
2016/0029142 A1 1/2016 Isaac et al.
2016/0034448 A1 2/2016 Tran
2016/0035321 A1 2/2016 Cho et al.
2016/0035337 A1 2/2016 Aggarwal et al.
2016/0036962 A1 2/2016 Rand et al.
2016/0042748 A1 2/2016 Jain et al.
2016/0044151 A1 2/2016 Shoemaker et al.
2016/0050488 A1 2/2016 Matheja et al.
2016/0055847 A1 2/2016 Dahan
2016/0055850 A1 2/2016 Nakadai et al.
2016/0057522 A1 2/2016 Choisel et al.
2016/0066087 A1 3/2016 Solbach et al.
2016/0070526 A1 3/2016 Sheen
2016/0072804 A1 3/2016 Chien et al.
2016/0077710 A1 3/2016 Lewis et al.
2016/0077794 A1 3/2016 Kim et al.
2016/0078864 A1 3/2016 Palanisamy et al.
2016/0086609 A1 3/2016 Yue et al.
2016/0088036 A1 3/2016 Corbin et al.
2016/0088392 A1 3/2016 Huttunen et al.
2016/0093281 A1 3/2016 Kuo et al.
2016/0093304 A1 3/2016 Kim et al.
2016/0094718 A1 3/2016 Mani et al.
2016/0094917 A1 3/2016 Wilk et al.
2016/0098393 A1 4/2016 Hebert
2016/0098992 A1 4/2016 Renard et al.
2016/0103653 A1 4/2016 Jang
2016/0104480 A1 4/2016 Sharifi
2016/0111110 A1 4/2016 Gautama et al.
2016/0118048 A1 4/2016 Heide
2016/0125876 A1 5/2016 Schroeter et al.
2016/0127780 A1 5/2016 Roberts et al.
2016/0133259 A1 5/2016 Rubin et al.
2016/0134924 A1 5/2016 Bush et al.
2016/0134966 A1 5/2016 Fitzgerald et al.
2016/0134982 A1 5/2016 Iyer
2016/0140957 A1 5/2016 Duta et al.
2016/0148612 A1 5/2016 Guo et al.

(56) References Cited

U.S. PATENT DOCUMENTS

2016/0148615 A1 5/2016 Lee et al.
2016/0154089 A1 6/2016 Altman
2016/0155442 A1 6/2016 Kannan et al.
2016/0155443 A1 6/2016 Khan et al.
2016/0157035 A1 6/2016 Russell et al.
2016/0162469 A1 6/2016 Santos
2016/0171976 A1 6/2016 Sun et al.
2016/0173578 A1 6/2016 Sharma et al.
2016/0173983 A1 6/2016 Berthelsen et al.
2016/0180853 A1 6/2016 Vanlund et al.
2016/0189716 A1 6/2016 Lindahl et al.
2016/0192099 A1 6/2016 Oishi et al.
2016/0196499 A1 7/2016 Khan et al.
2016/0203331 A1 7/2016 Khan et al.
2016/0210110 A1 7/2016 Feldman
2016/0212488 A1 7/2016 Os et al.
2016/0212538 A1 7/2016 Fullam et al.
2016/0216938 A1 7/2016 Millington
2016/0217789 A1 7/2016 Lee et al.
2016/0225385 A1 8/2016 Hammarqvist
2016/0232451 A1 8/2016 Scherzer
2016/0234204 A1 8/2016 Rishi et al.
2016/0239255 A1 8/2016 Chavez et al.
2016/0240192 A1 8/2016 Raghuvir
2016/0241976 A1 8/2016 Pearson
2016/0253050 A1 9/2016 Mishra et al.
2016/0260431 A1 9/2016 Newendorp et al.
2016/0283841 A1 9/2016 Sainath et al.
2016/0299737 A1 10/2016 Clayton et al.
2016/0302018 A1 10/2016 Russell et al.
2016/0314782 A1 10/2016 Klimanis
2016/0316293 A1 10/2016 Klimanis
2016/0322045 A1 11/2016 Hatfield et al.
2016/0335485 A1 11/2016 Kim
2016/0336519 A1 11/2016 Seo et al.
2016/0343866 A1 11/2016 Koezuka et al.
2016/0343949 A1 11/2016 Seo et al.
2016/0343954 A1 11/2016 Seo et al.
2016/0345114 A1 11/2016 Hanna et al.
2016/0352915 A1 12/2016 Gautama
2016/0353217 A1 12/2016 Starobin et al.
2016/0353218 A1 12/2016 Starobin et al.
2016/0357503 A1 12/2016 Triplett et al.
2016/0364206 A1 12/2016 Keyser-Allen et al.
2016/0366515 A1 12/2016 Mendes et al.
2016/0372113 A1 12/2016 David et al.
2016/0372688 A1 12/2016 Seo et al.
2016/0373269 A1 12/2016 Okubo et al.
2016/0373909 A1 12/2016 Rasmussen et al.
2016/0379634 A1 12/2016 Yamamoto et al.
2016/0379635 A1 12/2016 Page
2017/0003931 A1 1/2017 Dvortsov et al.
2017/0012207 A1 1/2017 Seo et al.
2017/0012232 A1 1/2017 Kataishi et al.
2017/0019732 A1 1/2017 Mendes et al.
2017/0025124 A1 1/2017 Mixter et al.
2017/0025615 A1 1/2017 Seo et al.
2017/0025630 A1 1/2017 Seo et al.
2017/0026769 A1 1/2017 Patel
2017/0032244 A1 2/2017 Kurata
2017/0034263 A1 2/2017 Archambault et al.
2017/0039025 A1 2/2017 Kielak
2017/0040002 A1 2/2017 Basson et al.
2017/0040018 A1 2/2017 Tormey
2017/0041724 A1 2/2017 Master et al.
2017/0053648 A1 2/2017 Chi
2017/0053650 A1 2/2017 Ogawa
2017/0060526 A1 3/2017 Barton et al.
2017/0062734 A1 3/2017 Suzuki et al.
2017/0070478 A1 3/2017 Park et al.
2017/0076212 A1 3/2017 Shams et al.
2017/0076720 A1 3/2017 Gopalan et al.
2017/0076726 A1 3/2017 Bae
2017/0078824 A1 3/2017 Heo
2017/0083285 A1 3/2017 Meyers et al.
2017/0083606 A1 3/2017 Mohan
2017/0084277 A1 3/2017 Sharifi
2017/0084278 A1 3/2017 Jung
2017/0084292 A1 3/2017 Yoo
2017/0084295 A1 3/2017 Tsiartas et al.
2017/0090864 A1 3/2017 Jorgovanovic
2017/0092278 A1 3/2017 Evermann et al.
2017/0092297 A1 3/2017 Sainath et al.
2017/0092299 A1 3/2017 Matsuo
2017/0092889 A1 3/2017 Seo et al.
2017/0092890 A1 3/2017 Seo et al.
2017/0094215 A1 3/2017 Western
2017/0103748 A1 4/2017 Weissberg et al.
2017/0103754 A1 4/2017 Higbie et al.
2017/0103755 A1 4/2017 Jeon et al.
2017/0110124 A1 4/2017 Boesen et al.
2017/0110130 A1 4/2017 Sharifi et al.
2017/0110144 A1 4/2017 Sharifi et al.
2017/0117497 A1 4/2017 Seo et al.
2017/0123251 A1 5/2017 Nakada et al.
2017/0125037 A1 5/2017 Shin
2017/0125456 A1 5/2017 Kasahara
2017/0133007 A1 5/2017 Drewes
2017/0133011 A1 5/2017 Chen et al.
2017/0134872 A1 5/2017 Silva et al.
2017/0139720 A1 5/2017 Stein
2017/0140449 A1 5/2017 Kannan
2017/0140748 A1 5/2017 Roberts et al.
2017/0140750 A1 5/2017 Wang et al.
2017/0140757 A1 5/2017 Penilla et al.
2017/0140759 A1 5/2017 Kumar et al.
2017/0151930 A1 6/2017 Boesen
2017/0164139 A1 6/2017 Deselaers et al.
2017/0177585 A1 6/2017 Rodger et al.
2017/0178662 A1 6/2017 Ayrapetian et al.
2017/0180561 A1 6/2017 Kadiwala et al.
2017/0186425 A1 6/2017 Dawes et al.
2017/0186427 A1 6/2017 Wang et al.
2017/0188150 A1 6/2017 Brunet et al.
2017/0188437 A1 6/2017 Banta
2017/0193999 A1 7/2017 Aleksic et al.
2017/0206896 A1 7/2017 Ko et al.
2017/0206900 A1 7/2017 Lee et al.
2017/0214996 A1 7/2017 Yeo
2017/0236512 A1 8/2017 Williams et al.
2017/0236515 A1 8/2017 Pinsky et al.
2017/0242649 A1 8/2017 Jarvis et al.
2017/0242651 A1 8/2017 Lang et al.
2017/0242653 A1 8/2017 Lang et al.
2017/0242656 A1 8/2017 Plagge et al.
2017/0242657 A1 8/2017 Jarvis et al.
2017/0243576 A1 8/2017 Millington et al.
2017/0243587 A1 8/2017 Plagge et al.
2017/0245076 A1 8/2017 Kusano et al.
2017/0255612 A1 9/2017 Sarikaya et al.
2017/0257686 A1 9/2017 Gautama et al.
2017/0269900 A1 9/2017 Triplett
2017/0269975 A1 9/2017 Wood et al.
2017/0270919 A1 9/2017 Parthasarathi et al.
2017/0278512 A1 9/2017 Pandya et al.
2017/0287485 A1 10/2017 Civelli et al.
2017/0300289 A1 10/2017 Gattis
2017/0300990 A1 10/2017 Tanaka et al.
2017/0329397 A1 11/2017 Lin
2017/0330565 A1 11/2017 Daley et al.
2017/0331869 A1 11/2017 Bendahan et al.
2017/0332035 A1 11/2017 Shah et al.
2017/0332168 A1 11/2017 Moghimi et al.
2017/0337932 A1 11/2017 Iyengar et al.
2017/0346872 A1 11/2017 Naik et al.
2017/0352357 A1 12/2017 Fink
2017/0353789 A1 12/2017 Kim et al.
2017/0357390 A1 12/2017 Alonso Ruiz et al.
2017/0357475 A1 12/2017 Lee et al.
2017/0357478 A1 12/2017 Piersol et al.
2017/0364371 A1 12/2017 Nandi et al.
2017/0365247 A1 12/2017 Ushakov
2017/0366393 A1 12/2017 Shaker et al.
2017/0374454 A1 12/2017 Bernardini et al.

(56) References Cited

U.S. PATENT DOCUMENTS

2017/0374552 A1 12/2017 Xia et al.
2018/0012077 A1 1/2018 Laska et al.
2018/0018964 A1 1/2018 Reilly et al.
2018/0018965 A1 1/2018 Daley
2018/0018967 A1 1/2018 Lang et al.
2018/0020306 A1 1/2018 Sheen
2018/0025733 A1 1/2018 Qian et al.
2018/0033428 A1 2/2018 Kim et al.
2018/0033429 A1 2/2018 Makke et al.
2018/0033438 A1 2/2018 Toma et al.
2018/0040324 A1 2/2018 Wilberding
2018/0047394 A1 2/2018 Tian et al.
2018/0053504 A1 2/2018 Wang et al.
2018/0054506 A1 2/2018 Hart et al.
2018/0061396 A1 3/2018 Srinivasan et al.
2018/0061402 A1 3/2018 Devaraj et al.
2018/0061404 A1 3/2018 Devaraj et al.
2018/0061409 A1 3/2018 Valentine et al.
2018/0061419 A1 3/2018 Melendo Casado et al.
2018/0061420 A1 3/2018 Patil et al.
2018/0062871 A1 3/2018 Jones et al.
2018/0084367 A1 3/2018 Greff et al.
2018/0088900 A1 3/2018 Glaser et al.
2018/0091898 A1 3/2018 Yoon et al.
2018/0091913 A1 3/2018 Hartung et al.
2018/0096678 A1 4/2018 Zhou et al.
2018/0096683 A1 4/2018 James et al.
2018/0096696 A1 4/2018 Mixter
2018/0107446 A1 4/2018 Wilberding et al.
2018/0108351 A1 4/2018 Beckhardt et al.
2018/0120947 A1 5/2018 Wells et al.
2018/0122372 A1 5/2018 Wanderlust
2018/0122378 A1 5/2018 Mixter et al.
2018/0130469 A1 5/2018 Gruenstein et al.
2018/0132217 A1 5/2018 Stirling-Gallacher
2018/0132298 A1 5/2018 Birnam et al.
2018/0137857 A1 5/2018 Zhou et al.
2018/0137861 A1 5/2018 Ogawa
2018/0139512 A1 5/2018 Moran et al.
2018/0152557 A1 5/2018 White et al.
2018/0158454 A1 6/2018 Campbell et al.
2018/0165055 A1 6/2018 Yu et al.
2018/0167981 A1 6/2018 Jonna et al.
2018/0174597 A1 6/2018 Lee et al.
2018/0176713 A1* 6/2018 Linsky .................... H04W 4/80
2018/0182383 A1 6/2018 Kim et al.
2018/0182390 A1 6/2018 Hughes et al.
2018/0182397 A1 6/2018 Carbune et al.
2018/0182410 A1 6/2018 Kaskari et al.
2018/0188948 A1 7/2018 Ouyang et al.
2018/0190274 A1 7/2018 Kirazci et al.
2018/0190285 A1 7/2018 Heckmann et al.
2018/0196776 A1 7/2018 Hershko et al.
2018/0197533 A1 7/2018 Lyon et al.
2018/0199130 A1 7/2018 Jaffe et al.
2018/0199146 A1 7/2018 Sheen
2018/0204569 A1 7/2018 Nadkar et al.
2018/0205963 A1 7/2018 Matei et al.
2018/0210698 A1 7/2018 Park et al.
2018/0211665 A1 7/2018 Park et al.
2018/0218747 A1 8/2018 Moghimi et al.
2018/0219976 A1 8/2018 Decenzo et al.
2018/0225933 A1 8/2018 Park et al.
2018/0228006 A1 8/2018 Baker et al.
2018/0233130 A1 8/2018 Kaskari et al.
2018/0233136 A1 8/2018 Torok et al.
2018/0233137 A1 8/2018 Torok et al.
2018/0233139 A1 8/2018 Finkelstein et al.
2018/0233141 A1 8/2018 Solomon et al.
2018/0233142 A1 8/2018 Koishida et al.
2018/0233150 A1 8/2018 Gruenstein et al.
2018/0234765 A1 8/2018 Torok et al.
2018/0260680 A1 9/2018 Finkelstein et al.
2018/0261213 A1 9/2018 Arik et al.
2018/0262793 A1 9/2018 Lau et al.
2018/0262831 A1 9/2018 Matheja et al.
2018/0270565 A1 9/2018 Ganeshkumar
2018/0270573 A1 9/2018 Lang et al.
2018/0270575 A1 9/2018 Akutagawa
2018/0277107 A1 9/2018 Kim
2018/0277113 A1 9/2018 Hartung et al.
2018/0277119 A1 9/2018 Baba et al.
2018/0277133 A1 9/2018 Deetz et al.
2018/0286394 A1 10/2018 Li et al.
2018/0286414 A1 10/2018 Ravindran et al.
2018/0293221 A1 10/2018 Finkelstein et al.
2018/0293484 A1 10/2018 Wang et al.
2018/0301147 A1 10/2018 Kim
2018/0308470 A1 10/2018 Park et al.
2018/0314552 A1 11/2018 Kim et al.
2018/0322891 A1 11/2018 Van Den Oord et al.
2018/0324756 A1 11/2018 Ryu et al.
2018/0330589 A1 11/2018 Horling
2018/0330727 A1 11/2018 Tulli
2018/0335903 A1 11/2018 Coffman et al.
2018/0336274 A1 11/2018 Choudhury et al.
2018/0336892 A1 11/2018 Kim et al.
2018/0349093 A1 12/2018 McCarty et al.
2018/0350356 A1 12/2018 Garcia
2018/0350379 A1 12/2018 Wung et al.
2018/0352014 A1 12/2018 Alsina et al.
2018/0352334 A1 12/2018 Family et al.
2018/0356962 A1 12/2018 Corbin
2018/0358009 A1 12/2018 Daley et al.
2018/0358019 A1 12/2018 Mont-Reynaud
2018/0365567 A1 12/2018 Kolavennu et al.
2018/0367944 A1 12/2018 Heo et al.
2019/0012141 A1 1/2019 Piersol et al.
2019/0013019 A1 1/2019 Lawrence
2019/0014592 A1 1/2019 Hampel et al.
2019/0019112 A1 1/2019 Gelfenbeyn et al.
2019/0033446 A1 1/2019 Bultan et al.
2019/0035404 A1 1/2019 Gabel et al.
2019/0037173 A1 1/2019 Lee
2019/0042187 A1 2/2019 Truong et al.
2019/0043488 A1 2/2019 Bocklet et al.
2019/0043492 A1 2/2019 Lang
2019/0044745 A1 2/2019 Knudson et al.
2019/0051298 A1 2/2019 Lee et al.
2019/0051299 A1 2/2019 Ossowski et al.
2019/0066672 A1 2/2019 Wood et al.
2019/0066680 A1 2/2019 Woo et al.
2019/0066687 A1 2/2019 Wood et al.
2019/0066710 A1 2/2019 Bryan et al.
2019/0073999 A1 3/2019 Prémont et al.
2019/0074025 A1 3/2019 Lashkari et al.
2019/0079724 A1 3/2019 Feuz et al.
2019/0081507 A1 3/2019 Ide
2019/0081810 A1 3/2019 Jung
2019/0082255 A1 3/2019 Tajiri et al.
2019/0087455 A1 3/2019 He et al.
2019/0088261 A1 3/2019 Lang et al.
2019/0090056 A1 3/2019 Rexach et al.
2019/0096408 A1 3/2019 Li et al.
2019/0098400 A1 3/2019 Buoni et al.
2019/0104119 A1 4/2019 Giorgi et al.
2019/0104373 A1 4/2019 Wodrich et al.
2019/0108839 A1 4/2019 Reilly et al.
2019/0115011 A1 4/2019 Khellah et al.
2019/0122662 A1 4/2019 Chang et al.
2019/0130906 A1 5/2019 Kobayashi et al.
2019/0147860 A1 5/2019 Chen et al.
2019/0156847 A1 5/2019 Bryan et al.
2019/0163153 A1 5/2019 Price et al.
2019/0172452 A1 6/2019 Smith et al.
2019/0172467 A1 6/2019 Kim et al.
2019/0172476 A1 6/2019 Wung et al.
2019/0173687 A1 6/2019 Mackay et al.
2019/0179607 A1 6/2019 Thangarathnam et al.
2019/0179611 A1 6/2019 Wojogbe et al.
2019/0182072 A1 6/2019 Roe et al.
2019/0186937 A1 6/2019 Sharifi et al.
2019/0188328 A1 6/2019 Oyenan et al.
2019/0189117 A1 6/2019 Kumar

(56) References Cited

U.S. PATENT DOCUMENTS

2019/0206391 A1 7/2019 Busch et al.
2019/0206405 A1 7/2019 Gillespie et al.
2019/0206412 A1 7/2019 Li et al.
2019/0219976 A1 7/2019 Giorgi et al.
2019/0220246 A1 7/2019 Orr et al.
2019/0221206 A1 7/2019 Chen et al.
2019/0237067 A1 8/2019 Friedman et al.
2019/0237089 A1 8/2019 Shin
2019/0239008 A1 8/2019 Lambourne
2019/0239009 A1 8/2019 Lambourne
2019/0243603 A1 8/2019 Keyser-Allen et al.
2019/0243606 A1 8/2019 Jayakumar et al.
2019/0244608 A1 8/2019 Choi et al.
2019/0251960 A1 8/2019 Maker et al.
2019/0259408 A1 8/2019 Freeman et al.
2019/0281387 A1 9/2019 Woo et al.
2019/0281397 A1 9/2019 Lambourne
2019/0287536 A1 9/2019 Sharifi et al.
2019/0287546 A1 9/2019 Ganeshkumar
2019/0288970 A1 9/2019 Siddiq
2019/0289367 A1 9/2019 Siddiq
2019/0295542 A1 9/2019 Huang et al.
2019/0295555 A1 9/2019 Wilberding
2019/0295556 A1 9/2019 Wilberding
2019/0295563 A1 9/2019 Kamdar et al.
2019/0297388 A1 9/2019 Panchaksharaiah et al.
2019/0304443 A1 10/2019 Bhagwan
2019/0311710 A1 10/2019 Eraslan et al.
2019/0311712 A1 10/2019 Firik et al.
2019/0311715 A1 10/2019 Pfeffinger et al.
2019/0311718 A1 10/2019 Huber et al.
2019/0311720 A1 10/2019 Pasko
2019/0311722 A1 10/2019 Caldwell
2019/0317606 A1 10/2019 Jain et al.
2019/0318729 A1 10/2019 Chao et al.
2019/0325870 A1 10/2019 Mitic
2019/0325888 A1 10/2019 Geng
2019/0341037 A1 11/2019 Bromand et al.
2019/0341038 A1 11/2019 Bromand et al.
2019/0342962 A1 11/2019 Chang et al.
2019/0347063 A1 11/2019 Liu et al.
2019/0348044 A1 11/2019 Chun et al.
2019/0362714 A1 11/2019 Mori et al.
2019/0364375 A1 11/2019 Soto et al.
2019/0364422 A1 11/2019 Zhuo
2019/0371310 A1 12/2019 Fox et al.
2019/0371324 A1 12/2019 Powell et al.
2019/0371329 A1 12/2019 D'Souza et al.
2019/0371342 A1 12/2019 Tukka et al.
2019/0392832 A1 12/2019 Mitsui et al.
2020/0007987 A1 1/2020 Woo et al.
2020/0034492 A1 1/2020 Verbeke et al.
2020/0043489 A1 2/2020 Bradley et al.
2020/0043494 A1 2/2020 Maeng
2020/0051554 A1 2/2020 Kim et al.
2020/0066279 A1 2/2020 Kang et al.
2020/0074990 A1 3/2020 Kim et al.
2020/0075018 A1 3/2020 Chen
2020/0089469 A1 3/2020 Wilberding et al.
2020/0090647 A1 3/2020 Kurtz
2020/0092687 A1 3/2020 Devaraj et al.
2020/0098354 A1 3/2020 Lin et al.
2020/0098379 A1 3/2020 Tai et al.
2020/0105245 A1 4/2020 Gupta et al.
2020/0105256 A1 4/2020 Fainberg et al.
2020/0105264 A1 4/2020 Jang et al.
2020/0110571 A1 4/2020 Liu et al.
2020/0125162 A1 4/2020 D'Amato et al.
2020/0135194 A1 4/2020 Jeong
2020/0135224 A1 4/2020 Bromand et al.
2020/0152206 A1 5/2020 Shen et al.
2020/0167597 A1 5/2020 Nguyen et al.
2020/0175989 A1 6/2020 Lockhart et al.
2020/0184964 A1 6/2020 Myers et al.
2020/0184980 A1 6/2020 Wilberding
2020/0193973 A1 6/2020 Tolomei et al.
2020/0211539 A1 7/2020 Lee
2020/0211550 A1 7/2020 Pan et al.
2020/0211556 A1 7/2020 Mixter et al.
2020/0213729 A1 7/2020 Soto
2020/0216089 A1 7/2020 Garcia et al.
2020/0234709 A1 7/2020 Kunitake
2020/0244650 A1 7/2020 Burris et al.
2020/0251107 A1 8/2020 Wang et al.
2020/0265838 A1 8/2020 Lee et al.
2020/0265842 A1 8/2020 Singh
2020/0310751 A1 10/2020 Anand et al.
2020/0336846 A1 10/2020 Rohde et al.
2020/0342869 A1 10/2020 Lee et al.
2020/0364026 A1 11/2020 Lee et al.
2020/0366477 A1 11/2020 Brown et al.
2020/0395006 A1 12/2020 Smith et al.
2020/0395010 A1 12/2020 Smith et al.
2020/0395013 A1 12/2020 Smith et al.
2020/0409652 A1 12/2020 Wilberding et al.
2020/0409926 A1 12/2020 Srinivasan et al.
2021/0029452 A1 1/2021 Tsoi et al.
2021/0035561 A1 2/2021 D'Amato et al.
2021/0035572 A1 2/2021 D'Amato et al.
2021/0067867 A1 3/2021 Kagoshima
2021/0118429 A1 4/2021 Shan
2021/0118439 A1 4/2021 Schillmoeller et al.
2021/0157542 A1 5/2021 De Assis et al.
2021/0166680 A1 6/2021 Jung et al.
2021/0183366 A1 6/2021 Reinspach et al.
2021/0239831 A1 8/2021 Shin et al.
2021/0249004 A1 8/2021 Smith
2021/0280185 A1 9/2021 Tan et al.
2021/0295849 A1 9/2021 Van Der Ven et al.
2021/0358481 A1 11/2021 D'Amato et al.
2022/0035514 A1 2/2022 Shin et al.
2022/0036882 A1 2/2022 Ahn et al.
2022/0050585 A1 2/2022 Fettes et al.
2022/0083136 A1 3/2022 DeLeeuw
2022/0301561 A1 9/2022 Robert Jose et al.
2023/0019595 A1 1/2023 Smith
2023/0215433 A1 7/2023 Myers et al.
2023/0237998 A1 7/2023 Smith et al.
2023/0274738 A1 8/2023 Smith et al.
2023/0382349 A1 11/2023 Ham

FOREIGN PATENT DOCUMENTS

CN 1323435 A 11/2001
CN 1748250 A 3/2006
CN 1781291 A 5/2006
CN 101310558 A 11/2008
CN 101427154 A 5/2009
CN 101480039 A 7/2009
CN 101569093 A 10/2009
CN 101661753 A 3/2010
CN 101686282 A 3/2010
CN 101907983 A 12/2010
CN 102123188 A 7/2011
CN 102256098 A 11/2011
CN 102567468 A 7/2012
CN 102999161 A 3/2013
CN 103052001 A 4/2013
CN 103181192 A 6/2013
CN 103210663 A 7/2013
CN 103546616 A 1/2014
CN 103811007 A 5/2014
CN 104010251 A 8/2014
CN 104035743 A 9/2014
CN 104053088 A 9/2014
CN 104092936 A 10/2014
CN 104104769 A 10/2014
CN 104115224 A 10/2014
CN 104155938 A 11/2014
CN 104282305 A 1/2015
CN 104520927 A 4/2015
CN 104538030 A 4/2015
CN 104572009 A 4/2015
CN 104575504 A 4/2015

(56) References Cited

FOREIGN PATENT DOCUMENTS

| | | | |
|---|---|---|---|
| CN | 104581510 | A | 4/2015 |
| CN | 104635539 | A | 5/2015 |
| CN | 104865550 | A | 8/2015 |
| CN | 104885406 | A | 9/2015 |
| CN | 104885438 | A | 9/2015 |
| CN | 105101083 | A | 11/2015 |
| CN | 105162886 | A | 12/2015 |
| CN | 105187907 | A | 12/2015 |
| CN | 105204357 | A | 12/2015 |
| CN | 105206281 | A | 12/2015 |
| CN | 105284076 | A | 1/2016 |
| CN | 105284168 | A | 1/2016 |
| CN | 105389099 | A | 3/2016 |
| CN | 105427861 | A | 3/2016 |
| CN | 105453179 | A | 3/2016 |
| CN | 105472191 | A | 4/2016 |
| CN | 105493179 | A | 4/2016 |
| CN | 105493442 | A | 4/2016 |
| CN | 105632486 | A | 6/2016 |
| CN | 105679318 | A | 6/2016 |
| CN | 106028223 | A | 10/2016 |
| CN | 106030699 | A | 10/2016 |
| CN | 106375902 | A | 2/2017 |
| CN | 106531165 | A | 3/2017 |
| CN | 106708403 | A | 5/2017 |
| CN | 106796784 | A | 5/2017 |
| CN | 106910500 | A | 6/2017 |
| CN | 107004410 | A | 8/2017 |
| CN | 107122158 | A | 9/2017 |
| CN | 107465974 | A | 12/2017 |
| CN | 107644313 | A | 1/2018 |
| CN | 107767863 | A | 3/2018 |
| CN | 107832837 | A | 3/2018 |
| CN | 107919116 | A | 4/2018 |
| CN | 107919123 | A | 4/2018 |
| CN | 108028047 | A | 5/2018 |
| CN | 108028048 | A | 5/2018 |
| CN | 108198548 | A | 6/2018 |
| CN | 109712626 | A | 5/2019 |
| EP | 1349146 | A1 | 10/2003 |
| EP | 1389853 | A1 | 2/2004 |
| EP | 2051542 | A1 | 4/2009 |
| EP | 2166737 | A1 | 3/2010 |
| EP | 2683147 | A1 | 1/2014 |
| EP | 2986034 | A1 | 2/2016 |
| EP | 3128767 | A2 | 2/2017 |
| EP | 3133595 | A1 | 2/2017 |
| EP | 3142107 | A1 | 3/2017 |
| EP | 2351021 | B1 | 9/2017 |
| EP | 3270377 | A1 | 1/2018 |
| EP | 3285502 | A1 | 2/2018 |
| GB | 2501367 | A | 10/2013 |
| JP | S63301998 | A | 12/1988 |
| JP | H0883091 | A | 3/1996 |
| JP | 2001236093 | A | 8/2001 |
| JP | 2003223188 | A | 8/2003 |
| JP | 2004096520 | A | 3/2004 |
| JP | 2004109361 | A | 4/2004 |
| JP | 2004163590 | A | 6/2004 |
| JP | 2004347943 | A | 12/2004 |
| JP | 2004354721 | A | 12/2004 |
| JP | 2005242134 | A | 9/2005 |
| JP | 2005250867 | A | 9/2005 |
| JP | 2005284492 | A | 10/2005 |
| JP | 2006092482 | A | 4/2006 |
| JP | 2007013400 | A | 1/2007 |
| JP | 2007142595 | A | 6/2007 |
| JP | 2007235875 | A | 9/2007 |
| JP | 2008079256 | A | 4/2008 |
| JP | 2008158868 | A | 7/2008 |
| JP | 2008217444 | A | 9/2008 |
| JP | 2010141748 | A | 6/2010 |
| JP | 2013037148 | A | 2/2013 |
| JP | 2014071138 | A | 4/2014 |
| JP | 2014510481 | A | 4/2014 |
| JP | 2014137590 | A | 7/2014 |
| JP | 2015161551 | A | 9/2015 |
| JP | 2015527768 | A | 9/2015 |
| JP | 2016009193 | A | 1/2016 |
| JP | 2016095383 | A | 5/2016 |
| JP | 2017072857 | A | 4/2017 |
| JP | 2017129860 | A | 7/2017 |
| JP | 2017227912 | A | 12/2017 |
| JP | 2018055259 | A | 4/2018 |
| JP | 2019109510 | A | 7/2019 |
| KR | 20100036351 | A | 4/2010 |
| KR | 100966415 | B1 | 6/2010 |
| KR | 20100111071 | A | 10/2010 |
| KR | 20130050987 | A | 5/2013 |
| KR | 101284134 | B1 | 7/2013 |
| KR | 20140005410 | A | 1/2014 |
| KR | 20140035310 | A | 3/2014 |
| KR | 20140054643 | A | 5/2014 |
| KR | 20140111859 | A | 9/2014 |
| KR | 20140112900 | A | 9/2014 |
| TW | 201629950 | A | 8/2016 |
| WO | 9731437 | A1 | 8/1997 |
| WO | 200153994 | | 7/2001 |
| WO | 03054854 | A2 | 7/2003 |
| WO | 2003093950 | A2 | 11/2003 |
| WO | 2008048599 | A1 | 4/2008 |
| WO | 2008096414 | A1 | 8/2008 |
| WO | 2012166386 | A2 | 12/2012 |
| WO | 2013184792 | A1 | 12/2013 |
| WO | 2014064531 | A1 | 5/2014 |
| WO | 2014159581 | A1 | 10/2014 |
| WO | 2015017303 | A1 | 2/2015 |
| WO | 2015037396 | A1 | 3/2015 |
| WO | 2015105788 | A1 | 7/2015 |
| WO | 2015131024 | A1 | 9/2015 |
| WO | 2015133022 | A1 | 9/2015 |
| WO | 2015178950 | A1 | 11/2015 |
| WO | 2015195216 | A1 | 12/2015 |
| WO | 2016003509 | A1 | 1/2016 |
| WO | 2016014142 | A1 | 1/2016 |
| WO | 2016014686 | | 1/2016 |
| WO | 2016014686 | A1 | 1/2016 |
| WO | 2016022926 | A1 | 2/2016 |
| WO | 2016033364 | A1 | 3/2016 |
| WO | 2016057268 | A1 | 4/2016 |
| WO | 2016085775 | A2 | 6/2016 |
| WO | 2016136062 | A1 | 9/2016 |
| WO | 2016165067 | A1 | 10/2016 |
| WO | 2016171956 | A1 | 10/2016 |
| WO | 2016200593 | A1 | 12/2016 |
| WO | 2017039632 | A1 | 3/2017 |
| WO | 2017058654 | A1 | 4/2017 |
| WO | 2017138934 | A1 | 8/2017 |
| WO | 2017147075 | A1 | 8/2017 |
| WO | 2017147936 | A1 | 9/2017 |
| WO | 2018027142 | A1 | 2/2018 |
| WO | 2018064362 | A1 | 4/2018 |
| WO | 2018067404 | A1 | 4/2018 |
| WO | 2018140777 | A1 | 8/2018 |
| WO | 2019005772 | A1 | 1/2019 |
| WO | 2020061439 | A1 | 3/2020 |
| WO | 2020068795 | A1 | 4/2020 |
| WO | 2020132298 | A1 | 6/2020 |

OTHER PUBLICATIONS

Wu et al. End-to-End Recurrent Entity Network for Entity-Value Independent Goal-Oriented Dialog Learning. DSTC6-Dialog System Technology Challenges, Dec. 10, 2017, 5 pages.

Wung et al. "Robust Acoustic Echo Cancellation in the Short-Time Fourier Transform Domain Using Adaptive Crossband Filters" IEEE International Conference on Acoustic, Speech and Signal Processing ICASSP, 2014, p. 1300-1304.

Xiao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.

(56) References Cited

OTHER PUBLICATIONS

Xiaoguang et al. "Robust Small-Footprint Keyword Spotting Using Sequence-To-Sequence Model with Connectionist Temporal Classifier", 2019 IEEE, Sep. 28, 2019, 5 pages.
Xu et al. An End-to-end Approach for Handling Unknown Slot Values in Dialogue State Tracking. ARXIV.org, Cornell University Library, May 3, 2018, 10 pages.
Yamaha DME 64 Owner's Manual; copyright 2004, 80 pages.
Yamaha DME Designer 3.0 Owner's Manual; Copyright 2008, 501 pages.
Yamaha DME Designer 3.5 setup manual guide; copyright 2004, 16 pages.
Yamaha DME Designer 3.5 User Manual; Copyright 2004, 507 pages.
Zaykovskiy, Dmitry. Survey of the Speech Recognition Techniques for Mobile Devices. Proceedings of Specom 2006, Jun. 25, 2006, 6 pages.
Zhang et al. Noise Robust Speech Recognition Using Multi-Channel Based Channel Selection and Channel Weighting. The Institute of Electronics, Information and Communication Engineers, arXiv:1604.03276v1 [cs.SD] Jan. 1, 2010, 8 pages.
Canadian Patent Office, Canadian Office Action mailed on Nov. 14, 2018, issued in connection with Canadian Application No. 3015491, 3 pages.
Chinese Patent Office, Chinese Office Action and Translation mailed on Jul. 2, 2021, issued in connection with Chinese Application No. 201880077216.4, 22 pages.
Chinese Patent Office, Chinese Office Action and Translation mailed on Mar. 30, 2021, issued in connection with Chinese Application No. 202010302650.7, 15 pages.
Chinese Patent Office, First Office Action and Translation mailed on Jun. 1, 2021, issued in connection with Chinese Application No. 201980089721.5, 21 pages.
Chinese Patent Office, First Office Action and Translation mailed on Feb. 9, 2023, issued in connection with Chinese Application No. 201880076788.0, 13 pages.
Chinese Patent Office, First Office Action and Translation mailed on Oct. 9, 2022, issued in connection with Chinese Application No. 201780056695.7, 10 pages.
Chinese Patent Office, First Office Action and Translation mailed on Dec. 1, 2021, issued in connection with Chinese Application No. 201780077204.7, 11 pages.
Chinese Patent Office, First Office Action and Translation mailed on Nov. 10, 2022, issued in connection with Chinese Application No. 201980070006.7, 15 pages.
Chinese Patent Office, First Office Action and Translation mailed on Jan. 19, 2023, issued in connection with Chinese Application No. 201880064916.X, 10 pages.
Chinese Patent Office, First Office Action and Translation mailed on Sep. 19, 2022, issued in connection with Chinese Application No. 201980056604.9, 13 pages.
Chinese Patent Office, First Office Action and Translation mailed on Dec. 20, 2021, issued in connection with Chinese Application No. 202010302650.7, 10 pages.
Chinese Patent Office, First Office Action and Translation mailed on Mar. 20, 2019, issued in connection with Chinese Application No. 201780025028.2, 18 pages.
Chinese Patent Office, First Office Action and Translation mailed on Apr. 23, 2024, issued in connection with Chinese Application No. 202110542908.5, 10 pages.
Chinese Patent Office, First Office Action and Translation mailed on Nov. 25, 2022, issued in connection with Chinese Application No. 201780056321.5, 8 pages.
Chinese Patent Office, First Office Action and Translation mailed on Feb. 27, 2023, issued in connection with Chinese Application No. 201980003798.6, 12 pages.
Chinese Patent Office, First Office Action and Translation mailed on Mar. 27, 2019, issued in connection with Chinese Application No. 201780025029.7, 9 pages.
Chinese Patent Office, First Office Action and Translation mailed on May 27, 2021, issued in connection with Chinese Application No. 201880026360.5, 15 pages.
Chinese Patent Office, First Office Action and Translation mailed on Dec. 28, 2020, issued in connection with Chinese Application No. 201880072203.8, 11 pages.
Chinese Patent Office, First Office Action and Translation mailed on Dec. 30, 2022, issued in connection with Chinese Application No. 201880076775.3, 10 pages.
Chinese Patent Office, First Office Action and Translation mailed on Nov. 5, 2019, issued in connection with Chinese Application No. 201780072651.3, 19 pages.
Chinese Patent Office, First Office Action and Translation mailed on Sep. 6, 2023, issued in connection with Chinese Application No. 202010179593.8, 14 pages.
Chinese Patent Office, First Office Action mailed on Feb. 28, 2020, issued in connection with Chinese Application No. 201780061543.6, 29 pages.
Chinese Patent Office, Second Office Action and Translation mailed on Mar. 3, 2022, issued in connection with Chinese Application No. 201880077216.4, 11 pages.
Chinese Patent Office, Second Office Action and Translation mailed on Apr. 1, 2023, issued in connection with Chinese Application No. 201980056604.9, 11 pages.
Chinese Patent Office, Second Office Action and Translation mailed on May 11, 2020, issued in connection with Chinese Application No. 201780061543.6, 17 pages.
Chinese Patent Office, Second Office Action and Translation mailed on Jul. 18, 2019, issued in connection with Chinese Application No. 201780025029.7, 14 pages.
Chinese Patent Office, Second Office Action and Translation mailed on Sep. 23, 2019, issued in connection with Chinese Application No. 201780025028.2, 15 pages.
Chinese Patent Office, Second Office Action and Translation mailed on Mar. 31, 2020, issued in connection with Chinese Application No. 201780072651.3, 17 pages.
Chinese Patent Office, Second Office Action mailed on Dec. 21, 2022, issued in connection with Chinese Application No. 201980089721.5, 12 pages.
Chinese Patent Office, Second Office Action mailed on May 30, 2023, issued in connection with Chinese Application No. 201980070006.7, 9 pages.
Chinese Patent Office, Third Office Action and Translation mailed on Sep. 16, 2019, issued in connection with Chinese Application No. 201780025029.7, 14 pages.
Chinese Patent Office, Third Office Action and Translation mailed on Aug. 5, 2020, issued in connection with Chinese Application No. 201780072651.3, 10 pages.
Chinese Patent Office, Translation of Office Action mailed on Jul. 18, 2019, issued in connection with Chinese Application No. 201780025029.7, 8 pages.
Chung et al. Empirical Evaluation of Gated Recurrent Neural Network on Sequence Modeling. Dec. 11, 2014, 9 pages.
Cipriani,. The complete list of OK, Google commands—CNET. Jul. 1, 2016, 5 pages. [online], [retrieved on Jan. 15, 2020]. Retrieved from the Internet: (URL:https://web.archive.org/web/20160803230926/https://www.cnet.com/how-to/complete-list-of-ok-googl••-commands/).
Corrected Notice of Allowability mailed on Mar. 8, 2017, issued in connection with U.S. Appl. No. 15/229,855, filed Aug. 5, 2016, 6 pages.
Couke et al. Efficient Keyword Spotting using Dilated Convolutions and Gating, arXiv:1811.07684v2, Feb. 18, 2019, 5 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, Decision to Refuse European Patent Application mailed on May 30, 2022, issued in connection with European Application No. 17200837.7, 4 pages.
European Patent Office, European EPC Article 94.3 mailed on Jun. 5, 2023, issued in connection with European Application No. 20710649.3, 8 pages.

(56) References Cited

OTHER PUBLICATIONS

European Patent Office, European EPC Article 94.3 mailed on Feb. 10, 2023, issued in connection with European Application No. 19729968.8, 7 pages.
European Patent Office, European EPC Article 94.3 mailed on Jan. 10, 2024, issued in connection with European Application No. 20757152.2, 6 pages.
European Patent Office, European EPC Article 94.3 mailed on Mar. 11, 2022, issued in connection with European Application No. 19731415.6, 7 pages.
European Patent Office, European EPC Article 94.3 mailed on Nov. 11, 2021, issued in connection with European Application No. 19784172.9, 5 pages.
European Patent Office, European EPC Article 94.3 mailed on Oct. 12, 2023, issued in connection with European Application No. 20736489.4, 8 pages.
European Patent Office, European EPC Article 94.3 mailed on Dec. 18, 2023, issued in connection with European Application No. 21703134.3, 7 pages.
European Patent Office, European EPC Article 94.3 mailed on May 2, 2022, issued in connection with European Application No. 20185599.6, 7 pages.
European Patent Office, European EPC Article 94.3 mailed on Jun. 21, 2022, issued in connection with European Application No. 19780508.8, 5 pages.
Japanese Patent Office, Non-Final Office Action and Translation mailed on Nov. 5, 2019, issued in connection with Japanese Patent Application No. 2019-517281, 6 pages.
Japanese Patent Office, Non-Final Office Action mailed on Apr. 4, 2023, issued in connection with Japanese Patent Application No. 2021-573944, 5 pages.
Japanese Patent Office, Notice of Reasons for Refusal and Translation mailed on Sep. 13, 2022, issued in connection with Japanese Patent Application No. 2021-163622, 12 pages.
Japanese Patent Office, Notice of Reasons for Refusal and Translation mailed on Jun. 22, 2021, issued in connection with Japanese Patent Application No. 2020-517935, 4 pages.
Japanese Patent Office, Notice of Reasons for Refusal and Translation mailed on Nov. 28, 2021, issued in connection with Japanese Patent Application No. 2020-550102, 9 pages.
Japanese Patent Office, Notice of Reasons for Refusal and Translation mailed on Aug. 8, 2023, issued in connection with Japanese Patent Application No. 2022-101346, 6 pages.
Japanese Patent Office, Office Action and Translation mailed on Nov. 15, 2022, issued in connection with Japanese Patent Application No. 2021-146144, 9 pages.
Japanese Patent Office, Office Action and Translation mailed on Mar. 16, 2021, issued in connection with Japanese Patent Application No. 2020-506725, 7 pages.
Japanese Patent Office, Office Action and Translation mailed on Nov. 17, 2020, issued in connection with Japanese Patent Application No. 2019-145039, 7 pages.
Japanese Patent Office, Office Action and Translation mailed on Apr. 20, 2021, issued in connection with Japanese Patent Application No. 2020-513852, 9 pages.
Japanese Patent Office, Office Action and Translation mailed on Feb. 24, 2021, issued in connection with Japanese Patent Application No. 2019-517281, 4 pages.
Japanese Patent Office, Office Action and Translation mailed on Apr. 27, 2021, issued in connection with Japanese Patent Application No. 2020-518400, 10 pages.
Japanese Patent Office, Office Action and Translation mailed on Aug. 27, 2020, issued in connection with Japanese Patent Application No. 2019-073349, 6 pages.
Japanese Patent Office, Office Action and Translation mailed on Jul. 30, 2020, issued in connection with Japanese Patent Application No. 2019-517281, 6 pages.
Japanese Patent Office, Office Action and Translation mailed on Jul. 6, 2020, issued in connection with Japanese Patent Application No. 2019-073348, 10 pages.
Japanese Patent Office, Office Action and Translation mailed on Jul. 6, 2021, issued in connection with Japanese Patent Application No. 2019-073349, 6 pages.
Japanese Patent Office, Office Action and Translation mailed on Oct. 8, 2019, issued in connection with Japanese Patent Application No. 2019-521032, 5 pages.
Japanese Patent Office, Office Action mailed on Dec. 7, 2021, issued in connection with Japanese Patent Application No. 2020-513852, 6 pages.
Japanese Patent Office, Office Action mailed on Nov. 29, 2022, issued in connection with Japanese Patent Application No. 2021-181224, 6 pages.
Japanese Patent Office, Office Action Translation mailed on Nov. 5, 2019, issued in connection with Japanese Patent Application No. 2019-517281, 2 pages.
Japanese Patent Office, Office Action Translation mailed on Oct. 8, 2019, issued in connection with Japanese Patent Application No. 2019-521032, 8 pages.
Jo et al., "Synchronized One-to-many Media Streaming with Adaptive Playout Control," Proceedings of SPIE, 2002, pp. 71-82, vol. 4861.
Johnson, "Implementing Neural Networks into Modern Technology," IJCNN'99. International Joint Conference on Neural Networks . Proceedings [Cat. No. 99CH36339], Washington, DC, USA, 1999, pp. 1028-1032, vol. 2, doi: 10.1109/IJCNN.1999.831096. [retrieved on Jun. 22, 2020].
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Jose Alvarez and Mathieu Salzmann "Compression-aware Training of Deep Networks" 31st Conference on Neural Information Processing Systems, Nov. 13, 2017, 12pages.
Joseph Szurley et al, "Efficient computation of microphone utility in a wireless acoustic sensor network with multi-channel Wiener filter based noise reduction", 2012 IEEE International Conference on Acoustics, Speech and Signal Processing, Kyoto, Japan, Mar. 25-30, 2012, pp. 2657-2660, XP032227701, DOI: 10.1109/ICASSP .2012. 6288463 ISBN: 978-1-4673-0045-2.
Katsamanis et al. Robust far-field spoken command recognition for home automation combining adaptation and multichannel processing. ICASSP, IEEE International Conference on Acoustics, Speech and Signal Processing—Proceedings, May 2014, pp. 5547-5551.
Ketabdar et al. Detection of Out-of-Vocabulary Words in Posterior Based ASR. Proceedings of Interspeech 2007, Aug. 27, 2007, 4 pages.
Kim et al. Character-Aware Neural Language Models. Retrieved from the Internet: URL: https://arxiv.org/pdf/1508.06615v3.pdf, Oct. 16, 2015, 9 pages.
Korean Patent Office, Korean Examination Report and Translation mailed on Apr. 10, 2023, issued in connection with Korean Application No. 10-2022-7024007, 8 pages.
Korean Patent Office, Korean Examination Report and Translation mailed on Oct. 13, 2022, issued in connection with Korean Application No. 10-2021-7030939, 4 pages.
Korean Patent Office, Korean Examination Report and Translation mailed on Apr. 19, 2022, issued in connection with Korean Application No. 10-2021-7008937, 14 pages.
Korean Patent Office, Korean Examination Report and Translation mailed on Jul. 19, 2023, issued in connection with Korean Application No. 10-2022-7024007, 9 pages.
Korean Patent Office, Korean Examination Report and Translation mailed on Nov. 25, 2021, issued in connection with Korean Application No. 10-2021-7008937, 14 pages.
Korean Patent Office, Korean Examination Report and Translation mailed on Apr. 26, 2021, issued in connection with Korean Application No. 10-2021-7008937, 15 pages.
Korean Patent Office, Korean Examination Report and Translation mailed on Jul. 26, 2022, issued in connection with Korean Application No. 10-2022-7016656, 17 pages.
Korean Patent Office, Korean Examination Report and Translation mailed on Dec. 27, 2021, issued in connection with Korean Application No. 10-2021-7008937, 22 pages.

(56) References Cited

OTHER PUBLICATIONS

Korean Patent Office, Korean Examination Report and Translation mailed on Mar. 31, 2023, issued in connection with Korean Application No. 10-2022-7016656, 7 pages.
Korean Patent Office, Korean Examination Report and Translation mailed on Oct. 31, 2021, issued in connection with Korean Application No. 10-2022-7024007, 10 pages.
Korean Patent Office, Korean Office Action and Translation mailed on Oct. 14, 2021, issued in connection with Korean Application No. 10-2020-7011843, 29 pages.
Korean Patent Office, Korean Office Action and Translation mailed on Aug. 16, 2019, issued in connection with Korean Application No. 10-2018-7027452, 14 pages.
Korean Patent Office, Korean Office Action and Translation mailed on Apr. 2, 2020, issued in connection with Korean Application No. 10-2020-7008486, 12 pages.
Korean Patent Office, Korean Office Action and Translation mailed on Mar. 25, 2020, issued in connection with Korean Application No. 10-2019-7012192, 14 pages.
Korean Patent Office, Korean Office Action and Translation mailed on Aug. 26, 2020, issued in connection with Korean Application No. 10-2019-7027640, 16 pages.
Korean Patent Office, Korean Office Action and Translation mailed on Mar. 30, 2020, issued in connection with Korean Application No. 10-2020-7004425, 5 pages.
Korean Patent Office, Korean Office Action and Translation mailed on Jan. 4, 2021, issued in connection with Korean Application No. 10-2020-7034425, 14 pages.
Korean Patent Office, Korean Office Action and Translation mailed on Sep. 9, 2019, issued in connection with Korean Application No. 10-2018-7027451, 21 pages.
Korean Patent Office, Korean Office Action mailed on May 8, 2019, issued in connection with Korean Application No. 10-2018-7027451, 7 pages.
Korean Patent Office, Korean Office Action mailed on May 8, 2019, issued in connection with Korean Application No. 10-2018-7027452, 5 pages.
Non-Final Office Action mailed on Aug. 28, 2023, issued in connection with U.S. Appl. No. 17/722,661, filed Apr. 18, 2022, 16 pages.
Non-Final Office Action mailed on Feb. 28, 2023, issued in connection with U.S. Appl. No. 17/548,921, filed Dec. 13, 2021, 12 pages.
Non-Final Office Action mailed on Mar. 28, 2022, issued in connection with U.S. Appl. No. 17/222,151, filed Apr. 5, 2021, 5 pages.
Non-Final Office Action mailed on Mar. 28, 2024, issued in connection with U.S. Appl. No. 18/192,452, filed Mar. 29, 2023, 7 pages.
Non-Final Office Action mailed on Oct. 28, 2019, issued in connection with U.S. Appl. No. 16/145,275, filed Sep. 28, 2018, 11 pages.
Non-Final Office Action mailed on Oct. 28, 2021, issued in connection with U.S. Appl. No. 16/378,516, filed Apr. 8, 2019, 10 pages.
Non-Final Office Action mailed on Oct. 28, 2021, issued in connection with U.S. Appl. No. 17/247,736, filed Dec. 21, 2020, 12 pages.
Non-Final Office Action mailed on Feb. 29, 2024, issued in connection with U.S. Appl. No. 18/449,244, filed Aug. 14, 2023, 15 pages.
Non-Final Office Action mailed on Mar. 29, 2019, issued in connection with U.S. Appl. No. 16/102,650, filed Aug. 13, 2018, 11 pages.
Non-Final Office Action mailed on Mar. 29, 2021, issued in connection with U.S. Appl. No. 16/528,265, filed Jul. 31, 2019, 18 pages.
Non-Final Office Action mailed on Nov. 29, 2021, issued in connection with U.S. Appl. No. 16/989,350, filed Aug. 10, 2020, 15 pages.
Non-Final Office Action mailed on Sep. 29, 2020, issued in connection with U.S. Appl. No. 16/402,617, filed May 3, 2019, 12 pages.
Non-Final Office Action mailed on Dec. 3, 2020, issued in connection with U.S. Appl. No. 16/145,275, filed Sep. 28, 2018, 11 pages.
Non-Final Office Action mailed on Jul. 3, 2019, issued in connection with U.S. Appl. No. 15/948,541, filed Apr. 9, 2018, 7 pages.
Non-Final Office Action mailed on Jul. 3, 2023, issued in connection with U.S. Appl. No. 17/135,173, filed Dec. 28, 2020, 22 pages.
Non-Final Office Action mailed on May 3, 2019, issued in connection with U.S. Appl. No. 16/178,122, filed Nov. 1, 2018, 14 pages.
Non-Final Office Action mailed on Oct. 3, 2018, issued in connection with U.S. Appl. No. 16/102,153, filed Aug. 13, 2018, 20 pages.
Non-Final Office Action mailed on Apr. 30, 2019, issued in connection with U.S. Appl. No. 15/718,521, filed Sep. 28, 2017, 39 pages.
Non-Final Office Action mailed on Jun. 30, 2017, issued in connection with U.S. Appl. No. 15/277,810, filed Sep. 27, 2016, 13 pages.
Non-Final Office Action mailed on Sep. 30, 2022, issued in connection with U.S. Appl. No. 17/353,254, filed Jun. 21, 2021, 22 pages.
Non-Final Office Action mailed on Apr. 4, 2019, issued in connection with U.S. Appl. No. 15/718,911, filed Sep. 28, 2017, 21 pages.
Non-Final Office Action mailed on Aug. 4, 2020, issued in connection with U.S. Appl. No. 16/600,644, filed Oct. 14, 2019, 30 pages.
Non-Final Office Action mailed on Jan. 4, 2019, issued in connection with U.S. Appl. No. 15/948,541, filed Apr. 9, 2018, 6 pages.
Non-Final Office Action mailed on Jan. 4, 2022, issued in connection with U.S. Appl. No. 16/879,549, filed May 20, 2020, 14 pages.
Non-Final Office Action mailed on Nov. 4, 2022, issued in connection with U.S. Appl. No. 17/445,272, filed Aug. 17, 2021, 22 pages.
Non-Final Office Action mailed on Oct. 4, 2022, issued in connection with U.S. Appl. No. 16/915,234, filed Jun. 29, 2020, 16 pages.
Non-Final Office Action mailed on Apr. 5, 2023, issued in connection with U.S. Appl. No. 18/145,501, filed Dec. 22, 2022, 6 pages.
Non-Final Office Action mailed on Jul. 5, 2023, issued in connection with U.S. Appl. No. 18/061,579, filed Dec. 5, 2022, 11 pages.
Non-Final Office Action mailed on Nov. 5, 2021, issued in connection with U.S. Appl. No. 16/153,530, filed Oct. 5, 2018, 21 pages.
Non-Final Office Action mailed on Apr. 6, 2020, issued in connection with U.S. Appl. No. 16/424,825, filed May 29, 2019, 22 pages.
Non-Final Office Action mailed on Feb. 6, 2018, issued in connection with U.S. Appl. No. 15/211,689, filed Jul. 15, 2016, 32 pages.
Non-Final Office Action mailed on Feb. 6, 2018, issued in connection with U.S. Appl. No. 15/237,133, filed Aug. 15, 2016, 6 pages.
Non-Final Office Action mailed on Jan. 6, 2021, issued in connection with U.S. Appl. No. 16/439,046, filed Jun. 12, 2019, 13 pages.
Non-Final Office Action mailed on Mar. 6, 2020, issued in connection with U.S. Appl. No. 16/141,875, filed Sep. 25, 2018, 8 pages.
Non-Final Office Action mailed on Oct. 6, 2023, issued in connection with U.S. Appl. No. 17/222,950, filed Apr. 5, 2021, 9 pages.
Non-Final Office Action mailed on Sep. 6, 2017, issued in connection with U.S. Appl. No. 15/131,254, filed Apr. 18, 2016, 13 pages.
Non-Final Office Action mailed on Sep. 6, 2018, issued in connection with U.S. Appl. No. 15/098,760, filed Apr. 14, 2016, 29 pages.
Non-Final Office Action mailed on Dec. 7, 2021, issued in connection with U.S. Appl. No. 16/168,389, filed Oct. 23, 2018, 36 pages.
Non-Final Office Action mailed on Feb. 7, 2023, issued in connection with U.S. Appl. No. 17/303,001, filed May 18, 2021, 8 pages.
Non-Final Office Action mailed on Jan. 7, 2022, issued in connection with U.S. Appl. No. 17/135,123, filed Dec. 28, 2020, 16 pages.
Non-Final Office Action mailed on Jun. 7, 2023, issued in connection with U.S. Appl. No. 16/179,779, filed Nov. 2, 2018, 29 pages.
Non-Final Office Action mailed on Mar. 7, 2022, issued in connection with U.S. Appl. No. 16/812,758, filed Mar. 9, 2020, 18 pages.
Non-Final Office Action mailed on Sep. 7, 2023, issued in connection with U.S. Appl. No. 17/340,590, filed Jun. 7, 2021, 18 pages.
Non-Final Office Action mailed on Feb. 8, 2022, issued in connection with U.S. Appl. No. 16/806,747, filed Mar. 2, 2020, 17 pages.
Non-Final Office Action mailed on Jun. 8, 2023, issued in connection with U.S. Appl. No. 18/048,034, filed Oct. 20, 2022, 8 pages.

(56) References Cited

OTHER PUBLICATIONS

Non-Final Office Action mailed on Jun. 8, 2023, issued in connection with U.S. Appl. No. 18/061,243, filed Dec. 2, 2022, 10 pages.
Non-Final Office Action mailed on Sep. 8, 2020, issued in connection with U.S. Appl. No. 15/936,177, filed Mar. 26, 2018, 19 pages.
Non-Final Office Action mailed on Apr. 9, 2018, issued in connection with U.S. Appl. No. 15/804,776, filed Nov. 6, 2017, 18 pages.
Non-Final Office Action mailed on Apr. 9, 2021, issued in connection with U.S. Appl. No. 16/780,483, filed Feb. 3, 2020, 45 pages.
Non-Final Office Action mailed on Apr. 20, 2023, issued in connection with U.S. Appl. No. 18/061,570, filed Dec. 5, 2022, 12 pages.
Non-Final Office Action mailed on Feb. 20, 2018, issued in connection with U.S. Appl. No. 15/211,748, filed Jul. 15, 2016, 31 pages.
Non-Final Office Action mailed on Jun. 20, 2019, issued in connection with U.S. Appl. No. 15/946,585, filed Apr. 5, 2018, 10 pages.
Non-Final Office Action mailed on May 20, 2024, issued in connection with U.S. Appl. No. 18/600,044, filed Mar. 8, 2024, 24 pages.
Non-Final Office Action mailed on Oct. 20, 2022, issued in connection with U.S. Appl. No. 17/532,674, filed Nov. 22, 2021, 52 pages.
Non-Final Office Action mailed on Apr. 21, 2021, issued in connection with U.S. Appl. No. 16/109,375, filed Aug. 22, 2018, 9 pages.
Non-Final Office Action mailed on Aug. 21, 2019, issued in connection with U.S. Appl. No. 16/192,126, filed Nov. 15, 2018, 8 pages.
Non-Final Office Action mailed on Feb. 21, 2019, issued in connection with U.S. Appl. No. 16/214,666, filed Dec. 10, 2018, 12 pages.
Non-Final Office Action mailed on Jan. 21, 2020, issued in connection with U.S. Appl. No. 16/214,711, filed Dec. 10, 2018, 9 pages.
Non-Final Office Action mailed on Jan. 21, 2020, issued in connection with U.S. Appl. No. 16/598,125, filed Oct. 10, 2019, 25 pages.
Non-Final Office Action mailed on Nov. 21, 2023, issued in connection with U.S. Appl. No. 18/088,976, filed Dec. 27, 2022, 9 pages.
Non-Final Office Action mailed on Oct. 21, 2019, issued in connection with U.S. Appl. No. 15/973,413, filed May 7, 2018, 10 pages.
Non-Final Office Action mailed on Dec. 22, 2022, issued in connection with U.S. Appl. No. 16/168,389, filed Oct. 23, 2018, 39 pages.
Non-Final Office Action mailed on Jul. 22, 2020, issued in connection with U.S. Appl. No. 16/145,275, filed Sep. 28, 2018, 11 pages.
Non-Final Office Action mailed on May 22, 2018, issued in connection with U.S. Appl. No. 15/946,599, filed Apr. 5, 2018, 19 pages.
Non-Final Office Action mailed on Sep. 22, 2020, issued in connection with U.S. Appl. No. 16/539,843, filed Aug. 13, 2019, 7 pages.
Non-Final Office Action mailed on Jun. 23, 2021, issued in connection with U.S. Appl. No. 16/439,032, filed Jun. 12, 2019, 13 pages.
Non-Final Office Action mailed on Jun. 23, 2023, issued in connection with U.S. Appl. No. 18/048,945, filed Oct. 24, 2022, 10 pages.
Non-Final Office Action mailed on Mar. 23, 2022, issued in connection with U.S. Appl. No. 16/907,953, filed Jun. 22, 2020, 7 pages.
Non-Final Office Action mailed on May 23, 2019, issued in connection with U.S. Appl. No. 16/154,071, filed Oct. 8, 2018, 36 pages.
Non-Final Office Action mailed on Nov. 23, 2020, issued in connection with U.S. Appl. No. 16/524,306, filed Jul. 29, 2019, 14 pages.
Non-Final Office Action mailed on Oct. 23, 2023, issued in connection with U.S. Appl. No. 17/932,715, filed Sep. 16, 2022, 14 pages.
Non-Final Office Action mailed on Sep. 23, 2020, issued in connection with U.S. Appl. No. 16/177,185, filed Oct. 31, 2018, 17 pages.
Non-Final Office Action mailed on Sep. 23, 2022, issued in connection with U.S. Appl. No. 16/153,530, filed Oct. 5, 2018, 25 pages.
Non-Final Office Action mailed on Apr. 24, 2023, issued in connection with U.S. Appl. No. 17/532,744, filed Nov. 22, 2021, 18 pages.
Non-Final Office Action mailed on Apr. 24, 2024, issued in connection with U.S. Appl. No. 18/461,430, filed Sep. 5, 2023, 22 pages.
Non-Final Office Action mailed on Aug. 24, 2017, issued in connection with U.S. Appl. No. 15/297,627, filed Oct. 19, 2016, 13 pages.
Non-Final Office Action mailed on Jul. 24, 2019, issued in connection with U.S. Appl. No. 16/439,009, filed Jun. 12, 2019, 26 pages.
Non-Final Office Action mailed on May 24, 2022, issued in connection with U.S. Appl. No. 17/101,949, filed Nov. 23, 2020, 10 pages.
Non-Final Office Action mailed on Apr. 25, 2023, issued in connection with U.S. Appl. No. 17/536,572, filed Nov. 29, 2021, 8 pages.
Non-Final Office Action mailed on Apr. 25, 2023, issued in connection with U.S. Appl. No. 17/656,794, filed Mar. 28, 2022, 22 pages.
Non-Final Office Action mailed on Jul. 25, 2017, issued in connection with U.S. Appl. No. 15/273,679, filed Jul. 22, 2016, 11 pages.
Non-Final Office Action mailed on May 25, 2023, issued in connection with U.S. Appl. No. 18/157,937, filed Jan. 23, 2023, 9 pages.
Non-Final Office Action mailed on Oct. 25, 2022, issued in connection with U.S. Appl. No. 17/549,034, filed Dec. 13, 2021, 20 pages.
Non-Final Office Action mailed on Apr. 26, 2024, issued in connection with U.S. Appl. No. 18/310,025, filed May 1, 2023, 9 pages.
Non-Final Office Action mailed on Dec. 26, 2018, issued in connection with U.S. Appl. No. 16/154,469, filed Oct. 8, 2018, 7 pages.
Non-Final Office Action mailed on Jan. 26, 2017, issued in connection with U.S. Appl. No. 15/098,867, filed Apr. 14, 2016, 16 pages.
Non-Final Office Action mailed on Jan. 26, 2024, issued in connection with U.S. Appl. No. 17/450,925, filed Oct. 14, 2021, 9 pages.
Non-Final Office Action mailed on May 26, 2022, issued in connection with U.S. Appl. No. 16/989,805, filed Aug. 10, 2020, 14 pages.
Non-Final Office Action mailed on Oct. 26, 2017, issued in connection with U.S. Appl. No. 15/438,744, filed Feb. 21, 2017, 12 pages.
Non-Final Office Action mailed on Oct. 26, 2021, issued in connection with U.S. Appl. No. 16/736,725, filed Jan. 7, 2020, 12 pages.
Non-Final Office Action mailed on Feb. 27, 2023, issued in connection with U.S. Appl. No. 17/493,430, filed Oct. 4, 2021, 17 pages.
Non-Final Office Action mailed on Jun. 27, 2018, issued in connection with U.S. Appl. No. 15/438,749, filed Feb. 21, 2017, 16 pages.
Non-Final Office Action mailed on Jun. 27, 2019, issued in connection with U.S. Appl. No. 16/437,437, filed Jun. 11, 2019, 8 pages.
Non-Final Office Action mailed on Jun. 27, 2019, issued in connection with U.S. Appl. No. 16/437,476, filed Jun. 11, 2019, 8 pages.

(56) References Cited

OTHER PUBLICATIONS

Non-Final Office Action mailed on Mar. 27, 2020, issued in connection with U.S. Appl. No. 16/790,621, filed Feb. 13, 2020, 8 pages.
Non-Final Office Action mailed on May 27, 2020, issued in connection with U.S. Appl. No. 16/715,713, filed Dec. 16, 2019, 14 pages.
Non-Final Office Action mailed on Oct. 27, 2020, issued in connection with U.S. Appl. No. 16/213,570, filed Dec. 7, 2018, 13 pages.
Non-Final Office Action mailed on Oct. 27, 2020, issued in connection with U.S. Appl. No. 16/715,984, filed Dec. 16, 2019, 14 pages.
Non-Final Office Action mailed on Oct. 27, 2020, issued in connection with U.S. Appl. No. 16/819,755, filed Mar. 16, 2020, 8 pages.
Korean Patent Office, Korean Preliminary Rejection and Translation mailed on Dec. 26, 2023, issued in connection with Korean Application No. 10-2023-7031855, 4 pages.
Korean Patent Office, Korean Preliminary Rejection and Translation mailed on Dec. 5, 2023, issued in connection with Korean Application No. 10-2023-7032988, 11 pages.
Korean Patent Office, Office Action and Translation mailed on Feb. 27, 2023, issued in connection with Korean Application No. 10-2022-7021879, 5 pages.
Lei et al. Accurate and Compact Large Vocabulary Speech Recognition on Mobile Devices. Interspeech 2013, Aug. 25, 2013, 4 pages.
Lengerich et al. An End-to-End Architecture for Keyword Spotting and Voice Activity Detection, arXiv:1611.09405v1, Nov. 28, 2016, 5 pages.
Louderback, Jim, "Affordable Audio Receiver Furnishes Homes With MP3," TechTV Vault. Jun. 28, 2000 retrieved Jul. 10, 2014, 2 pages.
Maja Taseska and Emanual A.P. Habets, "MMSE-Based Blind Source Extraction in Diffuse Noise Fields Using a Complex Coherence-Based a Priori Sap Estimator." International Workshop on Acoustic Signal Enhancement 2012, Sep. 4-6, 2012, 4pages.
Mathias Wolfel. Channel Selection by Class Separability Measures for Automatic Transcriptions on Distant Microphones, INTERSPEECH 2007 10.21437/Interspeech.2007-255, 4 pages.
Matrix—The Ultimate Development Board Sep. 14, 2019 Matrix—The Ultimate Development Board Sep. 14, 2019 https-//web.archive.org/web/20190914035838/https-//www.matrix.one/ , 1 page.
Mesaros et al. Detection and Classification of Acoustic Scenes and Events: Outcome of the DCASE 2016 Challenge. IEEE/ACM Transactions on Audio, Speech, and Language Processing. Feb. 2018, 16 pages.
Molina et al., "Maximum Entropy-Based Reinforcement Learning Using a Confidence Measure in Speech Recognition for Telephone Speech," in IEEE Transactions on Audio, Speech, and Language Processing, vol. 18, No. 5, pp. 1041-1052, Jul. 2010, doi: 10.1109/TASL.2009.2032618. [Retrieved online] URLhttps://ieeexplore.ieee.org/document/5247099?partnum=5247099searchProductType=IEEE%20Journals%20Transactions.
Morales-Cordovilla et al. "Room Localization for Distant Speech Recognition," Proceedings of Interspeech 2014, Sep. 14, 2014, 4 pages.
Newman, Jared. "Chromecast Audio's multi-room support has arrived," Dec. 11, 2015, https://www.pcworld.com/article/3014204/customer-electronic/chromcase-audio-s-multi-room-support-has . . . , 1 page.
Ngo et al. "Incorporating the Conditional Speech Presence Probability in Multi-Channel Wiener Filter Based Noise Reduction in Hearing Aids." EURASIP Journal on Advances in Signal Processing vol. 2009, Jun. 2, 2009, 11 pages.
Non-Final Office Action mailed Jul. 12, 2021, issued in connection with U.S. Appl. No. 17/008,104, filed Aug. 31, 2020, 6 pages.
Non-Final Office Action mailed Jun. 18, 2021, issued in connection with U.S. Appl. No. 17/236,559, filed Apr. 21, 2021, 9 pages.
Non-Final Office Action mailed Apr. 21, 2021, issued in connection with U.S. Appl. No. 16/109,375, filed Aug. 22, 2018, 9 pages.
Non-Final Office Action mailed Dec. 21, 2020, issued in connection with U.S. Appl. No. 16/153,530, filed Oct. 5, 2018, 22 pages.
Non-Final Office Action mailed Jul. 22, 2021, issued in connection with U.S. Appl. No. 16/179,779, filed Nov. 2, 2018, 19 pages.
Non-Final Office Action mailed Apr. 23, 2021, issued in connection with U.S. Appl. No. 16/660,197, filed Oct. 22, 2019, 9 pages.
Non-Final Office Action mailed Jun. 25, 2021, issued in connection with U.S. Appl. No. 16/213,570, filed Dec. 7, 2018, 11 pages.
Non-Final Office Action mailed Jul. 8, 2021, issued in connection with U.S. Appl. No. 16/813,643, filed Mar. 9, 2020, 12 pages.
Non-Final Office Action mailed Dec. 9, 2020, issued in connection with U.S. Appl. No. 16/271,550, filed Feb. 8, 2019, 35 pages.
Non-Final Office Action mailed Jul. 9, 2021, issued in connection with U.S. Appl. No. 16/806,747, filed Mar. 2, 2020, 18 pages.
Non-Final Office Action mailed on Jun. 1, 2017, issued in connection with U.S. Appl. No. 15/223,218, filed Jul. 29, 2016, 7 pages.
Non-Final Office Action mailed on Feb. 2, 2023, issued in connection with U.S. Appl. No. 17/305,698, filed Jul. 13, 2021, 16 pages.
Non-Final Office Action mailed on Nov. 2, 2017, issued in connection with U.S. Appl. No. 15/584,782, filed May 2, 2017, 11 pages.
Non-Final Office Action mailed on Nov. 3, 2017, issued in connection with U.S. Appl. No. 15/438,741, filed Feb. 21, 2017, 11 pages.
Non-Final Office Action mailed on Nov. 4, 2019, issued in connection with U.S. Appl. No. 16/022,662, filed Jun. 28, 2018, 16 pages.
Non-Final Office Action mailed on Dec. 5, 2022, issued in connection with U.S. Appl. No. 17/662,302, filed May 6, 2022, 12 pages.
Non-Final Office Action mailed on Oct. 5, 2022, issued in connection with U.S. Appl. No. 17/449,926, filed Oct. 4, 2021, 11 pages.
Non-Final Office Action mailed on Sep. 5, 2019, issued in connection with U.S. Appl. No. 16/416,752, filed May 20, 2019, 14 pages.
Non-Final Office Action mailed on Feb. 7, 2017, issued in connection with U.S. Appl. No. 15/131,244, filed Apr. 18, 2016, 12 pages.
Non-Final Office Action mailed on Feb. 8, 2017, issued in connection with U.S. Appl. No. 15/098,892, filed Apr. 14, 2016, 17 pages.
Non-Final Office Action mailed on Mar. 9, 2017, issued in connection with U.S. Appl. No. 15/098,760, filed Apr. 14, 2016, 13 pages.
Non-Final Office Action mailed on Oct. 9, 2019, issued in connection with U.S. Appl. No. 15/936,177, filed Mar. 26, 2018, 16 pages.
Non-Final Office Action mailed on Feb. 1, 2024, issued in connection with U.S. Appl. No. 18/313,013, filed May 5, 2023, 47 pages.
Non-Final Office Action mailed on Jul. 1, 2020, issued in connection with U.S. Appl. No. 16/138,111, filed Sep. 21, 2018, 14 pages.
Non-Final Office Action mailed on May 1, 2024, issued in connection with U.S. Appl. No. 17/650,441, filed Feb. 9, 2022, 12 pages.
Non-Final Office Action mailed on Aug. 10, 2023, issued in connection with U.S. Appl. No. 18/070,024, filed Nov. 28, 2022, 4 pages.
Non-Final Office Action mailed on Jan. 10, 2018, issued in connection with U.S. Appl. No. 15/098,718, filed Apr. 14, 2016, 15 pages.
Non-Final Office Action mailed on Jan. 10, 2018, issued in connection with U.S. Appl. No. 15/229,868, filed Aug. 5, 2016, 13 pages.
Non-Final Office Action mailed on Jan. 10, 2018, issued in connection with U.S. Appl. No. 15/438,725, filed Feb. 21, 2017, 15 pages.
Non-Final Office Action mailed on Sep. 10, 2018, issued in connection with U.S. Appl. No. 15/670,361, filed Aug. 7, 2017, 17 pages.
Non-Final Office Action mailed on Aug. 11, 2021, issued in connection with U.S. Appl. No. 16/841,116, filed Apr. 6, 2020, 9 pages.
Non-Final Office Action mailed on Feb. 11, 2021, issued in connection with U.S. Appl. No. 16/876,493, filed May 18, 2020, 16 pages.
Non-Final Office Action mailed on Feb. 11, 2022, issued in connection with U.S. Appl. No. 17/145,667, filed Jan. 11, 2021, 9 pages.
Non-Final Office Action mailed on Mar. 11, 2021, issued in connection with U.S. Appl. No. 16/834,483, filed Mar. 30, 2020, 11 pages.

(56) References Cited

OTHER PUBLICATIONS

Non-Final Office Action mailed on Oct. 11, 2019, issued in connection with U.S. Appl. No. 16/177,185, filed Oct. 31, 2018, 14 pages.
Non-Final Office Action mailed on Sep. 11, 2020, issued in connection with U.S. Appl. No. 15/989,715, filed May 25, 2018, 8 pages.
European Patent Office, Summons to Attend Oral Proceedings mailed on Feb. 4, 2022, issued in connection with European Application No. 17757075.1, 10 pages.
European Patent Office, Summons to Attend Oral Proceedings mailed on Dec. 9, 2021, issued in connection with European Application No. 17200837.7, 10 pages.
Fadilpasic, "Cortana can now be the default PDA on your Android", IT Pro Portal: Accessed via WayBack Machine; http://web.archive.org/web/20171129124915/https://www.itproportal.com/2015/08/11/cortana-can-now-be- . . . , Aug. 11, 2015, 6 pages.
Final Office Action mailed Jul. 23, 2021, issued in connection with U.S. Appl. No. 16/439,046, filed Jun. 12, 2019, 12 pages.
Final Office Action mailed on Oct. 6, 2017, issued in connection with U.S. Appl. No. 15/098,760, filed Apr. 14, 2016, 25 pages.
Final Office Action mailed on Jun. 1, 2022, issued in connection with U.S. Appl. No. 16/806,747, filed Mar. 2, 2020, 20 pages.
Final Office Action mailed on Feb. 10, 2021, issued in connection with U.S. Appl. No. 16/219,702, filed Dec. 13, 2018, 9 pages.
Final Office Action mailed on Feb. 10, 2021, issued in connection with U.S. Appl. No. 16/402,617, filed May 3, 2019, 13 pages.
Final Office Action mailed on Nov. 10, 2020, issued in connection with U.S. Appl. No. 16/600,644, filed Oct. 14, 2019, 19 pages.
Final Office Action mailed on Apr. 11, 2019, issued in connection with U.S. Appl. No. 15/131,254, filed Apr. 18, 2016, 17 pages.
Final Office Action mailed on Aug. 11, 2017, issued in connection with U.S. Appl. No. 15/131,776, filed Apr. 18, 2016, 7 pages.
Final Office Action mailed on Dec. 11, 2019, issued in connection with U.S. Appl. No. 16/227,308, filed Dec. 20, 2018, 10 pages.
Final Office Action mailed on Sep. 11, 2019, issued in connection with U.S. Appl. No. 16/178,122, filed Nov. 1, 2018, 13 pages.
Final Office Action mailed on Apr. 13, 2018, issued in connection with U.S. Appl. No. 15/131,254, filed Apr. 18, 2016, 18 pages.
Final Office Action mailed on Apr. 13, 2018, issued in connection with U.S. Appl. No. 15/438,744, filed Feb. 21, 2017, 20 pages.
Final Office Action mailed on May 13, 2020, issued in connection with U.S. Appl. No. 16/153,530, filed Oct. 5, 2018, 20 pages.
Final Office Action mailed on Jul. 15, 2021, issued in connection with U.S. Appl. No. 16/153,530, filed Oct. 5, 2018, 22 pages.
Final Office Action mailed on Jun. 15, 2017, issued in connection with U.S. Appl. No. 15/098,718, filed Apr. 14, 2016, 15 pages.
Final Office Action mailed on Jun. 15, 2021, issued in connection with U.S. Appl. No. 16/819,755, filed Mar. 16, 2020, 12 pages.
Final Office Action mailed on Oct. 15, 2018, issued in connection with U.S. Appl. No. 15/804,776, filed Nov. 6, 2017, 18 pages.
Final Office Action mailed on Oct. 15, 2020, issued in connection with U.S. Appl. No. 16/109,375, filed Aug. 22, 2018, 9 pages.
Final Office Action mailed on Oct. 16, 2018, issued in connection with U.S. Appl. No. 15/438,725, filed Feb. 21, 2017, 10 pages.
Final Office Action mailed on Aug. 17, 2022, issued in connection with U.S. Appl. No. 16/179,779, filed Nov. 2, 2018, 26 pages.
Final Office Action mailed on Dec. 17, 2021, issued in connection with U.S. Appl. No. 16/813,643, filed Mar. 9, 2020, 12 pages.
Final Office Action mailed on May 17, 2023, issued in connection with U.S. Appl. No. 16/168,389, filed Oct. 23, 2018, 44 pages.
Final Office Action mailed on May 18, 2020, issued in connection with U.S. Appl. No. 16/177,185, filed Oct. 31, 2018, 16 pages.
Final Office Action mailed on Feb. 21, 2018, issued in connection with U.S. Appl. No. 15/297,627, filed Oct. 19, 2016, 12 pages.
Final Office Action mailed on Mar. 21, 2022, issued in connection with U.S. Appl. No. 16/153,530, filed Oct. 5, 2018, 23 pages.
Final Office Action mailed on May 21, 2020, issued in connection with U.S. Appl. No. 15/989,715, filed May 25, 2018, 21 pages.
Final Office Action mailed on Aug. 22, 2022, issued in connection with U.S. Appl. No. 16/168,389, filed Oct. 23, 2018, 37 pages.
Final Office Action mailed on Aug. 22, 2023, issued in connection with U.S. Appl. No. 18/061,570, filed Dec. 5, 2022, 12 pages.
Final Office Action mailed on Feb. 22, 2021, issued in connection with U.S. Appl. No. 15/936,177, filed Mar. 26, 2018, 20 pages.
Final Office Action mailed on Feb. 22, 2021, issued in connection with U.S. Appl. No. 16/213,570, filed Dec. 7, 2018, 12 pages.
Final Office Action mailed on Jun. 22, 2020, issued in connection with U.S. Appl. No. 16/179,779, filed Nov. 2, 2018, 16 pages.
Final Office Action mailed on Mar. 23, 2020, issued in connection with U.S. Appl. No. 16/145,275, filed Sep. 28, 2018, 11 pages.
Final Office Action mailed on Feb. 24, 2020, issued in connection with U.S. Appl. No. 15/936,177, filed Mar. 26, 2018, 20 pages.
Final Office Action mailed on Aug. 25, 2023, issued in connection with U.S. Appl. No. 16/989,350, filed Aug. 10, 2020, 21 pages.
Final Office Action mailed on Apr. 26, 2019, issued in connection with U.S. Appl. No. 15/721,141, filed Sep. 29, 2017, 20 pages.
Final Office Action mailed on Feb. 27, 2024, issued in connection with U.S. Appl. No. 17/340,590, filed Jun. 7, 2021, 28 pages.
Final Office Action mailed on Jul. 27, 2022, issued in connection with U.S. Appl. No. 16/989,350, filed Aug. 10, 2020, 15 pages.
Final Office Action mailed on Sep. 27, 2023, issued in connection with U.S. Appl. No. 18/048,034, filed Oct. 20, 2022, 9 pages.
Final Office Action mailed on Mar. 29, 2023, issued in connection with U.S. Appl. No. 17/549,034, filed Dec. 13, 2021, 21 pages.
Final Office Action mailed on Nov. 29, 2021, issued in connection with U.S. Appl. No. 17/236,559, filed Apr. 21, 2021, 11 pages.
Final Office Action mailed on Apr. 30, 2019, issued in connection with U.S. Appl. No. 15/098,760, filed Apr. 14, 2016, 6 pages.
Final Office Action mailed on Jun. 4, 2021, issued in connection with U.S. Appl. No. 16/168,389, filed Oct. 23, 2018, 38 pages.
Final Office Action mailed on Oct. 4, 2021, issued in connection with U.S. Appl. No. 16/806,747, filed Mar. 2, 2020, 17 pages.
Final Office Action mailed on Feb. 5, 2019, issued in connection with U.S. Appl. No. 15/438,749, filed Feb. 21, 2017, 17 pages.
Final Office Action mailed on Oct. 6, 2023, issued in connection with U.S. Appl. No. 17/532,744, filed Nov. 22, 2021, 21 pages.
Final Office Action mailed on Feb. 7, 2020, issued in connection with U.S. Appl. No. 15/948,541, filed Apr. 9, 2018, 8 pages.
Final Office Action mailed on Jun. 7, 2022, issued in connection with U.S. Appl. No. 16/736,725, filed Jan. 7, 2020, 14 pages.
Advisory Action mailed on Nov. 7, 2022, issued in connection with U.S. Appl. No. 16/168,389, filed Oct. 23, 2018, 4 pages.
Advisory Action mailed on Jun. 10, 2020, issued in connection with U.S. Appl. No. 15/936,177, filed Mar. 26, 2018, 4 pages.
Advisory Action mailed on Aug. 13, 2021, issued in connection with U.S. Appl. No. 16/271,550, filed Feb. 8, 2019, 4 pages.
Advisory Action mailed on Dec. 13, 2023, issued in connection with U.S. Appl. No. 18/048,034, filed Oct. 20, 2022, 4 pages.
Advisory Action mailed on Apr. 23, 2021, issued in connection with U.S. Appl. No. 16/219,702, filed Dec. 13, 2018, 3 pages.
Advisory Action mailed on Apr. 24, 2020, issued in connection with U.S. Appl. No. 15/948,541, filed Apr. 9, 2018, 4 pages.
Advisory Action mailed on Feb. 26, 2024, issued in connection with U.S. Appl. No. 17/532,744, filed Nov. 22, 2021, 4 pages.
Advisory Action mailed on Feb. 28, 2022, issued in connection with U.S. Appl. No. 16/813,643, filed Mar. 9, 2020, 3 pages.
Advisory Action mailed on Jun. 28, 2018, issued in connection with U.S. Appl. No. 15/438,744, filed Feb. 21, 2017, 3 pages.
Advisory Action mailed on Dec. 31, 2018, issued in connection with U.S. Appl. No. 15/804,776, filed Nov. 6, 2017, 4 pages.
Advisory Action mailed on Sep. 8, 2021, issued in connection with U.S. Appl. No. 16/168,389, filed Oct. 23, 2018, 4 pages.
Advisory Action mailed on Jun. 9, 2020, issued in connection with U.S. Appl. No. 16/145,275, filed Sep. 28, 2018, 3 pages.
Andra et al. Contextual Keyword Spotting in Lecture Video With Deep Convolutional Neural Network. 2017 International Conference on Advanced Computer Science and Information Systems, IEEE, Oct. 28, 2017, 6 pages.
Anonymous,. S Voice or Google Now—The Lowdown. Apr. 28, 2015, 9 pages. [online], [retrieved on Nov. 29, 2017]. Retrieved

(56) References Cited

OTHER PUBLICATIONS from the Internet (URL: http://web.archive.org/web/20160807040123/http://lowdown.carphonewarehouse.com/news/s-voice-or-google-now/29958/).
Anonymous: "What are the function of 4 Microphones on iPhone 6S/6S+?", ETrade Supply, Dec. 24, 2015, XP055646381, Retrieved from the Internet: URL:https://www.etradesupply.com/blog/4-microphones-iphone-6s6s-for/ [retrieved on Nov. 26, 2019].
Audhkhasi Kartik et al. End-to-end ASR-free keyword search from speech. 2017 IEEE International Conference on Acoustics, Speech and Signal Processing, Mar. 5, 2017, 7 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Australian Patent Office, Australian Examination Report Action mailed on Nov. 10, 2022, issued in connection with Australian Application No. 2018312989, 2 pages.
Australian Patent Office, Australian Examination Report Action mailed on Jul. 11, 2023, issued in connection with Australian Application No. 2022246446, 2 pages.
Australian Patent Office, Australian Examination Report Action mailed on Apr. 14, 2020, issued in connection with Australian Application No. 2019202257, 3 pages.
Australian Patent Office, Australian Examination Report Action mailed on Jun. 14, 2023, issued in connection with Australian Application No. 2019299865, 2 pages.
Australian Patent Office, Australian Examination Report Action mailed on May 19, 2022, issued in connection with Australian Application No. 2021212112, 2 pages.
Australian Patent Office, Australian Examination Report Action mailed on Sep. 25, 2023, issued in connection with Australian Application No. 2018338812, 3 pages.
Australian Patent Office, Australian Examination Report Action mailed on Sep. 28, 2022, issued in connection with Australian Application No. 2018338812, 3 pages.
Australian Patent Office, Australian Examination Report Action mailed on Oct. 3, 2019, issued in connection with Australian Application No. 2018230932, 3 pages.
Australian Patent Office, Australian Examination Report Action mailed on Oct. 31, 2023, issued in connection with Australian Application No. 2023203687, 2 pages.
Australian Patent Office, Australian Examination Report Action mailed on Mar. 4, 2022, issued in connection with Australian Application No. 2021202786, 2 pages.
Australian Patent Office, Australian Examination Report Action mailed on Apr. 7, 2021, issued in connection with Australian Application No. 2019333058, 2 pages.
Australian Patent Office, Australian Examination Report Action mailed on Aug. 7, 2020, issued in connection with Australian Application No. 2019236722, 4 pages.
Australian Patent Office, Examination Report mailed on Jun. 28, 2021, issued in connection with Australian Patent Application No. 2019395022, 2 pages.
Australian Patent Office, Examination Report mailed on Oct. 30, 2018, issued in connection with Australian Application No. 2017222436, 3 pages.
"Automatic Parameter Tying in Neural Networks" ICLR 2018, 14 pages.
Bertrand et al. "Adaptive Distributed Noise Reduction for Speech Enhancement in Wireless Acoustic Sensor Networks" Jan. 2010, 4 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Canadian Patent Office, Canadian Examination Report mailed on Dec. 1, 2021, issued in connection with Canadian Application No. 3096442, 4 pages.
Canadian Patent Office, Canadian Examination Report mailed on Oct. 12, 2023, issued in connection with Canadian Application No. 3084279, 4 pages.
Canadian Patent Office, Canadian Examination Report mailed on Sep. 14, 2022, issued in connection with Canadian Application No. 3067776, 4 pages.
Canadian Patent Office, Canadian Examination Report mailed on Dec. 19, 2023, issued in connection with Canadian Application No. 3067776, 3 pages.
Canadian Patent Office, Canadian Examination Report mailed on Oct. 19, 2022, issued in connection with Canadian Application No. 3123601, 5 pages.
Canadian Patent Office, Canadian Examination Report mailed on Nov. 2, 2021, issued in connection with Canadian Application No. 3067776, 4 pages.
Canadian Patent Office, Canadian Examination Report mailed on Oct. 26, 2021, issued in connection with Canadian Application No. 3072492, 3 pages.
Canadian Patent Office, Canadian Examination Report mailed on Apr. 29, 2024, issued in connection with Canadian Application No. 3164558, 4 pages.
Canadian Patent Office, Canadian Examination Report mailed on Mar. 29, 2022, issued in connection with Canadian Application No. 3111322, 3 pages.
Canadian Patent Office, Canadian Examination Report mailed on Jan. 3, 2024, issued in connection with Canadian Application No. 3123601, 3 pages.
Canadian Patent Office, Canadian Examination Report mailed on Jun. 7, 2022, issued in connection with Canadian Application No. 3105494, 5 pages.
Canadian Patent Office, Canadian Examination Report mailed on May 8, 2024, issued in connection with Canadian Application No. 3146914, 5 pages.
Canadian Patent Office, Canadian Examination Report mailed on Mar. 9, 2021, issued in connection with Canadian Application No. 3067776, 5 pages.
Non-Final Office Action mailed on Sep. 11, 2020, issued in connection with U.S. Appl. No. 16/219,702, filed Dec. 13, 2018, 9 pages.
Non-Final Office Action mailed on Apr. 12, 2021, issued in connection with U.S. Appl. No. 16/528,224, filed Jul. 31, 2019, 9 pages.
Non-Final Office Action mailed on Apr. 12, 2023, issued in connection with U.S. Appl. No. 17/878,649, filed Aug. 1, 2022, 16 pages.
Non-Final Office Action mailed on Dec. 12, 2016, issued in connection with U.S. Appl. No. 15/098,718, filed Apr. 14, 2016, 11 pages.
Non-Final Office Action mailed on Feb. 12, 2019, issued in connection with U.S. Appl. No. 15/670,361, filed Aug. 7, 2017, 13 pages.
Non-Final Office Action mailed on Dec. 13, 2023, issued in connection with U.S. Appl. No. 18/316,400, filed May 12, 2023, 6 pages.
Non-Final Office Action mailed on Dec. 13, 2023, issued in connection with U.S. Appl. No. 18/316,434, filed May 12, 2023, 29 pages.
Non-Final Office Action mailed on Jan. 13, 2017, issued in connection with U.S. Appl. No. 15/098,805, filed Apr. 14, 2016, 11 pages.
Non-Final Office Action mailed on Mar. 13, 2024, issued in connection with U.S. Appl. No. 18/309,939, filed May 1, 2023, 15 pages.
Non-Final Office Action mailed on Nov. 13, 2018, issued in connection with U.S. Appl. No. 15/717,621, filed Sep. 27, 2017, 23 pages.
Non-Final Office Action mailed on Nov. 13, 2018, issued in connection with U.S. Appl. No. 16/160,107, filed Oct. 15, 2018, 8 pages.
Non-Final Office Action mailed on Nov. 13, 2019, issued in connection with U.S. Appl. No. 15/984,073, filed May 18, 2018, 18 pages.

(56) References Cited

OTHER PUBLICATIONS

Non-Final Office Action mailed on Oct. 13, 2021, issued in connection with U.S. Appl. No. 16/679,538, filed Nov. 11, 2019, 8 pages.
Non-Final Office Action mailed on May 14, 2020, issued in connection with U.S. Appl. No. 15/948,541, filed Apr. 9, 2018, 8 pages.
Non-Final Office Action mailed on Nov. 14, 2022, issued in connection with U.S. Appl. No. 17/077,974, filed Oct. 22, 2020, 6 pages.
Non-Final Office Action mailed on Sep. 14, 2017, issued in connection with U.S. Appl. No. 15/178,180, filed Jun. 9, 2016, 16 pages.
Non-Final Office Action mailed on Sep. 14, 2018, issued in connection with U.S. Appl. No. 15/959,907, filed Apr. 23, 2018, 15 pages.
Non-Final Office Action mailed on Sep. 14, 2022, issued in connection with U.S. Appl. No. 17/446,690, filed Sep. 1, 2021, 10 pages.
Non-Final Office Action mailed on Sep. 14, 2023, issued in connection with U.S. Appl. No. 17/528,843, filed Nov. 17, 2021, 20 pages.
Non-Final Office Action mailed on Apr. 15, 2020, issued in connection with U.S. Appl. No. 16/138,111, filed Sep. 21, 2018, 15 pages.
Non-Final Office Action mailed on Aug. 15, 2022, issued in connection with U.S. Appl. No. 17/448,015, filed Sep. 17, 2021, 12 pages.
Non-Final Office Action mailed on Dec. 15, 2020, issued in connection with U.S. Appl. No. 17/087,423, filed Nov. 2, 2020, 7 pages.
Non-Final Office Action mailed on Dec. 15, 2022, issued in connection with U.S. Appl. No. 17/549,253, filed Dec. 13, 2021, 10 pages.
Non-Final Office Action mailed on Feb. 15, 2023, issued in connection with U.S. Appl. No. 17/453,632, filed Nov. 4, 2021, 12 pages.
Non-Final Office Action mailed on Jan. 15, 2019, issued in connection with U.S. Appl. No. 16/173,797, filed Oct. 29, 2018, 6 pages.
Non-Final Office Action mailed on Nov. 15, 2019, issued in connection with U.S. Appl. No. 16/153,530, filed Oct. 5, 2018, 17 pages.
Non-Final Office Action mailed on Sep. 15, 2022, issued in connection with U.S. Appl. No. 17/247,507, filed Dec. 14, 2020, 9 pages.
Non-Final Office Action mailed on Sep. 15, 2022, issued in connection with U.S. Appl. No. 17/327,911, filed May 24, 2021, 44 pages.
Non-Final Office Action mailed on Feb. 16, 2023, issued in connection with U.S. Appl. No. 17/305,920, filed Jul. 16, 2021, 12 pages.
Non-Final Office Action mailed on Mar. 16, 2018, issued in connection with U.S. Appl. No. 15/681,937, filed Aug. 21, 2017, 5 pages.
Non-Final Office Action mailed on Oct. 16, 2018, issued in connection with U.S. Appl. No. 15/131,254, filed Apr. 18, 2016, 16 pages.
Non-Final Office Action mailed on Sep. 16, 2021, issued in connection with U.S. Appl. No. 16/879,553, filed May 20, 2020, 24 pages.
Non-Final Office Action mailed on Aug. 17, 2021, issued in connection with U.S. Appl. No. 17/236,559, filed Apr. 21, 2021, 10 pages.
Non-Final Office Action mailed on Sep. 17, 2020, issued in connection with U.S. Appl. No. 16/600,949, filed Oct. 14, 2019, 29 pages.
Non-Final Office Action mailed on Apr. 18, 2018, issued in connection with U.S. Appl. No. 15/811,468, filed Nov. 13, 2017, 14 pages.
Non-Final Office Action mailed on Aug. 18, 2021, issued in connection with U.S. Appl. No. 16/845,946, filed Apr. 10, 2020, 14 pages.
Non-Final Office Action mailed on Jan. 18, 2019, issued in connection with U.S. Appl. No. 15/721,141, filed Sep. 29, 2017, 18 pages.
Non-Final Office Action mailed on Jan. 18, 2024, issued in connection with U.S. Appl. No. 18/048,034, filed Oct. 20, 2022, 10 pages.
Non-Final Office Action mailed on Jul. 18, 2023, issued in connection with U.S. Appl. No. 18/066,093, filed Dec. 14, 2022, 12 pages.
Non-Final Office Action mailed on Mar. 18, 2024, issued in connection with U.S. Appl. No. 17/532,744, filed Nov. 22, 2021, 20 pages.
Non-Final Office Action mailed on Oct. 18, 2019, issued in connection with U.S. Appl. No. 15/098,760, filed Apr. 14, 2016, 27 pages.
Non-Final Office Action mailed on Oct. 18, 2022, issued in connection with U.S. Appl. No. 16/949,973, filed Nov. 23, 2020, 31 pages.
Non-Final Office Action mailed on Sep. 18, 2019, issued in connection with U.S. Appl. No. 16/179,779, filed Nov. 2, 2018, 14 pages.
Non-Final Office Action mailed on Apr. 19, 2017, issued in connection with U.S. Appl. No. 15/131,776, filed Apr. 18, 2016, 12 pages.
Non-Final Office Action mailed on Dec. 19, 2019, issued in connection with U.S. Appl. No. 16/147,710, filed Sep. 29, 2018, 10 pages.
Non-Final Office Action mailed on Feb. 19, 2020, issued in connection with U.S. Appl. No. 16/148,879, filed Oct. 1, 2018, 15 pages.
Non-Final Office Action mailed on Jan. 19, 2024, issued in connection with U.S. Appl. No. 18/331,580, filed Jun. 8, 2023, 11 pages.
Non-Final Office Action mailed on Sep. 19, 2022, issued in connection with U.S. Appl. No. 17/385,542, filed Jul. 26, 2021, 9 pages.
Non-Final Office Action mailed on Sep. 2, 2020, issued in connection with U.S. Appl. No. 16/290,599, filed Mar. 1, 2019, 17 pages.
Non-Final Office Action mailed on Sep. 2, 2021, issued in connection with U.S. Appl. No. 16/947,895, filed Aug. 24, 2020, 16 pages.
Notice of Allowance mailed on Jun. 7, 2021, issued in connection with U.S. Appl. No. 16/528,224, filed Jul. 31, 2019, 9 pages.
Notice of Allowance mailed on Apr. 8, 2022, issued in connection with U.S. Appl. No. 16/813,643, filed Mar. 9, 2020, 7 pages.
Notice of Allowance mailed on Mar. 8, 2024, issued in connection with U.S. Appl. No. 17/135,173, filed Dec. 28, 2020, 9 pages.
Notice of Allowance mailed on Nov. 8, 2021, issued in connection with U.S. Appl. No. 17/008,104, filed Aug. 31, 2020, 9 pages.
Notice of Allowance mailed on Nov. 8, 2023, issued in connection with U.S. Appl. No. 18/066,093, filed Dec. 14, 2022, 11 pages.
Notice of Allowance mailed on Aug. 9, 2018, issued in connection with U.S. Appl. No. 15/229,868, filed Aug. 5, 2016, 11 pages.
Notice of Allowance mailed on Dec. 9, 2021, issued in connection with U.S. Appl. No. 16/845,946, filed Apr. 10, 2020, 10 pages.
Notice of Allowance mailed on Feb. 9, 2022, issued in connection with U.S. Appl. No. 17/247,736, filed Dec. 21, 2020, 8 pages.
Notice of Allowance mailed on Mar. 9, 2018, issued in connection with U.S. Appl. No. 15/584,782, filed May 2, 2017, 8 pages.
Oord et al. WaveNet: A Generative Model for Raw Audio. Arxiv.org, Cornell University Library, Sep. 12, 2016, 15 pages.
Optimizing Siri on HomePod in Far-Field Settings. Audio Software Engineering and Siri Speech Team, Machine Learning Journal vol. 1, Issue 12. https://machinelearning.apple.com/2018/12/03/optimizing-siri-on-homepod-in-far-field-settings.html. Dec. 2018, 18 pages.
Palm, Inc., "Handbook for the Palm VII Handheld," May 2000, 311 pages.
Parada et al. Contextual Information Improves OOV Detection in Speech. Proceedings of the 2010 Annual Conference of the North American Chapter of the Association for Computational Linguistics, Jun. 2, 2010, 9 pages.

(56) References Cited

OTHER PUBLICATIONS

Pre-Appeal Brief Decision mailed on Jan. 18, 2022, issued in connection with U.S. Appl. No. 16/806,747, filed Mar. 2, 2020, 2 pages.
Pre-Appeal Brief Decision mailed on Jun. 2, 2021, issued in connection with U.S. Appl. No. 16/213,570, filed Dec. 7, 2018, 2 pages.
Preinterview First Office Action mailed on Aug. 5, 2019, issued in connection with U.S. Appl. No. 16/434,426, filed Jun. 7, 2019, 4 pages.
Preinterview First Office Action mailed on Mar. 25, 2020, issued in connection with U.S. Appl. No. 16/109,375, filed Aug. 22, 2018, 6 pages.
Preinterview First Office Action mailed on Sep. 30, 2019, issued in connection with U.S. Appl. No. 15/989,715, filed May 25, 2018, 4 pages.
Preinterview First Office Action mailed on May 7, 2020, issued in connection with U.S. Appl. No. 16/213,570, filed Dec. 7, 2018, 5 pages.
Preinterview First Office Action mailed on Jan. 8, 2021, issued in connection with U.S. Appl. No. 16/798,967, filed Feb. 24, 2020, 4 pages.
Presentations at WinHEC 2000, May 2000, 138 pages.
Renato De Mori. Spoken Language Understanding: A Survey. Automatic Speech Recognition Understanding, 2007. IEEE, Dec. 1, 2007, 56 pages.
Restriction Requirement mailed on Aug. 14, 2019, issued in connection with U.S. Appl. No. 16/214,711, filed Dec. 10, 2018, 5 pages.
Restriction Requirement mailed on Aug. 9, 2018, issued in connection with U.S. Appl. No. 15/717,621, filed Sep. 27, 2017, 8 pages.
Rottondi et al., "An Overview on Networked Music Performance Technologies," IEEE Access, vol. 4, pp. 8823-8843, 2016, DOI: 10.1109/ACCESS.2016.2628440, 21 pages.
Rybakov et al. Streaming keyword spotting on mobile devices, arXiv:2005.06720v2, Jul. 29, 2020, 5 pages.
Shan et al. Attention-based End-to-End Models for Small-Footprint Keyword Spotting, arXiv:1803.10916v1, Mar. 29, 2018, 5 pages.
Simon Doclo et al. Combined Acoustic Echo and Noise Reduction Using Gsvd-Based Optimal Filtering. In 2000 IEEE International Conference on Acoustics, Speech, and Signal Processing. Proceedings (Cat. No. 00CH37100), Aug. 6, 2002, 4 pages. [retrieved on Feb. 23, 2023], Retrieved from the Internet: URL: https://scholar.google.com/scholar?hl=en&as_sdt=0%2C14&q=COMBINED+ACOUSTIC+ECHO+AND+NOISE+REDUCTION+USING+GSVD-BASED+OPTIMAL+FILTERING&btnG=.
Snips: How to Snips—Assistant creation Installation, Jun. 26, 2017, 6 pages.
Souden et al. "An Integrated Solution for Online Multichannel Noise Tracking and Reduction." IEEE Transactions on Audio, Speech, and Language Processing, vol. 19. No. 7, Sep. 7, 2011, 11 pages.
Souden et al. "Gaussian Model-Based Multichannel Speech Presence Probability" IEEE Transactions on Audio, Speech, and Language Processing, vol. 18, No. 5, Jul. 5, 2010, 6pages.
Souden et al. "On Optimal Frequency-Domain Multichannel Linear Filtering for Noise Reduction." IEEE Transactions on Audio, Speech, and Language Processing, vol. 18, No. 2, Feb. 2010, 17pages.
Speidel, Hans. Chatbot Training: How to use training data to provide fully automated customer support. Retrieved from the Internet: URL: https://www.crowdguru.de/wp-content/uploads/Case-Study-Chatbox-training-How-to-use-training-data-to-provide-fully-automated-customer-support.pdf. Jun. 29, 2017, 4 pages.
Stemmer et al. Speech Recognition and Understanding on Hardware-Accelerated DSP. Proceedings of Interspeech 2017: Show & Tell Contribution, Aug. 20, 2017, 2 pages.
Steven J. Nowlan and Geoffrey E. Hinton "Simplifying Neural Networks by Soft Weight-Sharing" Neural Computation 4, 1992, 21 pages.
Tsiami et al. "Experiments in acoustic source localization using sparse arrays in adverse indoors environments", 2014 22nd European Signal Processing Conference, Sep. 1, 2014, 5 pages.
Tsung-Hsien Wen et al: "A Network-based End-to-End Trainable Task-oriented Dialogue System", CORR (ARXIV), vol. 1604. 04562v1, Apr. 15, 2016 (Apr. 15, 2016), pp. 1-11.
Tsung-Hsien Wen et al: "A Network-based End-to-End Trainable Task-oriented Dialogue System", CORR ARXIV, vol. 1604. 04562v1, Apr. 15, 2016, pp. 1-11, XP055396370, Stroudsburg, PA, USA.
Tweet: "How to start using Google app voice commands to make your life easier Share This Story shop @Bullet", Jan. 21, 2016, https://bgr.com/2016/01/21/best-ok-google-voice-commands/, 3 page.
Ullrich et al. "Soft Weight-Sharing for Neural Network Compression." ICLR 2017, 16 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Vacher at al. "Recognition of voice commands by multisource ASR and noise cancellation in a smart home environment" Signal Processing Conference 2012 Proceedings of the 20th European, IEEE, Aug. 27, 2012, 5 pages.
Vacher et al. "Speech Recognition in a Smart Home: Some Experiments for Telemonitoring," 2009 Proceedings of the 5th Conference on Speech Technology and Human-Computer Dialogoue, Constant, 2009, 10 pages.
"S Voice or Google Now?"; https://web.archive.org/web/20160807040123/lowdown.carphonewarehouse.com/news/s-voice-or-google-now/ . . . , Apr. 28, 2015; 4 pages.
Wen et al. A Network-based End-to-End Trainable Task-oriented Dialogue System, CORR (ARXIV), Apr. 15, 2016, 11 pages.
Wikipedia. "The Wayback Machine", Speech recognition software for Linux, Sep. 22, 2016, 4 pages. [retrieved on Mar. 28, 2022], Retrieved from the Internet: URL: https://web.archive.org/web/20160922151304/https://en.wikipedia.org/wiki/Speech_recognition_software_for_Linux.
Wolf et al. On the potential of channel selection for recognition of reverberated speech with multiple microphones. INTERSPEECH, TALP Research Center, Jan. 2010, 5 pages.
Wolfel et al. Multi-source far-distance microphone selection and combination for automatic transcription of lectures, INTERSPEECH 2006—ICSLP, Jan. 2006, 5 pages.
International Bureau, International Preliminary Report on Patentability, mailed on Apr. 26, 2022, issued in connection with International Application No. PCT/US2020/056632, filed on Oct. 21, 2020, 7 pages.
International Bureau, International Preliminary Report on Patentability, mailed on Mar. 31, 2020, issued in connection with International Application No. PCT/U.S. Pat. No. 2018053123, filed on Sep. 27, 2018, 12 pages.
International Bureau, International Preliminary Report on Patentability, mailed on Mar. 31, 2020, issued in connection with International Application No. PCT/U.S. Pat. No. 2018053472, filed on Sep. 28, 2018, 8 pages.
International Bureau, International Preliminary Report on Patentability, mailed on Mar. 31, 2020, issued in connection with International Application No. PCT/U.S. Pat. No. 2018053517, filed on Sep. 28, 2018, 10 pages.
International Bureau, International Preliminary Report on Patentability, mailed on Sep. 7, 2018, issued in connection with International Application No. PCT/US2017/018728, filed on Feb. 21, 2017, 8 pages.
International Bureau, International Preliminary Report on Patentability, mailed on Sep. 7, 2018, issued in connection with International Application No. PCT/US2017/018739, filed on Feb. 21, 2017, 7 pages.

(56) References Cited

OTHER PUBLICATIONS

International Bureau, International Search Report and Written Opinion mailed on Nov. 10, 2020, issued in connection with International Application No. PCT/US2020/044250, filed on Jul. 30, 2020, 15 pages.
International Bureau, International Search Report and Written Opinion mailed on Dec. 11, 2019, issued in connection with International Application No. PCT/US2019/052129, filed on Sep. 20, 2019, 18 pages.
International Bureau, International Search Report and Written Opinion mailed on Nov. 13, 2018, issued in connection with International Application No. PCT/US2018/045397, filed on Aug. 6, 2018, 11 pages.
International Bureau, International Search Report and Written Opinion mailed on Jan. 14, 2019, issued in connection with International Application No. PCT/U.S. Pat. No. 2018053472, filed on Sep. 28, 2018, 10 pages.
International Bureau, International Search Report and Written Opinion mailed on Jul. 14, 2020, issued in connection with International Application No. PCT/US2020/017150, filed on Feb. 7, 2020, 27 pages.
International Bureau, International Search Report and Written Opinion mailed on Nov. 14, 2017, issued in connection with International Application No. PCT/US2017/045521, filed on Aug. 4, 2017, 10 pages.
International Bureau, International Search Report and Written Opinion mailed on Jul. 17, 2019, issued in connection with International Application No. PCT/US2019/032934, filed on May 17, 2019, 17 pages.
International Bureau, International Search Report and Written Opinion mailed on Nov. 18, 2019, issued in connection with International Application No. PCT/US2019/048558, filed on Aug. 28, 2019, 11 pages.
International Bureau, International Search Report and Written Opinion mailed on Nov. 18, 2019, issued in connection with International Application No. PCT/US2019052841, filed on Sep. 25, 2019, 12 pages.
International Bureau, International Search Report and Written Opinion mailed on Mar. 2, 2020, issued in connection with International Application No. PCT/US2019064907, filed on Dec. 6, 2019, 11 pages.
International Bureau, International Search Report and Written Opinion mailed on Mar. 2, 2020, issued in connection with International Application No. PCT/US2019/064907, filed on Dec. 6, 2019, 9 pages.
International Bureau, International Search Report and Written Opinion mailed on Dec. 20, 2019, issued in connection with International Application No. PCT/US2019052654, filed on Sep. 24, 2019, 11 pages.
International Bureau, International Search Report and Written Opinion mailed on Mar. 20, 2023, issued in connection with International Application No. PCT/US2022/045399, filed on Sep. 30, 2022, 25 pages.
International Bureau, International Search Report and Written Opinion mailed on Sep. 21, 2020, issued in connection with International Application No. PCT/US2020/037229, filed on Jun. 11, 2020, 17 pages.
International Bureau, International Search Report and Written Opinion mailed on Oct. 22, 2020, issued in connection with International Application No. PCT/US2020/044282, filed on Jul. 30, 2020, 15 pages.
International Bureau, International Search Report and Written Opinion mailed on Apr. 23, 2021, issued in connection with International Application No. PCT/US2021/070007, filed on Jan. 6, 2021, 11 pages.
International Bureau, International Search Report and Written Opinion mailed on Jul. 24, 2018, issued in connection with International Application No. PCT/US2018/019010, filed on Feb. 21, 2018, 12 pages.
International Bureau, International Search Report and Written Opinion, mailed on Feb. 27, 2019, issued in connection with International Application No. PCT/US2018/053123, filed on Sep. 27, 2018, 16 pages.
International Bureau, International Search Report and Written Opinion mailed on Sep. 27, 2019, issued in connection with International Application No. PCT/US2019/039828, filed on Jun. 28, 2019, 13 pages.
International Bureau, International Search Report and Written Opinion mailed on Nov. 29, 2019, issued in connection with International Application No. PCT/US2019/053253, filed on Sep. 29, 2019, 14 pages.
International Bureau, International Search Report and Written Opinion mailed on Sep. 4, 2019, issued in connection with International Application No. PCT/US2019/033945, filed on May 24, 2019, 8 pages.
International Bureau, International Search Report and Written Opinion mailed on Aug. 6, 2020, issued in connection with International Application No. PCT/FR2019/000081, filed on May 24, 2019, 12 pages.
International Bureau, International Search Report and Written Opinion mailed on Dec. 6, 2018, issued in connection with International Application No. PCT/US2018/050050, filed on Sep. 7, 2018, 9 pages.
International Bureau, International Search Report and Written Opinion mailed on Dec. 6, 2019, issued in connection with International Application No. PCT/US2019050852, filed on Sep. 12, 2019, 10 pages.
International Bureau, International Search Report and Written Opinion mailed on Oct. 6, 2017, issued in connection with International Application No. PCT/US2017/045551, filed on Aug. 4, 2017, 12 pages.
International Bureau, International Search Report and Written Opinion mailed on Apr. 8, 2020, issued in connection with International Application No. PCT/US2019/067576, filed on Dec. 19, 2019, 12 pages.
International Searching Authority, International Search Report and Written Opinion mailed on Feb. 8, 2021, issued in connection with International Application No. PCT/EP2020/082243, filed on Nov. 16, 2020, 10 pages.
International Searching Authority, International Search Report and Written Opinion mailed on Feb. 12, 2021, issued in connection with International Application No. PCT/US2020/056632, filed on Oct. 21, 2020, 10 pages.
International Searching Authority, International Search Report and Written Opinion mailed on Dec. 19, 2018, in connection with International Application No. PCT/US2018/053517, 13 pages.
International Searching Authority, International Search Report and Written Opinion mailed on Nov. 22, 2017, issued in connection with International Application No. PCT/US2017/054063, filed on Sep. 28, 2017, 11 pages.
International Searching Authority, International Search Report and Written Opinion mailed on Apr. 23, 2021, issued in connection with International Application No. PCT/US2020/066231, filed on Dec. 18, 2020, 9 pages.
International Searching Authority, International Search Report and Written Opinion mailed on Jan. 23, 2018, issued in connection with International Application No. PCT/US2017/57220, filed on Oct. 18, 2017, 8 pages.
International Searching Authority, International Search Report and Written Opinion mailed on May 23, 2017, issued in connection with International Application No. PCT/US2017/018739, Filed on Feb. 21, 2017, 10 pages.
International Searching Authority, International Search Report and Written Opinion mailed on Oct. 23, 2017, issued in connection with International Application No. PCT/US2017/042170, filed on Jul. 14, 2017, 15 pages.
International Searching Authority, International Search Report and Written Opinion mailed on Oct. 24, 2017, issued in connection with International Application No. PCT/US2017/042227, filed on Jul. 14, 2017, 16 pages.

(56) References Cited

OTHER PUBLICATIONS

International Searching Authority, International Search Report and Written Opinion mailed on May 30, 2017, issued in connection with International Application No. PCT/US2017/018728, Filed on Feb. 21, 2017, 11 pages.
International Searching Authority, Invitation to Pay Additional Fees on Jan. 27, 2023, issued in connection with International Application No. PCT/US2022/045399, filed on Sep. 30, 2022, 19 pages.
Japanese Patent Office, Decision of Refusal and Translation mailed on Oct. 4, 2022, issued in connection with Japanese Patent Application No. 2021-535871, 6 pages.
Japanese Patent Office, Decision of Refusal and Translation mailed on May 23, 2023, issued in connection with Japanese Patent Application No. 2021-163622, 13 pages.
Japanese Patent Office, Decision of Refusal and Translation mailed on Jul. 26, 2022, issued in connection with Japanese Patent Application No. 2020-513852, 10 pages.
Japanese Patent Office, Decision of Refusal and Translation mailed on Jun. 8, 2021, issued in connection with Japanese Patent Application No. 2019-073348, 5 pages.
Japanese Patent Office, English Translation of Office Action mailed on Nov. 17, 2020, issued in connection with Japanese Application No. 2019-145039, 5 pages.
Japanese Patent Office, English Translation of Office Action mailed on Aug. 27, 2020, issued in connection with Japanese Application No. 2019-073349, 6 pages.
Japanese Patent Office, English Translation of Office Action mailed on Jul. 30, 2020, issued in connection with Japanese Application No. 2019-517281, 26 pages.
Notice of Allowance mailed on Apr. 13, 2022, issued in connection with U.S. Appl. No. 17/236,559, filed Apr. 21, 2021, 7 pages.
Notice of Allowance mailed on Dec. 13, 2017, issued in connection with U.S. Appl. No. 15/784,952, filed Oct. 16, 2017, 9 pages.
Notice of Allowance mailed on Dec. 13, 2021, issued in connection with U.S. Appl. No. 16/879,553, filed May 20, 2020, 15 pages.
Notice of Allowance mailed on Feb. 13, 2019, issued in connection with U.S. Appl. No. 15/959,907, filed Apr. 23, 2018, 10 pages.
Notice of Allowance mailed on Feb. 13, 2023, issued in connection with U.S. Appl. No. 18/045,360, filed Oct. 10, 2022, 9 pages.
Notice of Allowance mailed on Jan. 13, 2020, issued in connection with U.S. Appl. No. 16/192,126, filed Nov. 15, 2018, 6 pages.
Notice of Allowance mailed on Jan. 13, 2021, issued in connection with U.S. Appl. No. 16/539,843, filed Aug. 13, 2019, 5 pages.
Notice of Allowance mailed on Jul. 13, 2023, issued in connection with U.S. Appl. No. 18/145,501, filed Dec. 22, 2022, 9 pages.
Notice of Allowance mailed on Jun. 13, 2023, issued in connection with U.S. Appl. No. 17/249,776, filed Mar. 12, 2021, 10 pages.
Notice of Allowance mailed on Mar. 13, 2024, issued in connection with U.S. Appl. No. 18/449,254, filed Aug. 14, 2023, 10 pages.
Notice of Allowance mailed on Nov. 13, 2020, issued in connection with U.S. Appl. No. 16/131,409, filed Sep. 14, 2018, 11 pages.
Notice of Allowance mailed on Aug. 14, 2017, issued in connection with U.S. Appl. No. 15/098,867, filed Apr. 14, 2016, 10 pages.
Notice of Allowance mailed on Aug. 14, 2020, issued in connection with U.S. Appl. No. 16/598,125, filed Oct. 10, 2019, 5 pages.
Notice of Allowance mailed on Aug. 14, 2023, issued in connection with U.S. Appl. No. 17/549,034, filed Dec. 13, 2021, 9 pages.
Notice of Allowance mailed on Dec. 14, 2023, issued in connection with U.S. Appl. No. 17/722,661, filed Apr. 18, 2022, 12 pages.
Notice of Allowance mailed on Feb. 14, 2017, issued in connection with U.S. Appl. No. 15/229,855, filed Aug. 5, 2016, 11 pages.
Notice of Allowance mailed on Jan. 14, 2021, issued in connection with U.S. Appl. No. 17/087,423, filed Nov. 2, 2020, 8 pages.
Notice of Allowance mailed on Jan. 14, 2022, issued in connection with U.S. Appl. No. 16/966,397, filed Jul. 30, 2020, 5 pages.
Notice of Allowance mailed on Jun. 14, 2017, issued in connection with U.S. Appl. No. 15/282,554, filed Sep. 30, 2016, 11 pages.
Notice of Allowance mailed on Nov. 14, 2018, issued in connection with U.S. Appl. No. 15/297,627, filed Oct. 19, 2016, 5 pages.
Notice of Allowance mailed on Sep. 14, 2023, issued in connection with U.S. Appl. No. 18/061,579, filed Dec. 5, 2022, 7 pages.
Notice of Allowance mailed on Aug. 15, 2022, issued in connection with U.S. Appl. No. 17/101,949, filed Nov. 23, 2020, 11 pages.
Notice of Allowance mailed on Dec. 15, 2017, issued in connection with U.S. Appl. No. 15/223,218, filed Jul. 29, 2016, 7 pages.
Notice of Allowance mailed on Dec. 15, 2023, issued in connection with U.S. Appl. No. 18/157,937, filed Jan. 23, 2023, 8 pages.
Notice of Allowance mailed on Feb. 15, 2023, issued in connection with U.S. Appl. No. 17/659,613, filed Apr. 18, 2022, 21 pages.
Notice of Allowance mailed on Jan. 15, 2020, issued in connection with U.S. Appl. No. 16/439,009, filed Jun. 12, 2019, 9 pages.
Notice of Allowance mailed on Jun. 15, 2023, issued in connection with U.S. Appl. No. 17/305,698, filed Jul. 13, 2021, 8 pages.
Notice of Allowance mailed on Jun. 15, 2023, issued in connection with U.S. Appl. No. 17/305,920, filed Jul. 16, 2021, 8 pages.
Notice of Allowance mailed on Mar. 15, 2019, issued in connection with U.S. Appl. No. 15/804,776, filed Nov. 6, 2017, 9 pages.
Notice of Allowance mailed on Oct. 15, 2019, issued in connection with U.S. Appl. No. 16/437,437, filed Jun. 11, 2019, 9 pages.
Notice of Allowance mailed on Oct. 15, 2020, issued in connection with U.S. Appl. No. 16/715,713, filed Dec. 16, 2019, 9 pages.
Notice of Allowance mailed on Oct. 15, 2021, issued in connection with U.S. Appl. No. 16/213,570, filed Dec. 7, 2018, 8 pages.
Notice of Allowance mailed on Sep. 15, 2021, issued in connection with U.S. Appl. No. 16/685,135, filed Nov. 15, 2019, 10 pages.
Notice of Allowance mailed on Sep. 15, 2022, issued in connection with U.S. Appl. No. 16/736,725, filed Jan. 1, 2020, 11 pages.
Notice of Allowance mailed on Apr. 16, 2021, issued in connection with U.S. Appl. No. 16/798,967, filed Feb. 24, 2020, 16 pages.
Notice of Allowance mailed on Aug. 16, 2017, issued in connection with U.S. Appl. No. 15/098,892, filed Apr. 14, 2016, 9 pages.
Notice of Allowance mailed on Aug. 16, 2023, issued in connection with U.S. Appl. No. 17/536,572, filed Nov. 29, 2021, 7 pages.
Notice of Allowance mailed on Apr. 17, 2024, issued in connection with U.S. Appl. No. 18/088,976, filed Dec. 27, 2022, 7 pages.
Notice of Allowance mailed on Apr. 17, 2024, issued in connection with U.S. Appl. No. 18/471,693, filed Sep. 21, 2023, 12 pages.
Notice of Allowance mailed on Aug. 17, 2017, issued in connection with U.S. Appl. No. 15/131,244, filed Apr. 18, 2016, 9 pages.
Notice of Allowance mailed on Aug. 17, 2022, issued in connection with U.S. Appl. No. 17/135,347, filed Dec. 28, 2020, 14 pages.
Notice of Allowance mailed on Feb. 17, 2021, issued in connection with U.S. Appl. No. 16/715,984, filed Dec. 16, 2019, 8 pages.
Notice of Allowance mailed on Jul. 17, 2019, issued in connection with U.S. Appl. No. 15/718,911, filed Sep. 28, 2017, 5 pages.
Notice of Allowance mailed on Jun. 17, 2020, issued in connection with U.S. Appl. No. 16/141,875, filed Sep. 25, 2018, 6 pages.
Notice of Allowance mailed on Nov. 17, 2022, issued in connection with U.S. Appl. No. 17/486,222, filed Sep. 27, 2021, 10 pages.
Notice of Allowance mailed on Sep. 17, 2018, issued in connection with U.S. Appl. No. 15/211,689, filed Jul. 15, 2016, 6 pages.
Notice of Allowance mailed on Apr. 18, 2019, issued in connection with U.S. Appl. No. 16/173,797, filed Oct. 29, 2018, 9 pages.
Notice of Allowance mailed on Dec. 18, 2019, issued in connection with U.S. Appl. No. 16/434,426, filed Jun. 7, 2019, 13 pages.
Notice of Allowance mailed on Feb. 18, 2020, issued in connection with U.S. Appl. No. 16/022,662, filed Jun. 28, 2018, 8 pages.
Notice of Allowance mailed on Jul. 18, 2019, issued in connection with U.S. Appl. No. 15/438,749, filed Feb. 21, 2017, 9 pages.
Non-Final Office Action mailed on Feb. 9, 2021, issued in connection with U.S. Appl. No. 16/806,747, filed Mar. 2, 2020, 16 pages.
Non-Final Office Action mailed on May 9, 2018, issued in connection with U.S. Appl. No. 15/818,051, filed Nov. 20, 2017, 22 pages.
Non-Final Office Action mailed on Sep. 9, 2020, issued in connection with U.S. Appl. No. 16/168,389, filed Oct. 23, 2018, 29 pages.
Notice of Allowance mailed Aug. 10, 2021, issued in connection with U.S. Appl. No. 17/157,686, filed Jan. 25, 2021, 9 pages.
Notice of Allowance mailed Aug. 2, 2021, issued in connection with U.S. Appl. No. 16/660,197, filed Oct. 22, 2019, 7 pages.
Notice of Allowance mailed Mar. 31, 2021, issued in connection with U.S. Appl. No. 16/813,643, filed Mar. 9, 2020, 11 pages.

(56) References Cited

OTHER PUBLICATIONS

Notice of Allowance mailed Aug. 4, 2021, issued in connection with U.S. Appl. No. 16/780,483, filed Feb. 3, 2020, 5 pages.
Notice of Allowance mailed on Dec. 2, 2019, issued in connection with U.S. Appl. No. 15/718,521, filed Sep. 28, 2017, 15 pages.
Notice of Allowance mailed on Nov. 2, 2022, issued in connection with U.S. Appl. No. 16/989,805, filed Aug. 10, 2020, 5 pages.
Notice of Allowance mailed on Nov. 3, 2022, issued in connection with U.S. Appl. No. 17/448,015, filed Sep. 17, 2021, 7 pages.
Notice of Allowance mailed on Dec. 4, 2017, issued in connection with U.S. Appl. No. 15/277,810, filed Sep. 27, 2016, 5 pages.
Notice of Allowance mailed on Jul. 5, 2018, issued in connection with U.S. Appl. No. 15/237,133, filed Aug. 15, 2016, 5 pages.
Notice of Allowance mailed on Feb. 6, 2023, issued in connection with U.S. Appl. No. 17/077,974, filed Oct. 22, 2020, 7 pages.
Notice of Allowance mailed on Jan. 6, 2023, issued in connection with U.S. Appl. No. 17/896,129, filed Aug. 26, 2022, 13 pages.
Notice of Allowance mailed on Dec. 7, 2022, issued in connection with U.S. Appl. No. 17/315,599, filed May 10, 2021, 11 pages.
Notice of Allowance mailed on Feb. 8, 2023, issued in connection with U.S. Appl. No. 17/446,690, filed Sep. 1, 2021, 8 pages.
Notice of Allowance mailed on Jan. 9, 2023, issued in connection with U.S. Appl. No. 17/247,507, filed Dec. 14, 2020, 8 pages.
Notice of Allowance mailed on Jul. 9, 2018, issued in connection with U.S. Appl. No. 15/438,741, filed Feb. 21, 2017, 5 pages.
Notice of Allowance mailed on Jun. 9, 2023, issued in connection with U.S. Appl. No. 17/532,674, filed Nov. 22, 2021, 13 pages.
Notice of Allowance mailed on Mar. 9, 2023, issued in connection with U.S. Appl. No. 17/662,302, filed May 6, 2022, 7 pages.
Notice of Allowance mailed on Nov. 9, 2022, issued in connection with U.S. Appl. No. 17/385,542, filed Jul. 26, 2021, 8 pages.
Notice of Allowance mailed on Apr. 1, 2019, issued in connection with U.S. Appl. No. 15/935,966, filed Mar. 26, 2018, 5 pages.
Notice of Allowance mailed on Aug. 1, 2018, issued in connection with U.S. Appl. No. 15/297,627, filed Oct. 19, 2016, 9 pages.
Notice of Allowance mailed on Feb. 1, 2022, issued in connection with U.S. Appl. No. 16/439,046, filed Jun. 12, 2019, 9 pages.
Notice of Allowance mailed on Jun. 1, 2021, issued in connection with U.S. Appl. No. 16/219,702, filed Dec. 13, 2018, 8 pages.
Notice of Allowance mailed on Jun. 1, 2021, issued in connection with U.S. Appl. No. 16/685,135, filed Nov. 15, 2019, 10 pages.
Notice of Allowance mailed on Mar. 1, 2022, issued in connection with U.S. Appl. No. 16/879,549, filed May 20, 2020, 9 pages.
Notice of Allowance mailed on Sep. 1, 2021, issued in connection with U.S. Appl. No. 15/936,177, filed Mar. 26, 2018, 22 pages.
Notice of Allowance mailed on Aug. 10, 2020, issued in connection with U.S. Appl. No. 16/424,825, filed May 29, 2019, 9 pages.
Notice of Allowance mailed on Feb. 10, 2021, issued in connection with U.S. Appl. No. 16/138,111, filed Sep. 21, 2018, 8 pages.
Notice of Allowance mailed on Jul. 10, 2023, issued in connection with U.S. Appl. No. 17/315,599, filed May 10, 2021, 2 pages.
Notice of Allowance mailed on Jun. 10, 2022, issued in connection with U.S. Appl. No. 16/879,549, filed May 20, 2020, 8 pages.
Notice of Allowance mailed on Apr. 11, 2018, issued in connection with U.S. Appl. No. 15/719,454, filed Sep. 28, 2017, 15 pages.
Notice of Allowance mailed on Aug. 11, 2023, issued in connection with U.S. Appl. No. 17/878,649, filed Aug. 1, 2022, 7 pages.
Notice of Allowance mailed on May 11, 2022, issued in connection with U.S. Appl. No. 17/135,123, filed Dec. 28, 2020, 8 pages.
Notice of Allowance mailed on May 11, 2022, issued in connection with U.S. Appl. No. 17/145,667, filed Jan. 11, 2021, 7 pages.
Notice of Allowance mailed on May 11, 2023, issued in connection with U.S. Appl. No. 18/061,638, filed Dec. 5, 2022, 15 pages.
Notice of Allowance mailed on Oct. 11, 2019, issued in connection with U.S. Appl. No. 16/437,476, filed Jun. 11, 2019, 9 pages.
Notice of Allowance mailed on Sep. 11, 2019, issued in connection with U.S. Appl. No. 16/154,071, filed Oct. 8, 2018, 5 pages.
Notice of Allowance mailed on Aug. 12, 2021, issued in connection with U.S. Appl. No. 16/819,755, filed Mar. 16, 2020, 6 pages.
Notice of Allowance mailed on Dec. 12, 2018, issued in connection with U.S. Appl. No. 15/811,468, filed Nov. 13, 2017, 9 pages.
Notice of Allowance mailed on Jul. 12, 2017, issued in connection with U.S. Appl. No. 15/098,805, filed Apr. 14, 2016, 8 pages.
Notice of Allowance mailed on Jul. 12, 2022, issued in connection with U.S. Appl. No. 16/907,953, filed Jun. 22, 2020, 8 pages.
Notice of Allowance mailed on Jul. 12, 2022, issued in connection with U.S. Appl. No. 17/391,404, filed Aug. 2, 2021, 13 pages.
Notice of Allowance mailed on Jul. 12, 2023, issued in connection with U.S. Appl. No. 18/151,619, filed Jan. 9, 2023, 13 pages.
Notice of Allowance mailed on Jun. 12, 2019, issued in connection with U.S. Appl. No. 15/670,361, filed Aug. 7, 2017, 7 pages.
Notice of Allowance mailed on Jun. 12, 2023, issued in connection with U.S. Appl. No. 17/453,632, filed Nov. 4, 2021, 9 pages.
Notice of Allowance mailed on May 12, 2021, issued in connection with U.S. Appl. No. 16/402,617, filed May 3, 2019, 8 pages.
Notice of Allowance mailed on Sep. 12, 2018, issued in connection with U.S. Appl. No. 15/438,744, filed Feb. 21, 2017, 15 pages.
European Patent Office, European EPC Article 94.3 mailed on Feb. 23, 2021, issued in connection with European Application No. 17200837.7, 8 pages.
European Patent Office, European EPC Article 94.3 mailed on Feb. 23, 2023, issued in connection with European Application No. 19839734.1, 8 pages.
European Patent Office, European EPC Article 94.3 mailed on Jan. 24, 2024, issued in connection with European Application No. 21180778.9, 8 pages.
European Patent Office, European EPC Article 94.3 mailed on Feb. 26, 2021, issued in connection with European Application No. 18789515.6, 8 pages.
European Patent Office, European EPC Article 94.3 mailed on Jun. 27, 2023, issued in connection with European Application No. 21195031.6, 4 pages.
European Patent Office, European EPC Article 94.3 mailed on Nov. 27, 2023, issued in connection with European Application No. 19780508.8, 7 pages.
European Patent Office, European EPC Article 94.3 mailed on Feb. 28, 2024, issued in connection with European Application No. 18306501, 7 pages.
European Patent Office, European EPC Article 94.3 mailed on Nov. 28, 2022, issued in connection with European Application No. 18789515.6, 7 pages.
European Patent Office, European EPC Article 94.3 mailed on Nov. 28, 2023, issued in connection with European Application No. 19731415.6, 9 pages.
European Patent Office, European EPC Article 94.3 mailed on Apr. 29, 2024, issued in connection with European Application No. 21195031.6, 4 pages.
European Patent Office, European EPC Article 94.3 mailed on Mar. 29, 2023, issued in connection with European Application No. 22182193.7, 4 pages.
European Patent Office, European EPC Article 94.3 mailed on Mar. 3, 2022, issued in connection with European Application No. 19740292.8, 10 pages.
European Patent Office, European EPC Article 94.3 mailed on Jun. 30, 2022, issued in connection with European Application No. 19765953.5, 4 pages.
European Patent Office, European EPC Article 94.3 mailed on Aug. 31, 2023, issued in connection with European Application No. 19773326.4, 5 pages.
European Patent Office, European EPC Article 94.3 mailed on Jul. 31, 2023, issued in connection with European Application No. 21164130.3, 5 pages.
European Patent Office, European EPC Article 94.3 mailed on Apr. 6, 2023, issued in connection with European Application No. 21193616.6, 7 pages.
European Patent Office, European EPC Article 94.3 mailed on Sep. 6, 2023, issued in connection with European Application No. 19197116.7, 4 pages.
European Patent Office, European EPC Article 94.3 mailed on Sep. 7, 2023, issued in connection with European Application No. 20185599.6, 6 pages.

(56) References Cited

OTHER PUBLICATIONS

European Patent Office, European Extended Search Report mailed on Oct. 7, 2021, issued in connection with European Application No. 21193616.6, 9 pages.
European Patent Office, European Extended Search Report mailed on Oct. 7, 2022, issued in connection with European Application No. 22182193.7, 8 pages.
European Patent Office, European Extended Search Report mailed on Jan. 2, 2024, issued in connection with European Application No. 23188226.7, 10 pages.
European Patent Office, European Extended Search Report mailed on Apr. 22, 2022, issued in connection with European Application No. 21195031.6, 14 pages.
European Patent Office, European Extended Search Report mailed on Jun. 23, 2022, issued in connection with European Application No. 22153180.9, 6 pages.
European Patent Office, European Extended Search Report mailed on Nov. 25, 2020, issued in connection with European Application No. 20185599.6, 9 pages.
European Patent Office, European Extended Search Report mailed on Feb. 3, 2020, issued in connection with European Application No. 19197116.7, 9 pages.
European Patent Office, European Extended Search Report mailed on Jan. 3, 2019, issued in connection with European Application No. 177570702, 8 pages.
European Patent Office, European Extended Search Report mailed on Jan. 3, 2019, issued in connection with European Application No. 17757075.1, 9 pages.
European Patent Office, European Extended Search Report mailed on Jun. 30, 2022, issued in connection with European Application No. 21212763.3, 9 pages.
European Patent Office, European Extended Search Report mailed on Oct. 30, 2017, issued in connection with EP Application No. 17174435.2, 11 pages.
European Patent Office, European Extended Search Report mailed on Aug. 6, 2020, issued in connection with European Application No. 20166332.5, 10 pages.
European Patent Office, European Extended Search Report mailed on Jul. 8, 2022, issued in connection with European Application No. 22153523.0, 9 pages.
European Patent Office, European Office Action mailed on Jul. 1, 2020, issued in connection with European Application No. 17757075.1, 7 pages.
European Patent Office, European Office Action mailed on Jan. 14, 2020, issued in connection with European Application No. 17757070.2, 7 pages.
European Patent Office, European Office Action mailed on Jan. 21, 2021, issued in connection with European Application No. 17792272.1, 7 pages.
European Patent Office, European Office Action mailed on Jan. 22, 2019, issued in connection with European Application No. 17174435.2, 9 pages.
European Patent Office, European Office Action mailed on Sep. 23, 2020, issued in connection with European Application No. 18788976.1, 7 pages.
European Patent Office, European Office Action mailed on Oct. 26, 2020, issued in connection with European Application No. 18760101.8, 4 pages.
European Patent Office, European Office Action mailed on Aug. 30, 2019, issued in connection with European Application No. 17781608.9, 6 pages.
European Patent Office, European Office Action mailed on Sep. 9, 2020, issued in connection with European Application No. 18792656.3, 10 pages.
European Patent Office, European Search Report mailed on Mar. 1, 2022, issued in connection with European Application No. 21180778.9, 9 pages.
European Patent Office, European Search Report mailed on Feb. 2, 2024, issued in connection with European Application No. 23200723.7, 5 pages.
European Patent Office, European Search Report mailed on Oct. 4, 2022, issued in connection with European Application No. 22180226.7, 6 pages.
European Patent Office, European Search Report mailed on Sep. 21, 2023, issued in connection with European Application No. 23172783.5, 8 pages.
European Patent Office, Examination Report mailed on Jul. 15, 2021, issued in connection with European Patent Application No. 19729968.8, 7 pages.
European Patent Office, Extended Search Report mailed on Aug. 13, 2021, issued in connection with European Patent Application No. 21164130.3, 11 pages.
European Patent Office, Extended Search Report mailed on May 16, 2018, issued in connection with European Patent Application No. 17200837.7, 11 pages.
European Patent Office, Extended Search Report mailed on Jul. 25, 2019, issued in connection with European Patent Application No. 18306501.0, 14 pages.
European Patent Office, Extended Search Report mailed on May 29, 2020, issued in connection with European Patent Application No. 19209389.6, 8 pages.
European Patent Office, Summons to Attend Oral Proceedings mailed on Jul. 15, 2022, issued in connection with European Application No. 17792272.1, 11 pages.
European Patent Office, Summons to Attend Oral Proceedings mailed on Dec. 20, 2019, issued in connection with European Application No. 17174435.2, 13 pages.
Notice of Allowance mailed on Jul. 18, 2019, issued in connection with U.S. Appl. No. 15/721,141, filed Sep. 29, 2017, 8 pages.
Notice of Allowance mailed on Jul. 18, 2022, issued in connection with U.S. Appl. No. 17/222,151, filed Apr. 5, 2021, 5 pages.
Notice of Allowance mailed on Mar. 18, 2021, issued in connection with U.S. Appl. No. 16/177,185, filed Oct. 31, 2018, 8 pages.
Notice of Allowance mailed on Aug. 19, 2020, issued in connection with U.S. Appl. No. 16/271,560, filed Feb. 8, 2019, 9 pages.
Notice of Allowance mailed on Dec. 19, 2018, issued in connection with U.S. Appl. No. 15/818,051, filed Nov. 20, 2017, 9 pages.
Notice of Allowance mailed on Jul. 19, 2018, issued in connection with U.S. Appl. No. 15/681,937, filed Aug. 21, 2017, 7 pages.
Notice of Allowance mailed on Mar. 19, 2021, issued in connection with U.S. Appl. No. 17/157,686, filed Jan. 25, 2021, 11 pages.
Notice of Allowance mailed on Aug. 2, 2019, issued in connection with U.S. Appl. No. 16/102,650, filed Aug. 13, 2018, 5 pages.
Notice of Allowance mailed on Dec. 2, 2020, issued in connection with U.S. Appl. No. 15/989,715, filed May 25, 2018, 11 pages.
Notice of Allowance mailed on Dec. 2, 2021, issued in connection with U.S. Appl. No. 16/841,116, filed Apr. 6, 2020, 5 pages.
Notice of Allowance mailed on Oct. 2, 2023, issued in connection with U.S. Appl. No. 17/810,533, filed Jul. 1, 2022, 8 pages.
Notice of Allowance mailed on Sep. 2, 2020, issued in connection with U.S. Appl. No. 16/214,711, filed Dec. 10, 2018, 9 pages.
Notice of Allowance mailed on Dec. 20, 2022, issued in connection with U.S. Appl. No. 16/806,747, filed Mar. 2, 2020, 5 pages.
Notice of Allowance mailed on Jan. 20, 2023, issued in connection with U.S. Appl. No. 16/915,234, filed Jun. 29, 2020, 6 pages.
Notice of Allowance mailed on Jul. 20, 2020, issued in connection with U.S. Appl. No. 15/984,073, filed May 18, 2018, 12 pages.
Notice of Allowance mailed on Jun. 20, 2022, issued in connection with U.S. Appl. No. 16/947,895, filed Aug. 24, 2020, 7 pages.
Notice of Allowance mailed on Mar. 20, 2018, issued in connection with U.S. Appl. No. 15/784,952, filed Oct. 16, 2017, 7 pages.
Notice of Allowance mailed on Mar. 20, 2023, issued in connection with U.S. Appl. No. 17/562,412, filed Dec. 27, 2021, 9 pages.
Notice of Allowance mailed on Oct. 20, 2021, issued in connection with U.S. Appl. No. 16/439,032, filed Jun. 12, 2019, 8 pages.
Notice of Allowance mailed on Sep. 20, 2018, issued in connection with U.S. Appl. No. 15/946,599, filed Apr. 5, 2018, 7 pages.
Notice of Allowance mailed on Apr. 21, 2021, issued in connection with U.S. Appl. No. 16/145,275, filed Sep. 28, 2018, 8 pages.
Notice of Allowance mailed on Aug. 21, 2023, issued in connection with U.S. Appl. No. 17/548,921, filed Dec. 13, 2021, 10 pages.
Notice of Allowance mailed on Dec. 21, 2021, issued in connection with U.S. Appl. No. 16/271,550, filed Feb. 8, 2019, 11 pages.

(56) References Cited

OTHER PUBLICATIONS

Notice of Allowance mailed on Feb. 21, 2020, issued in connection with U.S. Appl. No. 16/416,752, filed May 20, 2019, 6 pages.
Notice of Allowance mailed on Jan. 21, 2020, issued in connection with U.S. Appl. No. 16/672,764, filed Nov. 4, 2019, 10 pages.
Notice of Allowance mailed on Jan. 21, 2021, issued in connection with U.S. Appl. No. 16/600,644, filed Oct. 14, 2019, 7 pages.
Notice of Allowance mailed on Jul. 21, 2023, issued in connection with U.S. Appl. No. 17/986,241, filed Nov. 14, 2022, 12 pages.
Notice of Allowance mailed on Mar. 21, 2023, issued in connection with U.S. Appl. No. 17/353,254, filed Jun. 21, 2021, 8 pages.
Notice of Allowance mailed on Nov. 21, 2022, issued in connection with U.S. Appl. No. 17/454,676, filed Nov. 12, 2021, 8 pages.
Notice of Allowance mailed on Oct. 21, 2019, issued in connection with U.S. Appl. No. 15/946,585, filed Apr. 5, 2018, 5 pages.
Notice of Allowance mailed on Sep. 21, 2022, issued in connection with U.S. Appl. No. 17/128,949, filed Dec. 21, 2020, 8 pages.
Notice of Allowance mailed on Aug. 22, 2017, issued in connection with U.S. Appl. No. 15/273,679, filed Sep. 22, 2016, 5 pages.
Notice of Allowance mailed on Jan. 22, 2018, issued in connection with U.S. Appl. No. 15/178,180, filed Jun. 9, 2016, 9 pages.
Notice of Allowance mailed on Jul. 22, 2020, issued in connection with U.S. Appl. No. 16/131,409, filed Sep. 14, 2018, 13 pages.
Notice of Allowance mailed on Jul. 22, 2020, issued in connection with U.S. Appl. No. 16/790,621, filed Feb. 13, 2020, 10 pages.
Notice of Allowance mailed on Nov. 22, 2021, issued in connection with U.S. Appl. No. 16/834,483, filed Mar. 30, 2020, 10 pages.
Notice of Allowance mailed on Sep. 22, 2022, issued in connection with U.S. Appl. No. 17/163,506, filed Jan. 31, 2021, 13 pages.
Notice of Allowance mailed on Sep. 22, 2022, issued in connection with U.S. Appl. No. 17/248,427, filed Jan. 25, 2021, 9 pages.
Notice of Allowance mailed on Aug. 23, 2021, issued in connection with U.S. Appl. No. 16/109,375, filed Aug. 22, 2018, 10 pages.
Notice of Allowance mailed on Feb. 23, 2023, issued in connection with U.S. Appl. No. 17/532,674, filed Nov. 22, 2021, 10 pages.
Notice of Allowance mailed on Jun. 23, 2021, issued in connection with U.S. Appl. No. 16/814,844, filed Mar. 10, 2020, 8 pages.
Notice of Allowance mailed on Apr. 24, 2019, issued in connection with U.S. Appl. No. 16/154,469, filed Oct. 8, 2018, 5 pages.
Notice of Allowance mailed on Mar. 24, 2022, issued in connection with U.S. Appl. No. 16/378,516, filed Apr. 8, 2019, 7 pages.
Notice of Allowance mailed on Nov. 24, 2023, issued in connection with U.S. Appl. No. 18/070,024, filed Nov. 28, 2022, 7 pages.
Notice of Allowance mailed on Oct. 25, 2021, issued in connection with U.S. Appl. No. 16/723,909, filed Dec. 20, 2019, 11 pages.
Notice of Allowance mailed on Apr. 26, 2022, issued in connection with U.S. Appl. No. 17/896,129, filed Aug. 26, 2022, 8 pages.
Notice of Allowance mailed on Apr. 26, 2023, issued in connection with U.S. Appl. No. 17/658,717, filed Apr. 11, 2022, 11 pages.
Notice of Allowance mailed on Aug. 26, 2020, issued in connection with U.S. Appl. No. 15/948,541, filed Apr. 9, 2018, 9 pages.
Notice of Allowance mailed on Aug. 26, 2022, issued in connection with U.S. Appl. No. 17/145,667, filed Jan. 11, 2021, 8 pages.
Notice of Allowance mailed on May 26, 2021, issued in connection with U.S. Appl. No. 16/927,670, filed Jul. 13, 2020, 10 pages.
Final Office Action mailed on Jun. 8, 2021, issued in connection with U.S. Appl. No. 16/271,550, filed Feb. 8, 2019, 41 pages.
Final Office Action mailed on Sep. 8, 2020, issued in connection with U.S. Appl. No. 16/213,570, filed Dec. 7, 2018, 12 pages.
Final Office Action mailed on Aug. 9, 2023, issued in connection with U.S. Appl. No. 17/493,430, filed Oct. 4, 2021, 19 pages.
Fiorenza Arisio et al. "Deliverable 1.1 User Study, analysis of requirements and definition of the application task," May 31, 2012, http://dirha.fbk.eu/sites/dirha.fbk.eu/files/docs/DIRHA_D1.1., 31 pages.
First Action Interview Office Action mailed on Mar. 8, 2021, issued in connection with U.S. Appl. No. 16/798,967, filed Feb. 24, 2020, 4 pages.
First Action Interview Office Action mailed on Aug. 14, 2019, issued in connection with U.S. Appl. No. 16/227,308, filed Dec. 20, 2018, 4 pages.
First Action Interview Office Action mailed on Jun. 15, 2020, issued in connection with U.S. Appl. No. 16/213,570, filed Dec. 7, 2018, 4 pages.
First Action Interview Office Action mailed on Jun. 2, 2020, issued in connection with U.S. Appl. No. 16/109,375, filed Aug. 22, 2018, 10 pages.
First Action Interview Office Action mailed on Jan. 22, 2020, issued in connection with U.S. Appl. No. 15/989,715, filed May 25, 2018, 3 pages.
First Action Interview Office Action mailed on Jul. 5, 2019, issued in connection with U.S. Appl. No. 16/227,308, filed Dec. 20, 2018, 4 pages.
Freiberger, Karl, "Development and Evaluation of Source Localization Algorithms for Coincident Microphone Arrays," Diploma Thesis, Apr. 1, 2010, 106 pages.
Giacobello et al. "A Sparse Nonuniformly Partitioned Multidelay Filter for Acoustic Echo Cancellation," 2013, IEEE Workshop on Applications of Signal Processing to Audio and Acoustics, Oct. 2013, New Paltz, NY, 4 pages.
Giacobello et al. "Tuning Methodology for Speech Enhancement Algorithms using a Simulated Conversational Database and Perceptual Objective Measures," 2014, 4th Joint Workshop on Handsfree Speech Communication and Microphone Arrays HSCMA, 2014, 5 pages.
*Google LLC* v. *Sonos, Inc.*, International Trade Commission Case No. 337-TA-1330, Order No. 25: Regarding Respondent Sonos, Inc.'s Omnibus Motion for Summary Determination; dated May 16, 2023, 7 pages.
*Google LLC* v. *Sonos, Inc.*, International Trade Commission Case No. 337-TA-1330, Order No. 28: Regarding Respondent Sonos, Inc.'s Omnibus Motion for Summary Determination; dated May 22, 2023, 3 pages.
*Google LLC* v. *Sonos, Inc.*, International Trade Commission Case No. 337-TA-1330, Order No. 37: Regarding Complainant Google LLC's Motions in Limine; dated Jul. 7, 2023, 10 pages.
*Google LLC* v. *Sonos, Inc.*, International Trade Commission Case No. 337-TA-1330, Respondent Sonos, Inc.'s Motion in Limine No. 4. Motion to Exclude Untimely Validity Arguments Regarding Claim 11 of U.S. Pat. No. 11,024,311; dated Jun. 13, 2023, 34 pages.
*Google LLC* v. *Sonos, Inc.*, International Trade Commission Case No. 337-TA-1330, Respondent Sonos, Inc.'s Response to Google's Motion in Limine No. 3 Preclude Sonos from Presenting Evidence or Argument that Claim 3 of the '748 Patent is Indefinite for Lack of Antecedent Basis; dated Jun. 12, 2023, 26 pages.
Han et al. "Deep Compression: Compressing Deep Neural Networks with Pruning, Trained Quantization and Huffman Coding." ICLR 2016, Feb. 15, 2016, 14 pages.
Hans Speidel: "Chatbot Training: How to use training data to provide fully automated customer support", Jun. 29, 2017, pp. 1-3, XP055473185, Retrieved from the Internet: URL:https://www.crowdguru.de/wp•content/uploads/Case-Study-Chatbot-training-How-to-use•training-data-to-provide-fully-automated-customer-support.pdf [retrieved on May 7, 2018].
Helwani et al."Source-domain adaptive filtering for MIMO systems with application to acoustic echo cancellation", Acoustics Speech and Signal Processing, 2010 IEEE International Conference, Mar. 14, 2010, 4 pages.
Helwani et al. Source-domain adaptive filtering for MIMO systems with application to acoustic echo cancellation. In 2010 IEEE International Conference on Acoustics, Speech and Signal Processing, Jun. 28, 2010, 4 pages. [retrieved on Feb. 23, 2023], Retrieved from the Internet: URL: https://scholar.google.com/scholar?hl=en&as_sdt=0%2C14&q=SOURCE-DOMAIN+ADAPTIVE+FILTERING+FOR+MIMO+SYSTEMS+WITH+APPLICATION+TO+ACOUSTIC+ECHO+CANCELLATION&btnG=.
Hirano et al. "A Noise-Robust Stochastic Gradient Algorithm with an Adaptive Step-Size Suitable for Mobile Hands-Free Telephones," 1995, International Conference on Acoustics, Speech, and Signal Processing, vol. 2, 4 pages.
Indian Patent Office, Examination Report mailed on May 24, 2021, issued in connection with Indian Patent Application No. 201847035595, 6 pages.

(56) References Cited

OTHER PUBLICATIONS

Indian Patent Office, Examination Report mailed on Feb. 25, 2021, issued in connection with Indian Patent Application No. 201847035625, 6 pages.
Indian Patent Office, Examination Report mailed on Feb. 28, 2024, issued in connection with Indian Patent Application No. 201847035625, 3 pages.
Indian Patent Office, Examination Report mailed on Dec. 5, 2023, issued in connection with Indian Patent Application No. 201847035625, 3 pages.
International Bureau, International Preliminary Report on Patentability and Written Opinion, mailed on Apr. 1, 2021, issued in connection with International Application No. PCT/US2019/052129, filed on Sep. 20, 2019, 13 pages.
International Bureau, International Preliminary Report on Patentability and Written Opinion, mailed on Jul. 1, 2021, issued in connection with International Application No. PCT/US2019/067576, filed on Dec. 19, 2019, 8 pages.
International Bureau, International Preliminary Report on Patentability and Written Opinion, mailed on Aug. 10, 2021, issued in connection with International Application No. PCT/US2020/017150, filed on Feb. 7, 2020, 20 pages.
International Bureau, International Preliminary Report on Patentability and Written Opinion, mailed on Dec. 10, 2020, issued in connection with International Application No. PCT/US2019/033945, filed on May 25, 2018, 7 pages.
International Bureau, International Preliminary Report on Patentability and Written Opinion, mailed on Mar. 10, 2020, issued in connection with International Application No. PCT/US2018/050050, filed on Sep. 7, 2018, 7 pages.
International Bureau, International Preliminary Report on Patentability and Written Opinion, mailed on Apr. 15, 2021, issued in connection with International Application No. PCT/US2019/054332, filed on Oct. 2, 2019, 9 pages.
International Bureau, International Preliminary Report on Patentability and Written Opinion, mailed on Jan. 15, 2019, issued in connection with International Application No. PCT/US2017/042170, filed on Jul. 14, 2017, 7 pages.
International Bureau, International Preliminary Report on Patentability and Written Opinion, mailed on Jan. 15, 2019, issued in connection with International Application No. PCT/US2017/042227, filed on Jul. 14, 2017, 7 pages.
International Bureau, International Preliminary Report on Patentability and Written Opinion, mailed on Mar. 25, 2021, issued in connection with International Application No. PCT/US2019/050852, filed on Sep. 12, 2019, 8 pages.
International Bureau, International Preliminary Report on Patentability and Written Opinion, mailed on Aug. 27, 2019, issued in connection with International Application No. PCT/US2018/019010, filed on Feb. 21, 2018, 9 pages.
International Bureau, International Preliminary Report on Patentability and Written Opinion, mailed on Mar. 31, 2020, issued in connection with International Application No. PCT/US2018/053517, filed on Sep. 28, 2018, 10 pages.
International Bureau, International Preliminary Report on Patentability and Written Opinion, mailed on Feb. 5, 2019, issued in connection with International Application No. PCT/US2017/045521, filed on Aug. 4, 2017, 7 pages.
International Bureau, International Preliminary Report on Patentability and Written Opinion, mailed on Feb. 5, 2019, issued in connection with International Application No. PCT/US2017/045551, filed on Aug. 4, 2017, 9 pages.
International Bureau, International Preliminary Report on Patentability and Written Opinion, mailed on Jan. 7, 2021, issued in connection with International Application No. PCT/US2019/039828, filed on Jun. 28, 2019, 11 pages.
International Bureau, International Preliminary Report on Patentability and Written Opinion, mailed on Apr. 8, 2021, issued in connection with International Application No. PCT/US2019/052654, filed on Sep. 24, 2019, 7 pages.
International Bureau, International Preliminary Report on Patentability and Written Opinion, mailed on Apr. 8, 2021, issued in connection with International Application No. PCT/US2019/052841, filed on Sep. 25, 2019, 8 pages.
International Bureau, International Preliminary Report on Patentability and Written Opinion, mailed on Apr. 8, 2021, issued in connection with International Application No. PCT/US2019/053253, filed on Sep. 26, 2019, 10 pages.
International Bureau, International Preliminary Report on Patentability, mailed on Apr. 11, 2019, issued in connection with International Application No. PCT/US2017/0054063, filed on Sep. 28, 2017, 9 pages.
International Bureau, International Preliminary Report on Patentability, mailed on Jun. 17, 2021, issued in connection with International Application No. PCT/US2019/064907, filed on Dec. 6, 2019, 8 pages.
International Bureau, International Preliminary Report on Patentability, mailed on Mar. 2, 2021, issued in connection with International Application No. PCT/US2019/048558, filed on Aug. 28, 2019, 8 pages.
International Bureau, International Preliminary Report on Patentability, mailed on Feb. 20, 2020, issued in connection with International Application No. PCT/US2018/045397, filed on Aug. 6, 2018, 8 pages.
International Bureau, International Preliminary Report on Patentability, mailed on Jul. 21, 2022, issued in connection with International Application No. PCT/US2021/070007, filed on Jan. 6, 2021, 8 pages.
International Bureau, International Preliminary Report on Patentability, mailed on Apr. 23, 2019, issued in connection with International Application No. PCT/US2017/057220, filed on Oct. 18, 2017, 7 pages.
Notice of Allowance mailed on Oct. 26, 2022, issued in connection with U.S. Appl. No. 17/486,574, filed Sep. 27, 2021, 11 pages.
Notice of Allowance mailed on Apr. 27, 2020, issued in connection with U.S. Appl. No. 16/700,607, filed Dec. 2, 2019, 10 pages.
Notice of Allowance mailed on Jun. 27, 2022, issued in connection with U.S. Appl. No. 16/812,758, filed Mar. 9, 2020, 16 pages.
Notice of Allowance mailed on Mar. 27, 2019, issued in connection with U.S. Appl. No. 16/214,666, filed Dec. 10, 2018, 6 pages.
Notice of Allowance mailed on Mar. 27, 2024, issued in connection with U.S. Appl. No. 18/061,570, filed Dec. 5, 2022, 8 pages.
Notice of Allowance mailed on Sep. 27, 2023, issued in connection with U.S. Appl. No. 17/656,794, filed Mar. 28, 2022, 11 pages.
Notice of Allowance mailed on Sep. 27, 2023, issued in connection with U.S. Appl. No. 18/048,945, filed Oct. 24, 2022, 9 pages.
Notice of Allowance mailed on Sep. 27, 2023, issued in connection with U.S. Appl. No. 18/061,243, filed Dec. 2, 2022, 8 pages.
Notice of Allowance mailed on Feb. 28, 2024, issued in connection with U.S. Appl. No. 16/989,350, filed Aug. 10, 2020, 9 pages.
Notice of Allowance mailed on Mar. 28, 2018, issued in connection with U.S. Appl. No. 15/699,982, filed Sep. 8, 2017, 17 pages.
Notice of Allowance mailed on Mar. 28, 2024, issued in connection with U.S. Appl. No. 18/316,400, filed May 12, 2023, 8 pages.
Notice of Allowance mailed on May 28, 2021, issued in connection with U.S. Appl. No. 16/524,306, filed Jul. 29, 2019, 9 pages.
Notice of Allowance mailed on Sep. 28, 2022, issued in connection with U.S. Appl. No. 17/444,043, filed Jul. 29, 2021, 17 pages.
Notice of Allowance mailed on Dec. 29, 2017, issued in connection with U.S. Appl. No. 15/131,776, filed Apr. 18, 2016, 13 pages.
Notice of Allowance mailed on Dec. 29, 2022, issued in connection with U.S. Appl. No. 17/327,911, filed May 24, 2021, 14 pages.
Notice of Allowance mailed on Jan. 29, 2021, issued in connection with U.S. Appl. No. 16/290,599, filed Mar. 1, 2019, 9 pages.
Notice of Allowance mailed on Jul. 29, 2022, issued in connection with U.S. Appl. No. 17/236,559, filed Apr. 21, 2021, 6 pages.
Notice of Allowance mailed on Jun. 29, 2020, issued in connection with U.S. Appl. No. 16/216,357, filed Dec. 11, 2018, 8 pages.
Notice of Allowance mailed on Mar. 29, 2021, issued in connection with U.S. Appl. No. 16/600,949, filed Oct. 14, 2019, 9 pages.
Notice of Allowance mailed on Mar. 29, 2023, issued in connection with U.S. Appl. No. 17/722,438, filed Apr. 18, 2022, 7 pages.

(56) References Cited

OTHER PUBLICATIONS

Notice of Allowance mailed on May 29, 2020, issued in connection with U.S. Appl. No. 16/148,879, filed Oct. 1, 2018, 6 pages.
Notice of Allowance mailed on Sep. 29, 2021, issued in connection with U.S. Appl. No. 16/876,493, filed May 18, 2020, 5 pages.
Notice of Allowance mailed on Sep. 29, 2023, issued in connection with U.S. Appl. No. 16/168,389, filed Oct. 23, 2018, 11 pages.
Notice of Allowance mailed on Apr. 3, 2019, issued in connection with U.S. Appl. No. 16/160,107, filed Oct. 15, 2018, 7 pages.
Notice of Allowance mailed on Jun. 3, 2021, issued in connection with U.S. Appl. No. 16/876,493, filed May 18, 2020, 7 pages.
Notice of Allowance mailed on Mar. 3, 2022, issued in connection with U.S. Appl. No. 16/679,538, filed Nov. 11, 2019, 7 pages.
Notice of Allowance mailed on May 3, 2024, issued in connection with U.S. Appl. No. 18/331,580, filed Jun. 8, 2023, 7 pages.
Notice of Allowance mailed on Jul. 30, 2018, issued in connection with U.S. Appl. No. 15/098,718, filed Apr. 14, 2016, 5 pages.
Notice of Allowance mailed on Jul. 30, 2019, issued in connection with U.S. Appl. No. 15/131,254, filed Apr. 18, 2016, 9 pages.
Notice of Allowance mailed on Jun. 30, 2023, issued in connection with U.S. Appl. No. 17/303,001, filed May 18, 2021, 8 pages.
Notice of Allowance mailed on Mar. 30, 2020, issued in connection with U.S. Appl. No. 15/973,413, filed May 7, 2018, 5 pages.
Notice of Allowance mailed on Mar. 30, 2023, issued in connection with U.S. Appl. No. 17/303,066, filed May 19, 2021, 7 pages.
Notice of Allowance mailed on Nov. 30, 2018, issued in connection with U.S. Appl. No. 15/438,725, filed Feb. 21, 2017, 5 pages.
Notice of Allowance mailed on Oct. 30, 2019, issued in connection with U.S. Appl. No. 16/131,392, filed Sep. 14, 2018, 9 pages.
Notice of Allowance mailed on Oct. 30, 2020, issued in connection with U.S. Appl. No. 16/528,016, filed Jul. 31, 2019, 10 pages.
Notice of Allowance mailed on Aug. 31, 2023, issued in connection with U.S. Appl. No. 18/145,520, filed Dec. 22, 2022, 2 pages.
Notice of Allowance mailed on Mar. 31, 2023, issued in connection with U.S. Appl. No. 17/303,735, filed Jun. 7, 2021, 19 pages.
Notice of Allowance mailed on May 31, 2019, issued in connection with U.S. Appl. No. 15/717,621, filed Sep. 27, 2017, 9 pages.
Notice of Allowance mailed on Aug. 4, 2023, issued in connection with U.S. Appl. No. 18/145,520, filed Dec. 22, 2022, 10 pages.
Notice of Allowance mailed on Jun. 4, 2021, issued in connection with U.S. Appl. No. 16/528,265, filed Jul. 31, 2019, 17 pages.
Notice of Allowance mailed on Mar. 4, 2020, issued in connection with U.S. Appl. No. 16/444,975, filed Jun. 18, 2019, 10 pages.
Notice of Allowance mailed on Apr. 5, 2023, issued in connection with U.S. Appl. No. 17/549,253, filed Dec. 13, 2021, 10 pages.
Notice of Allowance mailed on Feb. 5, 2020, issued in connection with U.S. Appl. No. 16/178,122, filed Nov. 1, 2018, 9 pages.
Notice of Allowance mailed on Oct. 5, 2018, issued in connection with U.S. Appl. No. 15/211,748, filed Jul. 15, 2018, 10 pages.
Notice of Allowance mailed on Feb. 6, 2019, issued in connection with U.S. Appl. No. 16/102,153, filed Aug. 13, 2018, 9 pages.
Notice of Allowance mailed on Feb. 6, 2020, issued in connection with U.S. Appl. No. 16/227,308, filed Dec. 20, 2018, 7 pages.
Notice of Allowance mailed on Mar. 6, 2023, issued in connection with U.S. Appl. No. 17/449,926, filed Oct. 4, 2021, 8 pages.
Notice of Allowance mailed on Apr. 7, 2020, issued in connection with U.S. Appl. No. 15/098,760, filed Apr. 14, 2016, 7 pages.
Notice of Allowance mailed on Apr. 7, 2020, issued in connection with U.S. Appl. No. 16/147,710, filed Sep. 29, 2018, 15 pages.
Notice of Allowance mailed on Jun. 7, 2019, issued in connection with U.S. Appl. No. 16/102,153, filed Aug. 13, 2018, 9 pages.

* cited by examiner

NETWORKED MICROPHONE DEVICE CONTROL

CROSS-REFERENCE TO RELATED APPLICATIONS

This application is a continuation of U.S. application Ser. No. 17/878,649, titled "Networked Microphone Device Control," known as 16-1201-CON0822, filed on Aug. 1, 2022, and currently pending; U.S. application Ser. No. 17/878,649 is a continuation of U.S. application Ser. No. 16/378,516, titled "Networked Microphone Device Control," known as 16-1201-CON0419, filed on Apr. 8, 2019, and issued as U.S. Pat. No. 11,405,430 on Aug. 2, 2022; U.S. application Ser. No. 16/378,516 is a continuation of Ser. No. 15/438,725, titled "Networked Microphone Device Control," known as 16-1201, filed on Feb. 21, 2017, and issued as U.S. Pat. No. 10,264,030 on Apr. 16, 2019. The entire contents of U.S. patent Ser. No. 17/878,649; Ser. No. 16/378,516; and Ser. No. 15/438,725 are incorporated by reference.

The present application additionally incorporates by reference the entire contents of (i) U.S. Provisional App. 62/298,410, titled "Default Playback Device(s)," known as 16-0201p, filed on Feb. 22, 2016; (ii) U.S. Provisional App. 62/298,418, titled "Audio Response Playback," known as 16-0202p, filed on Feb. 22, 2016; (iii) U.S. Provisional App. 62/298,433, titled "Room-corrected Voice Detection," known as 16-0203p, filed on Feb. 22, 2016; (iv) U.S. Provisional App. 62/298,439, titled "Content Mixing," known as 16-0204p, filed Feb. 22, 2016; (v) U.S. Provisional App. 62/298,425, titled "Music Service Selection," known as 16-0205p, filed Feb. 22, 2016; (vi) U.S. Provisional App. 62/298,350, titled "Metadata exchange involving a networked playback system and a networked microphone system," known as 16-0206p, filed Feb. 22, 2016; (vii) U.S. Provisional App. 62/298,388, titled "Handling of loss of pairing between networked devices," known as 16-0207p, filed Feb. 22, 2016; (viii) U.S. Provisional App. 62/298,393, titled "Action based on User ID," known as 16-0208 p, filed Feb. 22, 2016; and (ix) U.S. Provisional App. 62/312,350, titled "Voice Control of a Media Playback System," known as 16-0302p, filed Mar. 23, 2016.

FIELD OF THE DISCLOSURE

The disclosure is related to consumer goods and, more particularly, to methods, systems, products, features, services, and other elements directed to media playback and aspects thereof.

BACKGROUND

Options for accessing and listening to digital audio in an out-loud setting were limited until in 2003, when Sonos, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
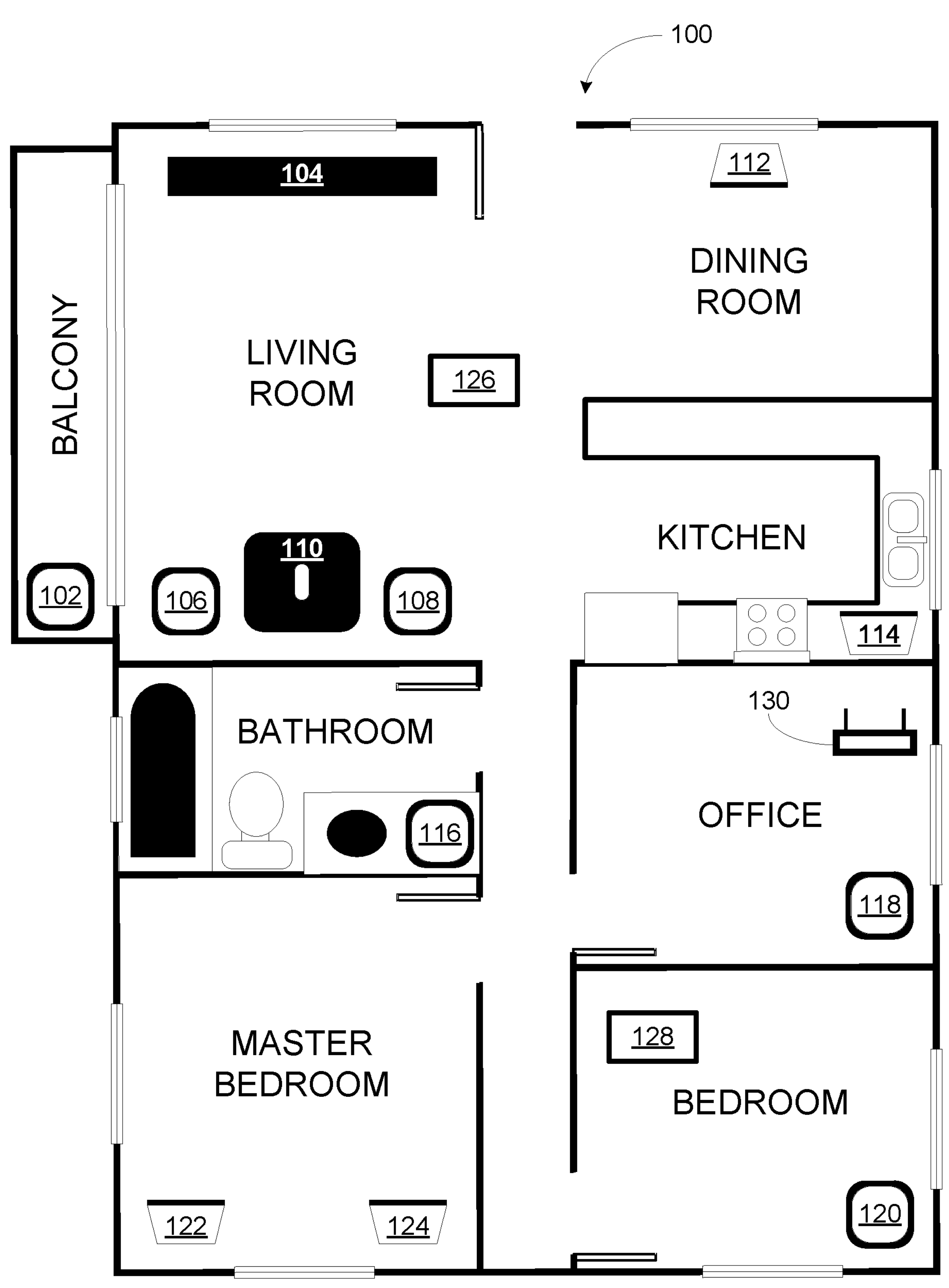
FIG. 1 shows an example media playback system configuration in which certain embodiments may be practiced.

The drawings are for the purpose of illustrating example embodiments, but it is understood that the inventions are not limited to the arrangements and instrumentalities shown in the drawings.

DETAILED DESCRIPTION

I. Overview

In operation, the microphone(s) of a networked microphone device ("NMD") are typically always on and listening for a specific "wake word" or "wake phrase." In response to hearing the "wake" word or phrase, the NMD (i) records audio, e.g., the spoken words after the "wake" word/phrase, (ii) analyzes the recorded audio (or perhaps sends the recorded audio to a server for analysis), and (iii) takes action based on the recorded audio. In some instances, the action taken by the NMD may include providing information to a user, typically via a speaker of the NMD or a speaker associated with the NMD. Such information may include local weather reports, current traffic information, answers in response to questions (e.g., "How tall is the Empire State Building?"), and so on. In some instances, the action taken by the NMD may include controlling or changing the state of one or more networked devices. Such networked devices may include lights, garage doors, locks, networked media playback systems, televisions, thermostats, home alarm systems, and so on.

However, it may be desirable in some instances for the NMD to disable its microphone(s) from even listening for the "wake word" or "wake phrase." For example, it may be undesirable for an NMD to have its microphone(s) enabled and listening for its "wake" word or phrase when a user is sleeping, engaging in sensitive conversations either in person or via telephone or computer, or perhaps simply enjoying private family time (e.g., dinner, movies, story time with children) because the NMD responds (typically via a speaker) with information and/or takes some other action in response to hearing its "wake" word or phrase, and it can be annoying or off-putting if the NMD interrupts their private time or activities with errant responses and/or actions.

In operation, disabling an NMD's microphone(s) has the effect of disconnecting the microphone from the NMD, thereby rendering the NMD unable to detect or process any audible signals/sounds in the room where the NMD is located while its microphone(s) is disabled. Disabling an NMD's microphone(s) could be accomplished via any of several different ways. For example, in some embodiments, disabling an NMD's microphone(s) may include switching off the power supplied to the microphone and/or microphone subsystem of the NMD. In some embodiments, disabling an NMD's microphone(s) may include switching off signal processing components configured to analyze and process sound detected by the microphone(s) of the NMD. In still further embodiments, disabling an NMD's microphone(s) may include disconnecting a signal path between the microphone(s) of the NMD and the signal processing components of the NMD configured to analyze and process sound detected by the microphone(s) of the NMD. The NMD's microphone(s) could also be disabled in any other way that prevents the NMD from listening to or otherwise detecting and/or analyzing audio sounds, speech, or other audible signals/sound, including but not limited to any "wake" word/phrase that would trigger the NMD to perform some function While users may be able to unplug, power-off, or physically disable and re-enable the microphone(s) of an NMD via manual activation of a switch or button on the NMD, in some instances, taking such manual action can be cumbersome, inconvenient, or otherwise undesirable. It may be particularly cumbersome, inconvenient, and/or otherwise undesirable to disable multiple NMDs if a user had to manually actuate a physical button or switch on each NMD.

Because it is advantageous for an NMD to have the ability to disable and/or re-enable its microphone(s) without a user having to physically actuate a button/switch or power-off or unplug the NMD, in some embodiments, the NMD is configured to disable its microphone(s) in response to any one or more of: (i) determining that a reference device is in a particular state; (ii) receiving a voice command via the microphone(s) of the NMD; and (iii) receiving a command via a network interface of the NMD. And in some embodiments, the NMD is additionally or alternatively configured to enable its microphone(s) in response to any one or more of: (i) determining that a reference device is in a certain state; and (ii) receiving a command via a network interface of the NMD. Example reference devices include lights, garage doors, locks, networked media playback systems, televisions, thermostats, home alarm systems, other household sensors (e.g. motion sensors, audio sensors, light sensors, or other sensors).

Some embodiments described herein include, while the microphone of the NMD is enabled, (i) determining whether a first reference device is in a specific state, and (ii) in response to determining that the first reference device is in the specific state, disabling the microphone of the NMD. Some embodiments additionally or alternatively include, while the microphone of the NMD is disabled, (i) determining that the first reference device is no longer in the specific state and, (ii) in response to determining that the first reference device is no longer in the specific state, enabling the microphone of the NMD.

Some embodiments additionally or alternatively include, while the microphone of the NMD is disabled, (i) determining that a second reference device is in a particular state, and (ii) in response to determining that the second reference device is in the particular state, enabling the microphone of the networked microphone device.

Some embodiments additionally or alternatively include, while the microphone of the NMD is enabled, (i) receiving a command to disable the microphone of the NMD via one of (i-a) the microphone of the NMD or (i-b) a network interface of the NMD, and (ii) in response to receiving the command to disable the microphone of the NMD via one of the microphone of the NMD or the network interface of the NMD, disabling the microphone of the NMD.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
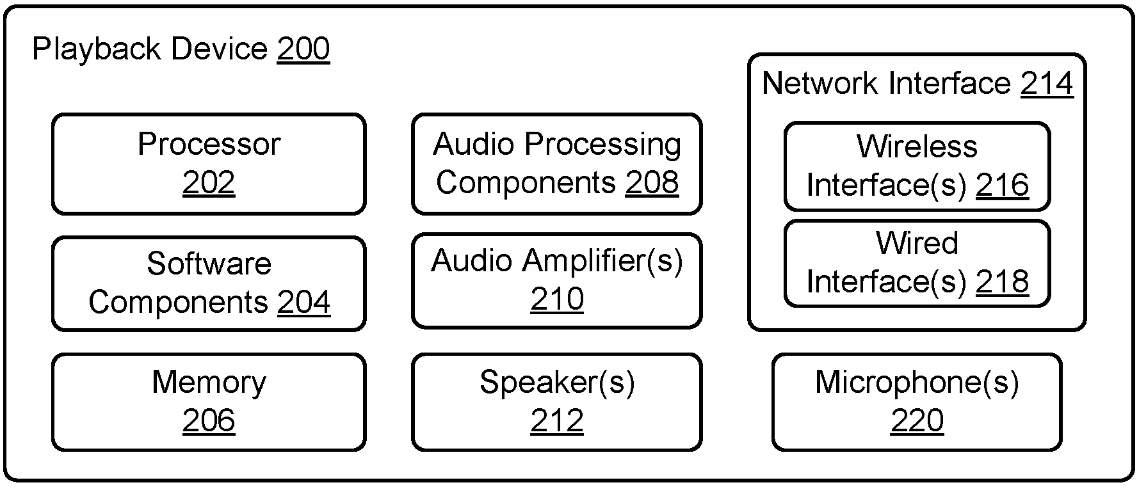
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include one or more processors 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the one or more processors 202 may be one or more clock-driven computing components configured to process input data according to instructions stored in the memory 206. The memory 206 may be a tangible computer-readable medium configured to store instructions executable by the one or more processors 202. For instance, the memory 206 may be data storage that can be loaded with one or more of the software components 204 executable by the one or more processors 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the one or more processors 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. The playback device 200 may transmit metadata to and/or receive metadata from other devices on the network, including but not limited to components of the networked microphone system disclosed and described herein. In one example, the audio content and other signals (e.g., metadata and other signals) transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not have microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, Sonos, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the Sonos product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render (e.g., play back) audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
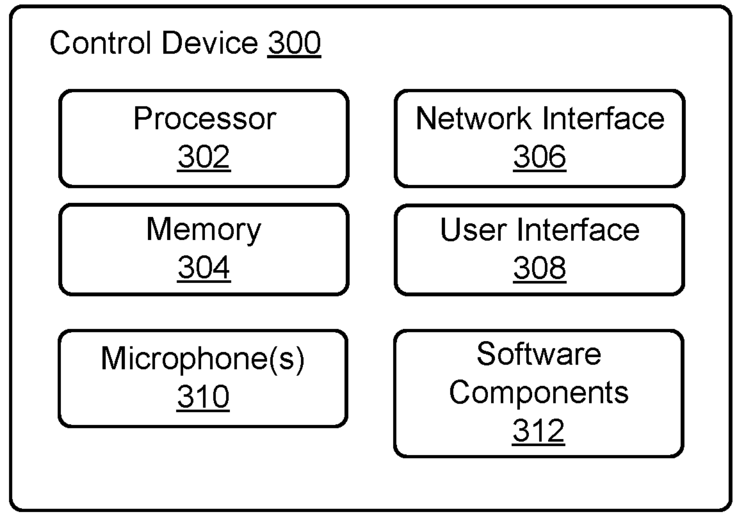
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include one or more processors 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The one or more processors 302 may be configured to perform functions relevant to facilitating user access, control, and configuration of the media playback system 100. The memory 304 may be data storage that can be loaded with one or more of the software components executable by the one or more processors 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 3G, 4G, or 5G mobile communication standards, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
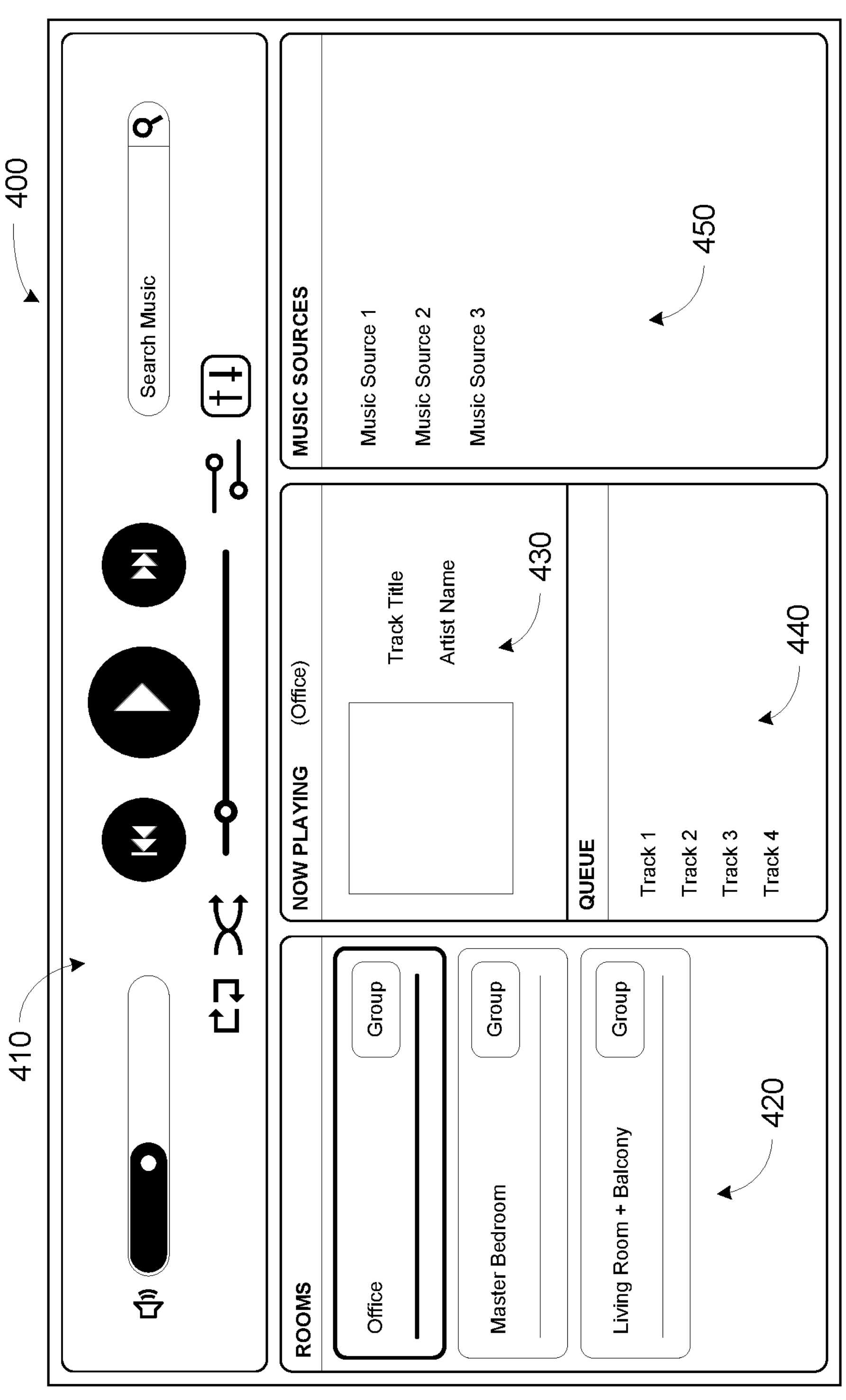
FIG. 4 shows an example controller interface.

The user interface 308 of the control device 300 may be configured to facilitate user access and control of the media playback system 100, by providing a controller interface such as the example controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Networked Devices

Figure 5:
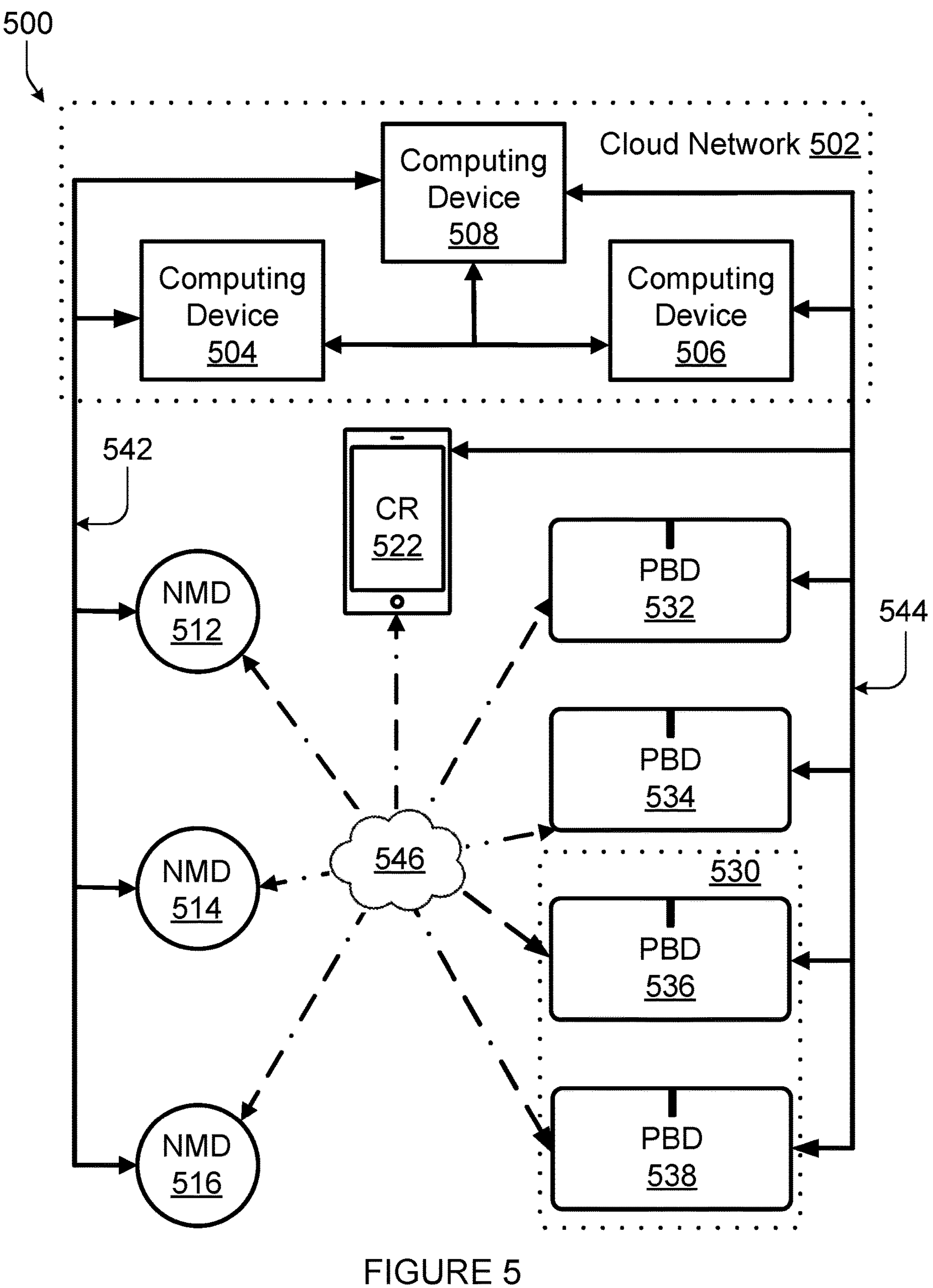
FIG. 5 shows an example plurality of network devices.

FIG. 5 shows an example plurality of devices 500 that may be configured to provide an audio playback experience based on voice control. One having ordinary skill in the art will appreciate that the devices shown in FIG. 5 are for illustrative purposes only, and variations including different and/or additional (or fewer) devices may be possible. As shown, the plurality of devices 500 includes computing devices 504, 506, and 508; network microphone devices (NMDs) 512, 514, and 516; playback devices (PBDs) 532, 534, 536, and 538; and a controller device (CR) 522.

Each of the plurality of devices 500 may be network-capable devices that can establish communication with one or more other devices in the plurality of devices according to one or more network protocols, such as NFC, Bluetooth™, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 may be part of a cloud network 502. The cloud network 502 may include additional computing devices. In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more “Smart Home” systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 may be devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be (or at least may include or be a component of) the microphone(s) 220 of playback device 200 or the microphone(s) 310 of network device 300. Further, in some cases, one or more of NMDs 512, 514, and 516 may be (or at least may include or be a component of) the playback device 200 or network device 300. In an example, one or more of NMDs 512, 514, and/or 516 may include multiple microphones arranged in a microphone array. In some embodiments, one or more of NMDs 512, 514, and/or 516 may be a microphone on a mobile computing device (e.g., a smartphone, tablet, or other computing device).

As shown, the computing device 506 may be configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 may be part of a bonded zone 530, while PBDs 532 and 534 may be part of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516.

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, communication paths 542 and 544 may comprise the same access point. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth™. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may change depending on types of communication between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506, and computing device 506 in turn may then control one or more of PBDs 532-538 to execute the command. In another example, the computing device 504 may convert the voice input to an equivalent text command, and then subsequently transmit the text command to the computing device 506. The computing device 506 may then parse the text command to identify one or more playback commands, and then computing device 506 may additionally control one or more of PBDs 532-538 to execute the command.

For instance, if the text command is "Play 'Track 1' by 'Artist 1' from 'Streaming Service 1' in 'Zone 1'," The computing device 506 may identify (i) a URL for "Track 1"

by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above is just one illustrative example, and that other implementations are also possible. In one case, operations performed by one or more of the plurality of devices 500, as described above, may be performed by one or more other devices in the plurality of device 500. For instance, the conversion from voice input to the text command may be alternatively, partially, or wholly performed by another device or devices, such as CR 522, NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
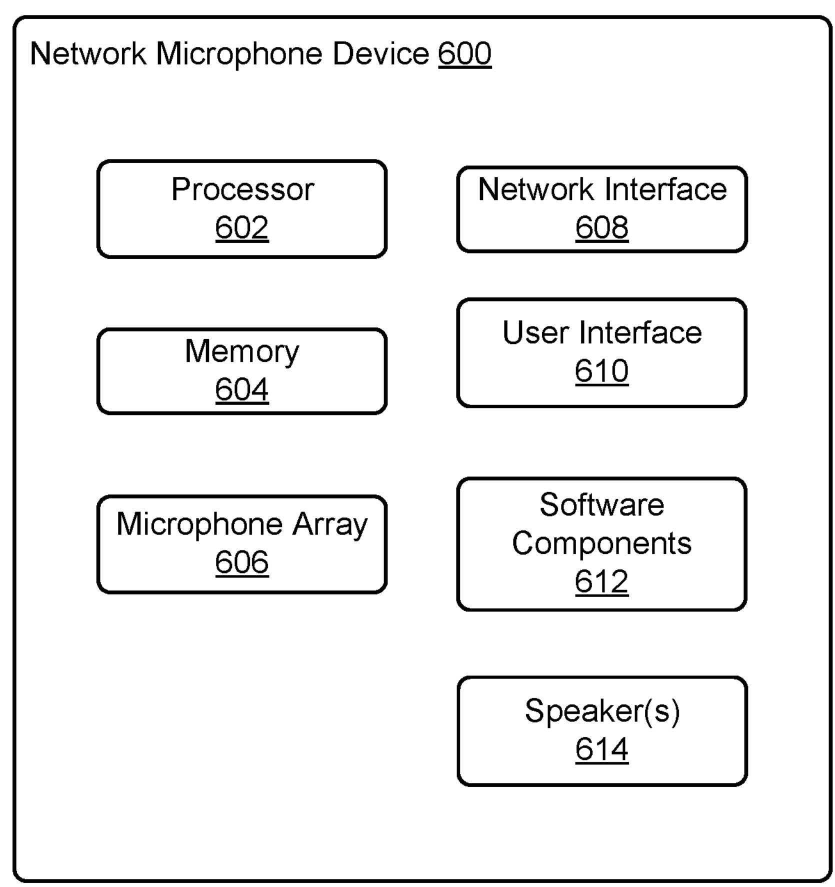
FIG. 6 shows a function block diagram of an example network microphone device.

FIG. 6 shows a function block diagram of an example network microphone device 600 that may be configured to be one or more of NMDs 512, 514, and 516 of FIG. 5. As shown, the network microphone device 600 includes one or more processors 602, memory 604, a microphone array 606 (e.g., one or more microphones), a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The one or more processors 602 may include one or more processors and/or controllers, which may take the form of a general or special-purpose processor or controller. For instance, the one or more processors 602 may include microprocessors, microcontrollers, application-specific integrated circuits, digital signal processors, and the like. The memory 604 may be data storage that can be loaded with one or more of the software components executable by the one or more processors 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing devices 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 610 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

III. Example Systems and Methods

It may be desirable in some instances for a networked microphone device ("NMD") to disable one or more (or all) of its microphones. It may further be desirable for one or more (or all) NMDs in a system of multiple NMDs to disable one or more (or all) of their microphones. For example, it may be desirable for any one or more (or all) of NMDs 512, 514, and 516 to disable their microphones.

As described earlier, although an NMD may be configured to listen for a specific "wake word" or "wake phrase" to trigger the NMD to record spoken audio for analysis (and to take subsequent action based on or in response to the recorded audio), the microphones of an NMD are still typically always on, active, and listening for its "wake" word or phrase. It may be desirable for the NMD to disable its microphone(s) from even listening for the "wake word" or "wake phrase" when, for example, a user is sleeping, engaging in sensitive conversations either in person or via telephone or computer, or perhaps simply enjoying private family time (e.g., dinner, movies, story time with children). Not only may some users not want NMDs listening all of the time, some users may not want their NMDs (and/or other devices connected thereto) to interrupt their private time and activities with errant responses and/or actions.

And while users may be able to unplug, power-off, or physically disable and/or re-enable the microphone(s) of an NMD via manual activation of a switch or button on the NMD, in some instances, taking such manual action can be cumbersome, inconvenient, or otherwise undesirable. It may be particularly cumbersome, inconvenient, and/or otherwise undesirable to disable multiple NMDs if a user had to manually actuate a physical button or switch on each NMD in his or her home.

Because it is advantageous for an NMD to have the ability to disable and/or re-enable its microphone(s) without a user having to physically actuate a button/switch or power-off or unplug the NMD, in some embodiments, the NMD (or perhaps a computing device configured to control the NMD, e.g., computing device 504) is configured to disable the NMD microphone(s) in response to any one or more of: (i) determining that a reference device is in a particular state; (ii) receiving a voice command via the microphone(s) of the NMD; and (iii) receiving a command via a network interface of the NMD. And in some embodiments, the NMD (or perhaps a computing device configured to control the NMD, e.g., computing device 504) is additionally or alternatively configured to enable (or re-enable) the NMD microphone(s) in response to any one or more of: (i) determining that a reference device is in a certain state; and (ii) receiving a command via a network interface of the NMD. Example reference devices include lights, garage doors, locks, networked media playback systems, televisions, thermostats, home alarm systems, other household sensors (e.g. motion sensors, audio sensors, light sensors, or other sensors).

In some embodiments, an NMD is configured to disable and/or re-enable its microphone(s) based on a state of another device, referred to as a "reference" device in the examples disclosed herein. In operation, the NMD (or perhaps another device in communication with the NMD) determines whether a reference device is in a particular state, and then the NMD disables its microphone(s) in response to determining that the reference device is in that particular state.

In some embodiments, determining the state of the first reference device may include querying the device for its state information or monitoring the first reference device's state information. Determining the state of the first reference device may additionally or alternatively include receiving a message via a network interface of the NMD, where the message indicates that the first reference device is in the specific state. In operation, such a message could be sent by the first reference device or a computing device controlling and/or monitoring the first reference device. Other examples of determining a state may exist, too. This may be desirable in scenarios where the user may want to disable the microphone of one of the NMDs 512, 514, and 516 when the first reference device performs a particular action or enters a particular state.

In operation, communication between an NMD and a reference device to convey state information or state change information can occur in multiple ways.

In some embodiments, communication of state information between the NMD and the reference device may occur directly (or at least substantially directly) between the NMD and the reference device. For example, with reference to FIG. 5, if the NMD is NMD 512 and the reference device is PBD 532, then communication of state information between NMD 512 and PBD 532 may occur in a peer-to-peer or similar fashion over communication means 546. As described earlier, communication means 546 may include one or more of for example, Bluetooth™ (IEEE 802.15), NFC, Wireless direct, and/or Proprietary wireless, among other possibilities including but not limited to Ethernet, WiFi (IEEE 802.11), and other wired or wireless communication protocols and methods.

In some embodiments, communication of state information between the NMD and the reference device may occur via one or more intermediary devices. For example, with reference to FIG. 5 again, if the NMD is NMD 512 and the reference device is PBD 532, then communication of state information between NMD 512 and PBD 532 may occur through one or more intermediary devices, including but not limited to one or more of computing device 506, computing device 508, and/or computing device 504. For example, PBD 532 may communicate its current state to computing device 506 via communication path 544, computing device 506 may communicate the current state of PBD 532 to computing device 504 over one or more public or private network links, and then computing device 504 may communicate the current state of PBD 532 to NMD 512 via communication path 542.

In some embodiments, a first computing device may monitor and/or control the state of a reference device, and then communicate state changes (and/or perhaps other state information) of the reference device to a second computing device configured to control the NMD, e.g., to control or command the NMD to disable/enable the NMD's microphone(s).

In one example, with reference to FIG. 5, computing device 506 monitors the state of PBD 532. When a user instructs PBD 532 to play certain media content (e.g., by entering a command via CR 522 or speaking a command via an NMD 516), PBD 532 (i) plays the requested media content in response to the user command, and (ii) perhaps additionally informs computing device 506 that it is playing media content (and perhaps that it is playing particular media content) by sending a message or other communication to computing device 506 via communication path 544. The message or other communication that PBD 532 sends to computing device 506 may comprise state information and/or state change information for PBD 532. In response to receiving the state and/or state change information from PBD 532, computing device 506 updates a state table (or similar database or datastore) associated with PBD 532 and/or communicates the state and/or state change to one or more other computing devices, e.g., computing device 504, computing device 508, or perhaps even directly to NMD 512.

In a related example, again with reference to FIG. 5, computing device 506 controls the state of PBD 532. When a user instructs PBD 532 to play certain media content (e.g., by entering a command via CR 522 or speaking a command vian NMD 516), then CR 522 (or perhaps NMD 516 in the case of the voice command) sends a message or other communication to computing device 506 to request that PBD 532 play the requested media content. Computing device 506 may optionally verify whether PBD 532 is able and/or authorized to play the requested media content. Then, computing device 506 instructs PBD 532 to play the requested media content via one or more messages, commands, or other communications via communications path 544. PBD 532 may confirm receipt of the command(s) received from computing device 506 and also confirm successful execution of the command(s) (i.e., confirm that it is playing the requested media content) by sending one or more response messages to computing device 506 via communication path 544. In response to receiving the one or more response messages and/or the state and/or state change information from PBD 532, computing device 506 updates a state table (or similar database or datastore) associated with PBD 532 and/or communicates the state and/or state change to one or more other computing devices, e.g., computing device 504, computing device 508, or perhaps even directly to NMD 512.

Other examples of communicating state information and/or state change information of a reference device(s) either directly or indirectly between the reference device and the NMD are possible as well, including but not limited to scenarios where (i) one or more intermediate computing devices (e.g., computing device 506 individually or in combination with other computing devices) monitor or control the state or state changes of the reference device (e.g., one or more of PBDs 532-538) and advise an NMD of the state or state change information for the reference device, where the NMD enables/disables its microphone(s) based on the state and/or state changes of the reference device; (ii) one or more intermediate computing devices (e.g., computing device 506 individually or in combination with other computing devices) monitor or control the state or state changes of the reference device (e.g., one or more of PBDs 532-538) and advise one or more computing devices controlling the NMD (e.g., computing device 504 individually or in combination with other computing devices) of the state or state change information for the reference device, where the one or more computing devices controlling the NMD in turn instruct/command the NMD to enable/disable its microphone(s) based on the state and/or state changes of the reference device; and (iii) one or more intermediate computing devices (e.g., any of computing devices 504, 506, and 508 individually or in combination with other computing devices) pass state or state change information of the reference device (e.g., one or more of PBDs 532-538) received from the reference device to an NMD (e.g., one or more of NMDs 512-516), where the NMD in turn enables/disables it microphone(s) based on the state and/or state changes of the reference device passed from the reference device to the NMD via the intermediate computing device(s).

The above-described examples relate to different ways of determining the state (or perhaps state change) of a reference device where the reference device is a playback device, but the above-described state or state change determination scenarios are equally applicable to examples where the reference device is something other than a playback device, such as a lighting system, home-security system, motion sensor, camera, alarm clock, television, thermostat, appliance, or any other device for which a state or state change can be monitored and/or controlled.

In some example embodiments, the first reference device is a lighting system. In such an example, the NMD (or perhaps a computing system configured to control the NMD, e.g., computing device 504 or another computing device) may be configured to determine whether the lighting system is in a particular state, e.g., whether the lights in a room are on or off. And if the NMD (or the computing system configured to control the NMD) determines that the lights in the room are off, the NMD disables its microphone(s). If the lighting system is network-connected, the NMD (or the computing system configured to control the NMD) can determine whether the lights are off by, for example, monitoring the state of a lighting controller configured to control the lights in the room, querying the lighting controller to obtain the state of the lights in the room, and/or receiving a message from the lighting controller. If the lighting system is not network-connected, the NMD (or the computing system configured to control the NMD) can determine whether the lights are off by, for example, monitoring a light sensor. The light sensor could be a component of the NMD or another networked device.

In another example embodiment, the first reference device is a media playback system or at least one media playback device of a media playback system, e.g., the media playback system 100 of FIG. 1, the one or more playback devices 200 of FIG. 2, or any other media playback system. In this scenario, the user may want to disable the microphone(s) of the NMD when the media playback system is playing a particular type of media, such as a relaxing song or audio content from a movie being shown on a television or other display device. In this example, the NMD (or another local or remote computing device) (i) determines whether the media playback system is in a particular state (i.e., whether one or more media playback devices of the system are playing a particular type of media), and (ii) disables the microphone(s) of the NMD in response to determining that the media playback system is in the particular state (i.e., in response to determining that one or more media playback devices of the system are playing the particular type media).

The particular state of the media playback system may include playing particular media content or a type of media content. The particular media content or type of media content may include audio or video content such as a yoga video or a deep meditation soundtrack that could easily be disrupted by the NMD erroneously responding to query or activating/deactivating some other device in the user's home (e.g., turning on the lights). Thus, it may be particularly desirable for the networked microphone device to disable the microphone when the media playback device (or media playback system) is playing such content.

The particular state of the media playback system may additionally or alternatively include the media playback device being above or below a particular volume level, or perhaps within a particular volume range. For example, the NMD may be configured to disable its microphone(s) in response to determining that the volume level of a media playback device (or a system of media playback devices) is above a certain threshold where it might be too loud for voice commands to be heard anyway. Additionally or alternatively, the NMD may be configured to disable its microphone(s) in response to determining that the volume level of a media playback device (or a system of media playback devices) is below a certain threshold volume level, for example, when the media playback device is playing media content late at night at a low volume, or when the media playback device is configured in a "night mode" where louder sounds in television shows, movies, or music are attenuated to reduce the likelihood of disturbing neighbors, roommates, or other family members in the house while watching shows or listening to music late at night. Additionally or alternatively, the NMD may be configured to disable its microphone(s) in response to determining that the volume level of a media playback device (or system of media playback devices) is within a certain threshold range while the media playback device (or system) is playing specific content, e.g., when the media playback device (or system) is playing relaxing music at a volume that suggest the user is sleeping, meditating, or otherwise relaxing and may not wish to be disturbed by the NMD responding audibly or otherwise taking an unexpected action in response to mistaking hearing its "wake" word/phrase.

Additionally, the particular state of the media playback system may also include the media playback system entering a particular media playback mode. For example, if the NMD (or another computing device) determines that the media playback system is in a "party mode" state where all of the media playback devices are configured to playback the same audio content in synchrony with each other, then the NMD may disable its microphone(s). It may be desirable to disable the microphone(s) of the NMD if the media playback system enters a particular playback mode such as a "party" mode or other type of playback mode. In this example, it may be desirable to disable the microphone(s) of the NMD to prevent the NMD from responding to or taking other action after mistaking hearing its "wake" word/phrase, which may disrupt media playback by the media playback system and thereby result in a less enjoyable social gathering for a user's guests.

In some embodiments, the NMD and first reference device may be contained in the same enclosure. For example, if the first reference device is a media playback device, and if the NMD is a component of the media playback device, then the NMD can disable and/or re-enable its microphone(s) based on the particular state of the media playback device. Or to state it another way, a media playback device equipped with one or more microphones can disable its one or more microphones based on one or more of (i) the type of content that the media playback device is playing and/or (ii) the playback mode of the media playback device (e.g., a party mode or other playback mode).

In some embodiments, the first reference device is a clock. The clock may be a hardware and/or software component of the NMD, a media playback device, or another device that the NMD (or other computer) can query, monitor, or receive some time/date message from. In such embodiments, the NMD (or other computer) can determine whether the clock is in a particular state (e.g., that the time of day is within a certain range, such as between 11 pm and 7 am), and in response to determining that the clock is in the particular state, disable the microphone(s) of the NMD. Other times of day or time ranges are also suitable. In this example, it may be desirable to disable the microphone of the NMD because the user may generally sleep during the time range and thus would not want the NMD to be listening to sounds in his or her bedroom or potentially be awoken by an erroneous activation of the NMD and/or awoken by the NMD taking some action in response to an erroneous trigger (e.g., turning on the lights in the room or playing music).

In some embodiments, the first reference device may include another NMD. In this embodiment, it may be desirable for the NMD (or a computing device configured to control the NMD) to determine whether the other NMD is in a particular state, and disable the microphone(s) of the NMD in response to determining that the other NMD is in the particular state. For example, the NMD may be configured to determine whether the microphone(s) of the other NMD has been disabled, and then disable its own microphone(s) in response to determining that the microphone(s) of the other NMD has been disabled. For example, if a user's home contains multiple NMDs and the user disables the microphone on one NMD, it may be desirable to disable all the microphones of the other NMDs, too.

Thus, in some of the above-described embodiments, the NMD (or a computer associated with the NMD): (i) determines whether the first reference device is in a first state, and (ii) disables the NMD's microphone(s) in response to determining that the first reference device is in the first state. In some embodiments, the NMD (or a computer associated with the NMD) may additionally (i) determine whether the first reference device is in a second state, and (ii) re-enable the NMD's microphone(s) in response to determining that the first reference device is in the second state.

In operation, the second state may be related to the first state. For example, if the first state is lights off, the second state might be lights on (or lights not off). Alternatively, the second state may not directly relate to the first state. For example, if the first state is lights off, the second state might be time of day is between 7 am and 11 pm. Further, in some embodiments, the first state may be a state of the first reference device, and the second state may be a state of a second reference device. In some embodiments, the NMD could be configured to enable/disable its microphone(s) based on additional multiple states of additional multiple disparate reference devices.

As described earlier, determining the state of a reference device (a first or a second reference device) may include querying the reference device for state information or receiving a message via a network interface of the first NMD (or other computing device configured to control the first NMD, e.g., computing device 504), where the message indicates a state of the reference device. In operation, such a message could be sent by the reference device or a computing device controlling and/or monitoring the reference device. Other examples of determining a state may exist, too. This may be desirable to a user because the user may want to enable the previously-disabled microphone(s) of one of the NMDs 512, 514, and 516 when the first or second (or third, fourth, and so on) reference device performs a particular action or enters a particular state.

For example, the NMD may be connected to or in communication with a reference device, such as a network-connected lighting system. In this example, the NMD may determine the state of the network-connected lighting system (e.g., lights-on state vs. lights-off state) and enable its microphone(s) if the lights are in the lights-on state.

In another example, the reference device may include a network-connected home security system. In this example, the NMD may determine the state of the network-connected home security system and enable its microphone(s) if the home security system is in an alarm-activated state. This may be particularly advantageous because enabling the NMD microphone(s) may allow a user to use the NMD to call the appropriate authorities in case of a break-in or fire.

In another example, the reference device may include an alarm clock or a device with an alarm clock function. In this example, the NMD may determine the state of the alarm clock (or whether a device with an alarm clock function is in a state where a wake-up alarm has been activated), and then activate the microphone(s) of the NMD in response to determining that the alarm clock (or the device with the alarm clock function) is in a wake-up alarm activated state. This functionality may be desirable for users who have configured the NMD to disable its microphone(s) while the user is sleeping, but who may want the NMD to enable (or re-enable) its microphone(s) when the user wakes up so that the user can then speak commands and/or request information from the NMD, e.g., turning on the lights, requesting weather information, playing a morning music playlist or news program.

In some embodiments, the NMD may additionally disable its microphone(s) in response to the user "snoozing" the alarm clock, or perhaps speaking a command to the NMD to instruct the NMD to snooze the alarm clock. For example, if the user hits a snooze button on the alarm clock, the alarm clock changes from a "wake up alarm has been activated" state to a "snooze" state. In some embodiments, the NMD may disable its microphone(s) in response to determining that the alarm clock is in the "snooze" state. The NMD may subsequently re-enable its microphone(s) in response to determining that the alarm clock has again changed to the "wake up alarm has been activated" state from the "snooze" state. Or alternatively, the NMD may simply disable its microphone(s) for some timeframe (e.g., 10 minutes) in response to receiving the voice command to snooze the alarm clock (or device with the alarm clock function), and then re-enable its microphone(s) after expiration of the timeframe.

In yet another example, the reference device may include a network-connected motion sensor, such as an infrared motion sensor, vibration sensor, camera, or any other type of motion sensor now known or later developed, including but not limited to standalone motion sensors and/or other devices that incorporate or otherwise contain motion sensors, e.g., accelerometer, gyroscopic, or other types of motion sensors. In this example, the NMD may determine the state of the network-connected motion sensor and enable its microphone(s) if the motion sensor is in a motion-detected state. For example, in rooms where the NMD has previously disabled its microphone(s) based on the state of one or more devices, the NMD may be configured to enable (or re-enable) its microphone(s) upon detecting that someone has entered the room. In yet another example, the reference device may include a motion sensor, where the NMD comprises the motion sensor, and where the NMD may be configured to disable or enable its microphone(s) based on the state of the motion sensor, e.g., enabling the microphone(s) in response to determining that the motion sensor is in a motion detected state and disabling the microphone(s) in response to determining that the motion sensor is not in the motion detected state (or perhaps vice versa).

In yet another example, the reference device may include a proximity detector, such as a Bluetooth™ Low Energy (BTLE) or Near Field Communication (NFC) or any other type of proximity detector now known or later developed, including but not limited to standalone proximity sensors and/or other devices that incorporate or otherwise contain proximity sensors. In this example, the NMD may determine the state of the proximity sensor and enable (or perhaps disable) its microphone(s) when the proximity sensor is in a motion-detected or presence-detected state. For example, in such embodiments, a user could wave his or her BTLE or NFC-equipped smartphone at a NMD, and the NMD could change its state (e.g., from disabled to enabled or from enabled to disabled) in response to detecting the motion or presence via the proximity detector.

In addition to disabling and enabling the microphone(s) of an NMD in response to determining the state of one or more reference devices, it also may be advantageous in some instances to disable and/or enable the microphone(s) of the NMD in response to receiving a command to disable and/or enable the microphone(s) of the NMD. In operation, the NMD may receive the command via one of (i) the microphone(s) of the NMD and/or (ii) a network interface of the NMD.

In some embodiments, the NMD may receive a command to disable its microphone(s) via the microphone(s) of the NMD. In such embodiments, the command may include a voice command to disable the microphone(s) of the NMD. For example, a user may want to disable the microphone(s) of the NMD without manually actuating a physical button on the NMD or powering off the NMD. For example, the user may speak a voice command such as "device, disable microphone," or "device, stop listening." And in response to receiving the voice command, the NMD disables its microphone(s).

Additionally or alternatively, the NMD may receive a command to disable its microphone(s) via a network interface of the NMD.

In some embodiments, the NMD may receive such a command from a controller device operable to configure and/or control the NMD. For example, the controller device may be a smartphone, tablet computer, or other computing device executing a user interface program operable to configure and/or control the NMD. In operation, the controller device sends a "Turn Off Microphone" or "Disable Microphone" or similar command to the NMD in response to receiving a user input via the user interface to disable the microphone(s) of the NMD.

In further embodiments, the NMD may receive such a command from another NMD or any other computing device operable to send a command over a network (e.g., a LAN, WAN, or other network infrastructure) to the NMD that causes the NMD to disable its microphone(s).

In some embodiments, the NMD is configured to disable its microphone(s) in response to any one or more of: (i) determining that a reference device is in a particular state; (ii) receiving a voice command via the microphone(s) of the NMD; and (iii) receiving a command via a network interface of the NMD. And in some embodiments, the NMD is additionally or alternatively configured to enable (or re-enable) its microphone(s) in response to any one or more of: (i) determining that a reference device is in a certain state; and (ii) receiving a command via a network interface of the NMD.

For example, the user may want to enable the microphone (s) of the NMD after issuing a command to disable the microphone(s) of the NMD. In operation, the user may speak a voice command to disable the microphone(s), but then later decide that he or she would like to speak commands to the NMD to cause the NMD (or perhaps a media playback device communicatively coupled to the networked microphone device) to play music. So to cause the NMD to enable its microphone(s), the user may issue a command from the controller device that to enable the microphone(s) of the NMD, thereby causing the NMD to enable (or re-enable) its microphone(s) in response to receiving the command from the controller via the network interface of the NMD.

In another example, an NMD may receive a command to disable the microphone(s) of the NMD from a user via one of (i) the microphone(s) of the NMD or (ii) a network interface of the NMD. After the microphone is disabled, a reference device may subsequently enter a particular state that causes the NMD to enable its microphone(s) in response to determining that the reference device has entered that particular state. For example, a user may disable the microphone via the microphone by stating "device, disable microphone." Afterwards, a home security system may enter an alarm-activated state. In operation, the NMD (or a computer associated with the NMD) determines that the home security system has entered the alarm-activated state, and the NMD then enables its microphone(s) in response to determining that the home security system is in the alarm-activated state. One advantage to re-enabling the microphone(s) of the NMD after the user previously disabled the microphone(s) in this scenario is that, re-enabling the microphone(s) in response to determining that the home security system has entered the alarm-activated state enables the user to call authorities for help or speak other commands to the NMD.

In another example, the NMD (a first NMD) may be communicatively coupled to a one or more other NMDs (at least a second NMD). In embodiments where the NMD is a media playback device (or at least a component of a media playback device), the communicative coupling may include the first and second NMDs configured in a synchrony group, a bonded group, a consolidated group, or other type connected or combined configuration described herein.

The first NMD may receive a command to disable its microphone(s) from a user via one of the microphone of the NMD or a network interface of the NMD. In response to receiving the command to disable its microphone(s), the first NMD disables its microphone(s) and sends a command or message to the second NMD that causes the second NMD to disable its microphone(s), too. In this manner, the second NMD disables its microphone(s) in response to (i) determining that the first NMD (i.e., reference device) has changed to a "microphone disabled" state and/or (ii) receiving a command from the first NMD to disable its microphone(s).

After the first and second NMDs have disabled their microphones, the user may actuate a physical button or switch on one of the NMDs that in turn causes both the first and second NMD to re-enable their microphones. In one example, the user actuates the physical button or switch on the second NMD, which causes the second NMD to re-enable its previously-disabled microphone(s). In operation, the second NMD may then re-enable its previously-disabled microphone(s) and send a command or message to the first NMD that causes the first NMD to re-enable its previously-disabled microphone(s), too. In this manner, the first NMD enables its microphone(s) in response to (i) determining that the second NMD (i.e., reference device) has changed to a "microphone enabled" state and/or (ii) receiving a command from the second NMD to enable its microphone(s). This feature is advantageous for a user who wishes to enable/disable the microphones of all connected NMDs when he or she enables/disables the microphone(s) on one NMD of his or her NMD system.

In some examples, the NMD may be (i) a media playback device equipped with microphones, (ii) a component of a media playback device, and/or (iii) associated with a media playback device, where the NMD is one of a plurality of devices in a media playback system comprising the NMD and one or more media playback devices.

As mentioned earlier, in some embodiments, sets of individual media playback devices can be configured in different types of groupings, including but not limited to (i) a zone group where all of the media playback devices are configured to play back the same media content in synchrony, (ii) a bonded playback device comprising a stereo grouping of playback devices where a first media playback device is configured to play a right stereo channel of media content and a second media playback device is configured to play a left stereo channel of the media content, (iii) a bonded playback device comprising a quadraphonic grouping of playback devices where first, second, third, and fourth media playback devices are configured to play first, second, third, and fourth channels of the media content, respectively, (iv) a 5.1 surround mode grouping, where first, second, third, fourth, and fifth media playback devices are each configured to play an assigned one of five channels of media content, e.g., right front, center, left front, right rear, and left rear, or other 5-channel arrangement, (v) a 7.1 surround mode grouping, where first, second, third, fourth, fifth, six, and seventh media playback devices are each configured to play an assigned one of seven channels of media content, e.g., right front, center, left front, right side, left side, right rear, and left rear, or other 7-channel arrangement, (vi) a consolidated playback device comprising a grouping of media playback devices, where a first media playback device is configured to play a first assigned frequency range of media content (or perhaps assigned frequency range of assigned channel of media content) and a second media playback device is configured to a play a second assigned frequency range of media content (or perhaps assigned frequency range of assigned channel of media content), or other frequency-division assignment arrangement, (vii) a zone group comprising two or more consolidated playback devices; (viii) a bonded playback device comprising two or more consolidated playback devices; (ix) a zone group comprising two or more bonded playback devices, where each bonded playback device comprises two or more consolidated playback devices; (x) a zone group comprising any two or more of a standalone media playback device, a consolidated playback device, or a bonded playback device, in any combination; and/or (xi) any combination of the above-described groupings. In operation, any of the above-described groupings may correspond to a particular grouping state of a media playback device (or media playback system).

Additionally, as mentioned previously, in some embodiments, the NMD may be any of (i) a media playback device equipped with microphones, or (ii) a component of a media playback device. In any such embodiments, when one NMD in any of the above-described groupings disables its microphone(s), then one or more other NMDs in the grouping (or perhaps all the NMDs in the grouping) disable their microphones. And when one NMD in any of the above-described groupings enables it microphone(s), then one or more other NMDs in the grouping (or perhaps all the NMDs in the grouping) enable their microphones.

Further, and as mentioned previously, in some embodiments an NMD is associated with a media playback device or perhaps a grouping of media playback devices, where the NMD is one of a plurality of devices in a media playback system comprising one or more NMDs and one or more media playback devices in any of the above-described groupings. In any such embodiments, when one NMD associated with a grouping of media playback devices disables its microphone(s), then one or more other NMDs associated with the grouping of media playback devices (or perhaps all the NMDs associated with the grouping) disable their microphones. And when one NMD associated with the grouping of media playback devices enables its microphone(s), then one or more other NMDs associated with the grouping of media playback devices (or perhaps all the NMDs associated with the grouping) enable their microphones.

Still further, in some embodiments, any of the above-described groupings may include one or more NMDs in the grouping (e.g., either as a media playback device equipped with microphones or as a component of a media playback device) and one or more NMDs associated with the grouping. In any such embodiments, when any NMD in a grouping and/or associated with the grouping disables its microphone(s), then one or more other NMDs in the grouping and/or associated with the grouping (or perhaps all the NMDs in and/or associated with the grouping) disable their microphones. And when one NMD in and/or associated with the grouping enables its microphone(s), then one or more other NMDs in and/or associated with the grouping (or perhaps all the NMDs in and/or associated with the grouping) enable their microphones.

Some embodiments where the NMD is a media playback device with a microphone (or perhaps a component of a media playback device) are additionally configured to, at least in some situations, mute the speakers of the media playback device when the microphone is disabled and vice versa. Further, when such NMDs are configured in any of the above-described group arrangements, in some embodiments, disabling one NMD's microphone(s) in the group causes one or more other NMDs in the group (or perhaps all the NMDs in the group) to both (i) disable their microphone(s) and (ii) mute their speaker(s). Similarly, when such NMDs are configured in any of the above-described group configurations, in some embodiments, muting one NMD's speaker(s) in the group causes one or more other NMDs in the group (or perhaps all the NMDs in the group) to both (i) mute their speaker(s) and (ii) disable their microphone(s).

Additionally, in some embodiments where the NMD is a media playback device with a microphone (or perhaps a component of a media playback device), the media playback device (or at least the NMD therein) is configured to enable or disable its microphone(s) based on whether the device is a member of a zone group, a member of a consolidated playback device, and/or a member of a bonded playback device. In one such example embodiment, a zone group comprises three media playback devices, where each media playback device comprises one or more microphone(s). In this example, when the three media playback devices are initially grouped into the zone group, the primary playback device (i.e., master or head-end device) is configured to enable its microphone(s), and the two secondary playback devices (i.e., slave or subtending devices) are configured to disable their microphones. For example, a Sonos PLAYBAR and two Sonos PLAY:1 devices can be grouped into a zone group. Upon initial grouping into the zone group, the PLAYBAR determines that it is a master of the zone group and enables it microphones, and each PLAY:1 device determines that it is a slave to the PLAYBAR in the zone group and disables its microphones. Other scenarios of enabling and/or disabling microphones based on grouping of playback devices and NMDs are within the scope and spirit of the embodiments envisioned herein as well.

In some embodiments where the NMD is a media playback device with a microphone (or perhaps a component of a media playback device), the media playback device may be configured to disable its microphone based on its assigned zone name. For example, in some embodiments, a media playback device disables its microphone(s) in response to determining that it has been placed in a bedroom or baby room based on the media playback device having been assigned to a "Bedroom" or "Baby Room" zone or zone grouping, or perhaps other zone or room name corresponding to a location or room in a house where the user expects or desires more privacy.

Further, in some embodiments where the NMD is associated with a media playback device, the NMD is additionally configured to, at least in some situations, disable its microphone(s) when the speaker(s) of the associated media playback device has been muted. Further, when such NMDs are associated with two more media playback devices configured in any of the above-described group arrangements, in some embodiments, disabling the NMD's microphone(s) causes one or more associated media playback devices in the group (or perhaps all the media playback devices in the group) to mute their speaker(s). Similarly, when such NMDs are associated with two more media playback devices configured in any of the above-described group arrangements, in some embodiments, muting one of the associated media playback device's speaker(s) in the group causes both (i) one or more other media playback devices in the group (or perhaps all the media playback devices in the group) to mute their speaker(s) and (ii) the associated NMD to disable its microphone(s).

In another example, consistent with the embodiments discussed herein, an NMD may disable its microphone(s) in response to determining that the lights in the room are turned off (i.e., lights in "off" state). However, the user may want to control a media playback system via commands spoken to the NMD even though the lights are off. In this scenario, the user may open a user interface for the NMD running on a controller device of the NMD and select an "Enable Microphone" button via the user interface, thereby causing the controller to send a command that causes the NMD to enable its microphone(s).

Many of the above-described examples are scenarios where the microphone(s) of an NMD is disabled or enabled in response to determining that a single reference device is in a particular state (or not in that particular state). In some embodiments, the microphone(s) of an NMD is disabled in enabled in response to determining that two more reference devices are in a particular state.

In one example, the first reference device is a lighting system, the second reference device is an alarm clock, and the NMD is configured to disable its microphone(s) in response to a determination (by the NMD or a device controlling the NMD) that (i) the lighting system is in a "lights off" state and (ii) the alarm clock in a "wake up alarm set but not yet activated" state, which may indicate that the user is sleeping.

In another example, the reference device is a lighting system, the second reference device is a media playback device, and the NMD is configured to disable its microphone(s) in response a determination (by the NMD or a device controlling the NMD) that (i) the lighting system is in a "lights dimmed below a certain threshold" state and (ii) the media playback device is in a "playing a relaxation playlist" state, which may indicate that the user is meditating or otherwise relaxing.

In yet another example, the first reference device is a telephone, the second reference device is a motion sensor in a home office, and the NMD is configured to disable its microphone(s) in response a determination (by the NMD or a device controlling the NMD) that (i) the telephone is in a "phone call active" state and (ii) the motion sensor in the user's home office is in a "motion detected" state, which may indicate that the user is conducting a private or confidential telephone call where it might be undesirable for an NMD to have its microphone(s) enabled.

Enabling or disabling microphones(s) of an NMD based on more complicated state combinations of three, four, or more separate reference devices could be implemented according to the teachings herein, too.

Figure 7:
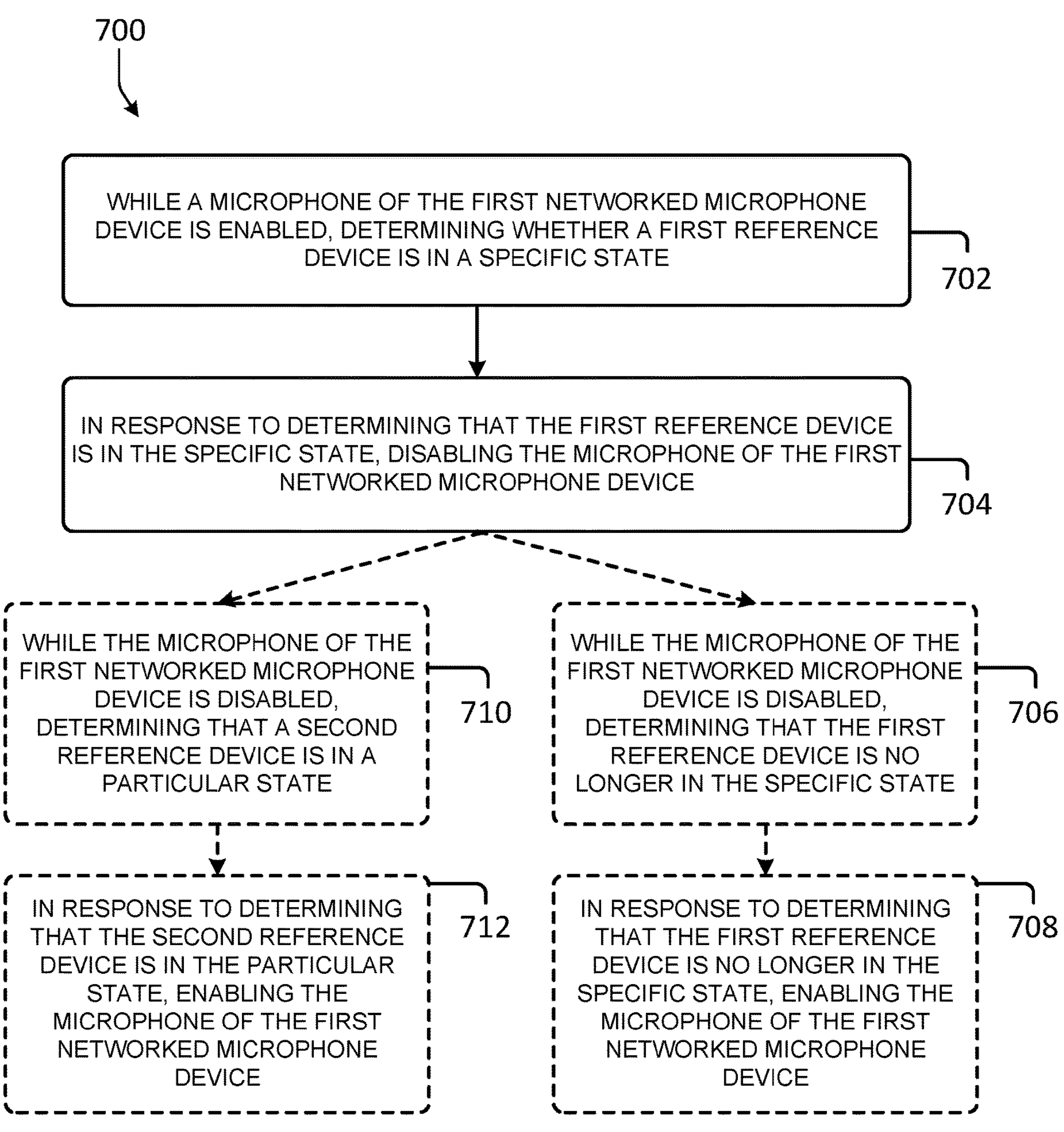
FIG. 7 shows an example method according to some embodiments.

Method 700 shown in FIG. 7 presents an embodiment of a method that can be implemented within an operating environment including or involving, for example, the media playback system 100 of FIG. 1, one or more playback devices 200 of FIG. 2, one or more control devices 300 of FIG. 3, the user interface of FIG. 4, the configuration shown in FIG. 5, and/or the NMD shown in FIG. 6. Method 700 may include one or more operations, functions, or actions as illustrated by one or more of blocks 702-706. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 700 and other processes and methods disclosed herein, each block in FIG. 7 may represent circuitry that is wired to perform the specific logical functions in the process.

Method 700 begins at block 702, which includes a first NMD (or alternatively a computing device configured to control the first NMD), while a microphone of the first networked microphone device is enabled, determining whether a first reference device is in a specific state. In some embodiments, determining whether a first reference device is in a specific state includes querying the first reference device to obtain its current state. In some embodiments, querying the first reference device to obtain its current state may include obtaining a state variable, state table, or table of state variables, or perhaps other configuration or state information of the reference device directly or indirectly from the reference device.

For example, the NMD (or a computing device configured to control the NMD) may obtain the state information (via a variable, table, table of variable, or other form) from the reference device over a wired or wireless LAN, WAN, ad hoc network, or other communications link. The NMD (or a computing device configured to control the NMD) may additionally or alternatively obtain the state information in any of the above-described forms from a computing device configured to control the reference device. In some embodiments, the computing device configured to control the NMD may store state information of the reference device and receive updates to the reference device's state directly or indirectly from the reference device. In some embodiments, the computing device configured to control the NMD may be the same computing device configured to control/monitor the reference device. This may be the case in scenarios where the NMD is a first media playback device and the reference device is a second media playback device. This may also be the case in scenarios where a single computing system is configured to control/monitor NMDs and reference devices, which may the case in embodiments where the computing system configured to control/monitor NMDs and reference devices is a local and/or cloud-based home automation server or application service.

In some embodiments, determining whether a first reference device is in a specific state includes receiving a first message (or command) via a network interface of the first NMD, wherein the message (or command) indicates that the first reference device is in the specific state. In still further embodiments, determining whether the first reference device is in the specific state includes querying a computing device that is configured to monitor or control the first reference device. And in still further embodiments, determining whether the first reference device is in the specific state includes the NMD receiving a first message (or command) via its network interface from a computing device configured to monitor or control the first reference device, where the first message (or command) indicates that the first reference device is in the specific state.

In some embodiments, the first reference device is any of (i) a reference device that is separate from the networked microphone device, (ii) a reference device that is a component of the networked microphone device, (iii) a reference device that is a component of a media playback device, (iv) a second NMD (or system of NMD s), and/or (v) a media playback device (or system of playback devices). The first reference device may be any other type of reference device disclosed or described herein.

In some example embodiments, the first reference device comprises one or more lights, and the specific state of the first reference device comprises one or more lights that are in a powered-off state. In other example embodiments, the first reference device comprises a media playback device, and the specific state of the media playback device comprises the media playback device configured to play content in synchrony with one or more additional media playback devices. In yet other example embodiments, the first reference device comprises a media playback device associated with the first NMD, wherein the specific state of the media playback device is the media playback device playing a first type of media content.

Alternatively, in some embodiments, the first reference device comprises a second NMD, wherein the state of the second NMD comprises a microphone of the second NMD is disabled.

Next, method 700 advances to block 704, which includes, in response to determining that the first reference device is in the specific state, disabling the microphone of the first NMD.

Next, method 700 may additionally advance to optional block 706, which includes, while the microphone of the first NMD is disabled, determining that the first reference device is no longer in the specific state. In operation, determining that the first reference device is no longer in the specific state may be performed in substantially the same as determining that the first reference device is in the specific state, e.g., via query, message, command, and so on.

Method 700 may then advance to optional block 708, which includes, in response to determining that the first reference device is no longer in the specific state, enabling the microphone of the first NMD.

Alternatively, instead of method 700 advancing to optional block 706, method 700 may instead advance to optional block 710, which includes, while the microphone of the first NMD is disabled, determining that a second reference device is in a particular state.

In some embodiments, the second reference device comprises a home security system, wherein the particular state of the home security system comprises an alarm-activated state. In other embodiments, the second reference device comprises a motion sensor, wherein the particular state of the motion sensor comprises a motion-detected state.

Next, method 700 may additionally advance to optional block 712, which includes, in response to determining that the second reference device is in the particular state, enabling the microphone of the first networked microphone device.

Figure 8:
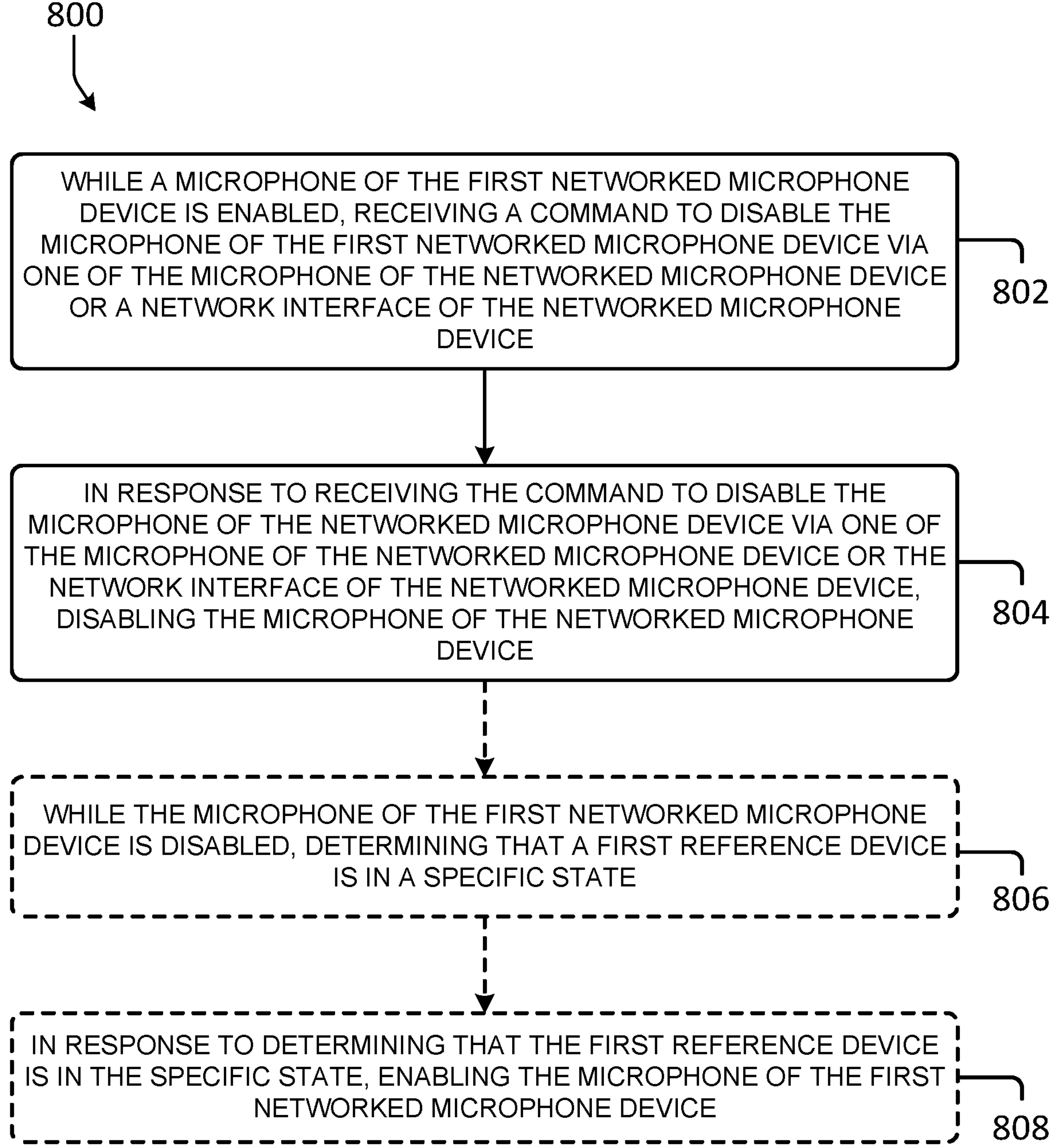
FIG. 8 shows an example method according to some embodiments.

Method 800 shown in FIG. 8 presents an embodiment of a method that can be implemented within an operating environment including or involving, for example, the media playback system 100 of FIG. 1, one or more playback devices 200 of FIG. 2, one or more control devices 300 of FIG. 3, the user interface of FIG. 4, the configuration shown in FIG. 5, and/or the networked microphone device of FIG. 6. Method 800 may include one or more operations, functions, or actions as illustrated by one or more of blocks 802-804. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 800 and other processes and methods disclosed herein, the flowchart shows functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 8 may represent circuitry that is wired to perform the specific logical functions in the process.

Method 800 begins at block 802, which includes a first NMD, while a microphone of the first NMD is enabled, receiving a command to disable the microphone of the first NMD via one of (i) the microphone of the NMD or (ii) a network interface of the NMD.

In some embodiments, the command received via the microphone of the NMD comprises a voice command received via the microphone of the NMD. In other embodiments, the command received via the network interface of the NMD comprises a command received from a controller. In some embodiments, the controller is a device separate from the NMD.

Next, method 800 advances to block 804, which includes, in response to receiving the command to disable the microphone of the NMD via one of the microphone of the NMD or the network interface of the NMD, disabling the microphone of the NMD.

Next, method 800 may additionally advance to optional block 806, which includes, while the microphone of the first NMD is disabled, determining that a first reference device is in a specific state.

Method 800 may then advance to optional block 808, which includes, in response to determining that the first reference device is in the specific state, enabling the microphone of the first NMD.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

What is claimed is:

1. A first network device comprising:

one or more processors;

a set of one or more microphones; and tangible, non-transitory computer-readable media comprising program instructions executable by the one or more processors such that the first network device is configured to:

while the first network device is in a microphone-enabled state, determine whether the first network device is playing a first type of media content or a second type of media content;

in response to determining that the first network device is playing the first type of media content, switch the first network device from the microphone-enabled state to a microphone-disabled state;

in response to determining that the first network device is playing the second type of media content, keep the first network device in the microphone-enabled state;

while the first network device is in the microphone-disabled state, determine that the first network device is no longer playing the first type of media content; and in response to determining that the first network device is no longer playing the first type of media content, switch the first network device from the microphone-disabled state to the microphone-enabled state.

2. The first network device of claim 1, wherein the first type of media content comprises audio having corresponding video content.

3. The first network device of claim 1, wherein the program instructions that are executable by the one or more processors such that the first network device is configured to switch the first network device from the microphone-enabled state to a microphone-disabled state comprise program instructions that are executable by the one or more processors such that the first network device is configured to switch off power supplied to the set of one or more microphones.

4. The first network device of claim 1, wherein the program instructions that are executable by the one or more processors such that the first network device is configured to switch the first network device from the microphone-enabled state to a microphone-disabled state comprise program instructions that are executable by the one or more processors such that the first network device is configured to switch off signal processing components configured to analyze and process sound detected by the set of one or more microphones.

5. The first network device of claim 1, wherein the program instructions that are executable by the one or more processors such that the first network device is configured to switch the first network device from the microphone-enabled state to a microphone-disabled state comprise program instructions that are executable by the one or more processors such that the first network device is configured to disconnect a signal path between the set of one or more microphones and signal processing components configured to analyze and process sound detected by the set of one or more microphones.

6. The first network device of claim 1, wherein the program instructions comprise program instructions executable by the one or more processors such that the first network device is configured to, when the first network device is configured to play media content in a groupwise manner with at least a second network device:

cause the second network device to switch from a microphone-enabled state to a microphone-disabled state in connection with switching the first network device from the microphone-enabled state to the microphone-disabled state.

7. The first network device of claim 6, wherein the first network device and the second network device are configured to play different channels of media content in a groupwise manner.

8. The first network device of claim 1, wherein the program instructions comprise program instructions executable by the one or more processors such that the first network device is configured to, when the first network device is configured to play media content in a groupwise manner with at least a second network device:

cause the second network device to switch from a microphone-disabled state to a microphone-enabled state in connection with switching the first network device from the microphone-disabled state to the microphone-enabled state.

9. The first network device of claim 1, wherein the program instructions comprise program instructions executable by the one or more processors such that the first network device is configured to:

while the first network device is in the microphone-disabled state, determine that the first network device has received a command to switch from the microphone-disabled state to the microphone-enabled state; and in response to determining that the first network device has received a command to switch from the microphone-disabled state to the microphone-enabled state, switch the first network device from the microphone-disabled state to the microphone-enabled state.

10. Tangible, non-transitory computer-readable media comprising program instructions executable by one or more processors such that a first network device is configured to:

while the first network device is in a microphone-enabled state, determine whether the first network device is playing a first type of media content or a second type of media content;

in response to determining that the first network device is playing the first type of media content, switch the first network device from the microphone-enabled state to a microphone-disabled state;

in response to determining that the first network device is playing the second type of media content, keep the first network device in the microphone-enabled state;

while the first network device is in the microphone-disabled state, determine that the first network device is no longer playing the first type of media content; and in response to determining that the first network device is no longer playing the first type of media content, switch the first network device from the microphone-disabled state to the microphone-enabled state.

11. The tangible, non-transitory computer-readable media of claim 10, wherein the first type of media content comprises audio having corresponding video content.

12. The tangible, non-transitory computer-readable media of claim 10, wherein the program instructions that are executable by the one or more processors such that the first network device is configured to switch the first network device from the microphone-enabled state to a microphone-disabled state comprise program instructions that are executable by the one or more processors such that the first network device is configured to switch off power supplied to a set of one or more microphones of the first network device.

13. The tangible, non-transitory computer-readable media of claim 10, wherein the program instructions that are executable by the one or more processors such that the first network device is configured to switch the first network device from the microphone-enabled state to a microphone-disabled state comprise program instructions that are executable by the one or more processors such that the first network device is configured to switch off signal processing components configured to analyze and process sound detected by a set of one or more microphones of the first network device.

14. The tangible, non-transitory computer-readable media of claim 10, wherein the program instructions that are executable by the one or more processors such that the first network device is configured to switch the first network device from the microphone-enabled state to a microphone-disabled state comprise program instructions that are executable by the one or more processors such that the first network device is configured to disconnect a signal path between a set of one or more microphones of the first network device and signal processing components configured to analyze and process sound detected by the set of one or more microphones of the first network device.

15. The tangible, non-transitory computer-readable media of claim 10, wherein the program instructions comprise program instructions executable by the one or more processors such that the first network device is configured to, when the first network device is configured to play media content in a groupwise manner with at least a second network device:

cause the second network device to switch from a microphone-enabled state to a microphone-disabled state in connection with switching the first network device from the microphone-enabled state to the microphone-disabled state.

16. The tangible, non-transitory computer-readable media of claim 15, wherein the first network device and the second network device are configured to play different channels of media content in a groupwise manner.

17. The tangible, non-transitory computer-readable media of claim 10, wherein the program instructions comprise program instructions executable by the one or more processors such that the first network device is configured to, when the first network device is configured to play media content in a groupwise manner with at least a second network device:

cause the second network device to switch from a microphone-disabled state to a microphone-enabled state in connection with switching the first network device from the microphone-disabled state to the microphone-enabled state.

18. The tangible, non-transitory computer-readable media of claim 10, wherein the program instructions comprise program instructions executable by the one or more processors such that the first network device is configured to:

while the first network device is in the microphone-disabled state, determine that the first network device has received a command to switch from the microphone-disabled state to the microphone-enabled state; and in response to determining that the first network device has received a command to switch from the microphone-disabled state to the microphone-enabled state, switch the first network device from the microphone-disabled state to the microphone-enabled state.

19. The first network device of claim 1, further comprising one or more speakers; and wherein the program instructions comprise program instructions executable by the one or more processors such that the first network device is configured to:

while the first network device is in the microphone-disabled state, play the first type of media content via the one or more speakers.

20. The tangible, non-transitory computer-readable media of claim 10, wherein the program instructions comprise program instructions executable by the one or more processors such that the first network device is configured to:

while the first network device is in the microphone-disabled state, play the first type of media content via one or more speakers of the first network device.

* * * * *